United States Patent
Stefanski et al.

(10) Patent No.: US 9,563,210 B1
(45) Date of Patent: Feb. 7, 2017

(54) THERMOSTAT WITH MULTIPLE SENSING SYSTEMS INTEGRATED THEREIN

(71) Applicant: Google Inc., Mountain View, CA (US)

(72) Inventors: John Stefanski, Palo Alto, CA (US); Marcus Albonico, Atherton, CA (US); Orville Buenaventura, Palo Alto, CA (US); Vivek Goyal, San Francisco, CA (US); Alexander Schoenen, Portland, OR (US); Giancarlo Giustina, San Francisco, CA (US); Anurag Gupta, San Jose, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/836,699

(22) Filed: Aug. 26, 2015

(51) Int. Cl.
*G01K 1/02* (2006.01)
*G01K 7/02* (2006.01)
*G05D 23/27* (2006.01)
*G01V 8/10* (2006.01)

(52) U.S. Cl.
CPC ................ *G05D 23/27* (2013.01); *G01K 7/02* (2013.01); *G01V 8/10* (2013.01)

(58) Field of Classification Search
CPC .... G01J 5/041; G05D 1/0011; G05D 23/1917; G01K 1/02; G01K 7/02
See application file for complete search history.

(56) References Cited

U.S. PATENT DOCUMENTS

2013/0099124 A1* 4/2013 Filson ................ G05D 23/1902
250/349

\* cited by examiner

*Primary Examiner* — David Porta
*Assistant Examiner* — Faye Boosalis
(74) *Attorney, Agent, or Firm* — Kilpatrick Townsend & Stockton LLP

(57) ABSTRACT

A thermostat may include a proximity sensor and a temperature sensor. The thermostat may also include a sensor mount assembly containing the proximity sensor, the temperature sensor, and a first alignment feature. The thermostat may additionally include a lens assembly having a first area, a second area, and a second alignment feature, where the second area includes a Fresnel lens, and the first area is thinner than the second area. The thermostat may further include a front cover where the outward-facing surface of the lens assembly is shaped to continuously conform to a curvature of the front cover. The thermostat may also include a frame member with third and fourth alignment features configured for respective matable alignment with the first and second alignment features and configured such that the proximity sensor and the temperature sensor are maintained in generally close, non-touching proximity to the lens assembly, the first area of the lens assembly being aligned with the proximity sensor, and the second area of the lens assembly being aligned with the temperature sensor.

20 Claims, 45 Drawing Sheets

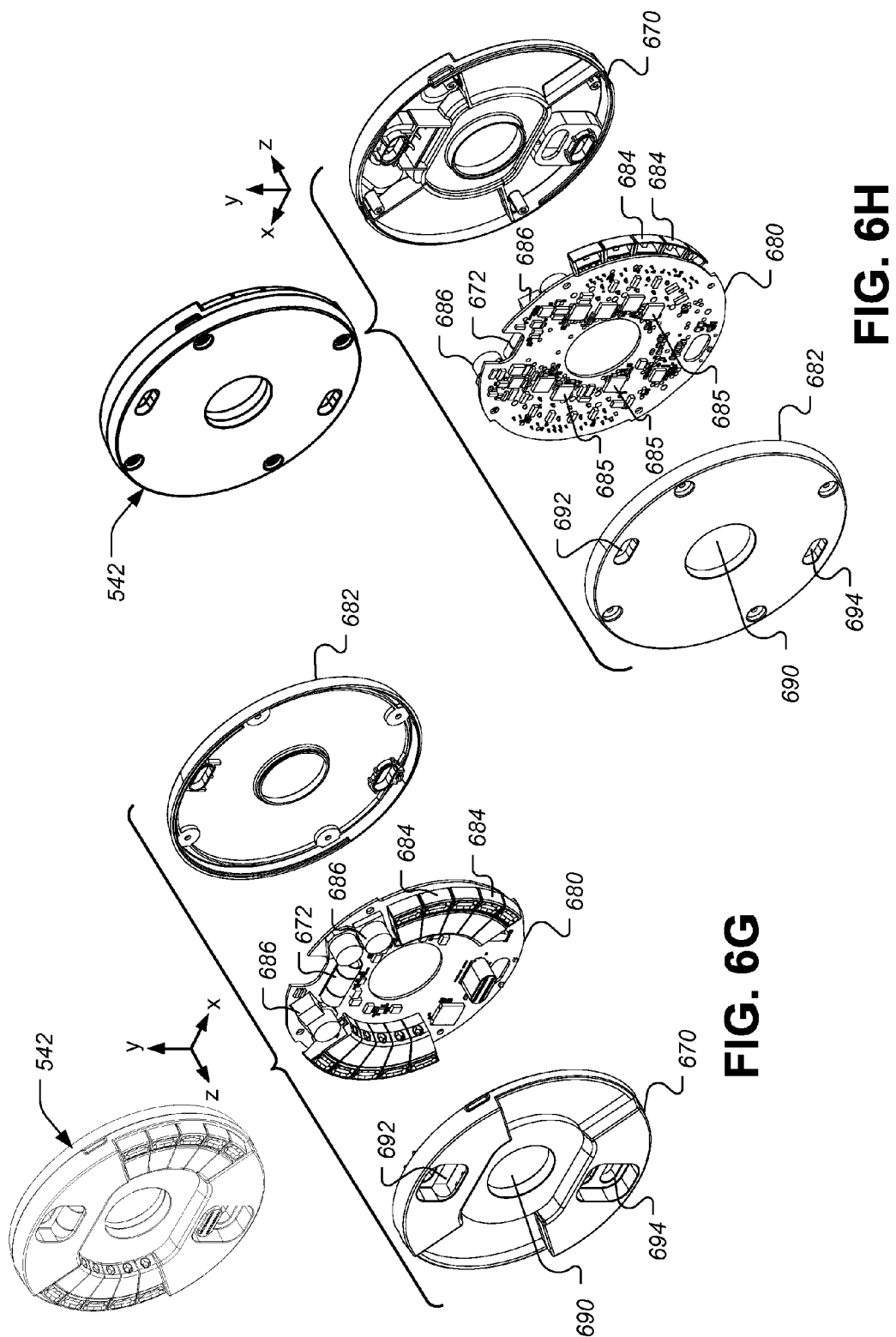

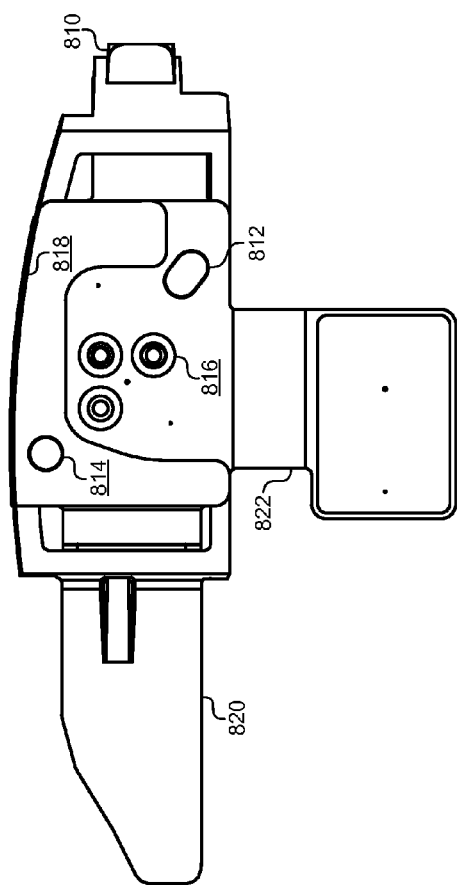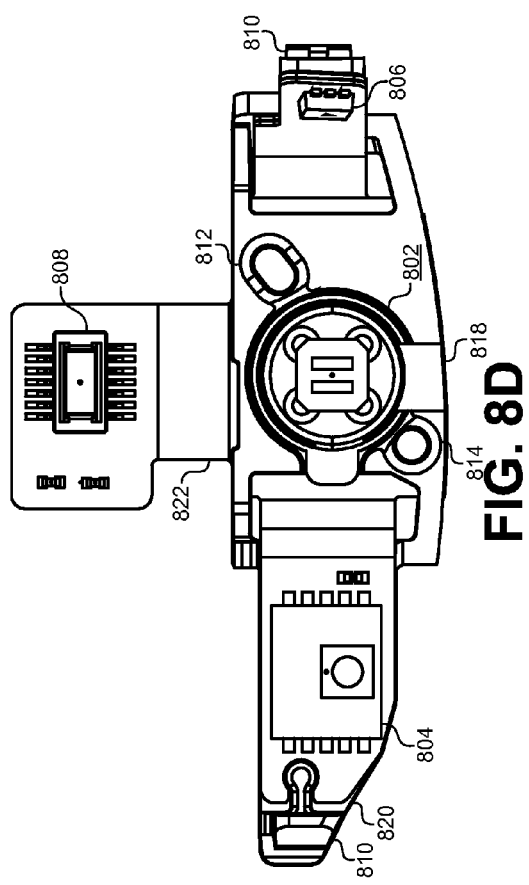
FIG. 8C
FIG. 8D

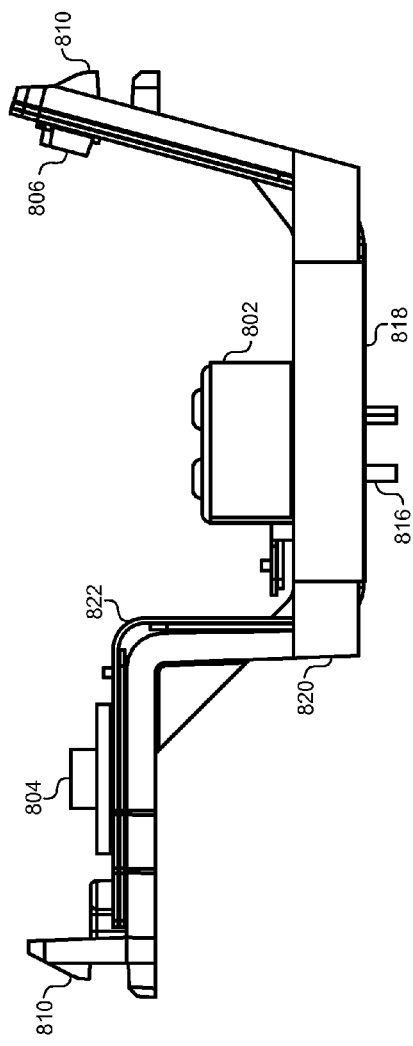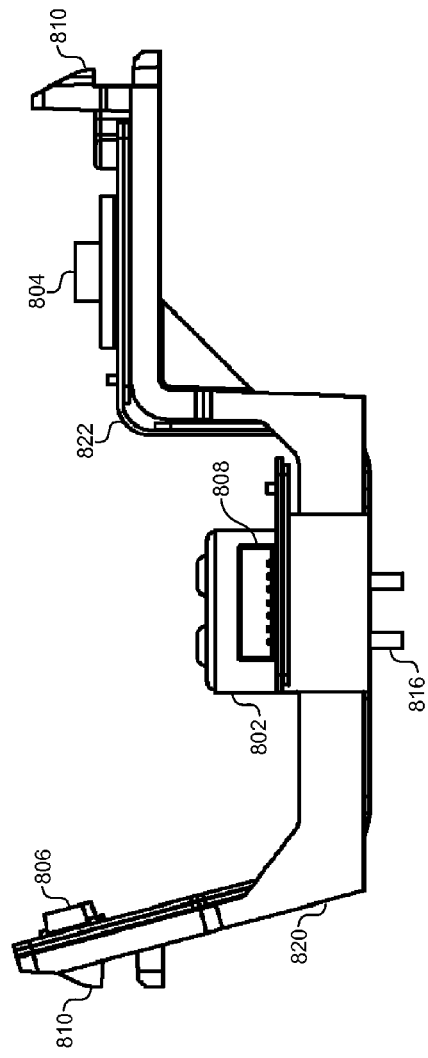

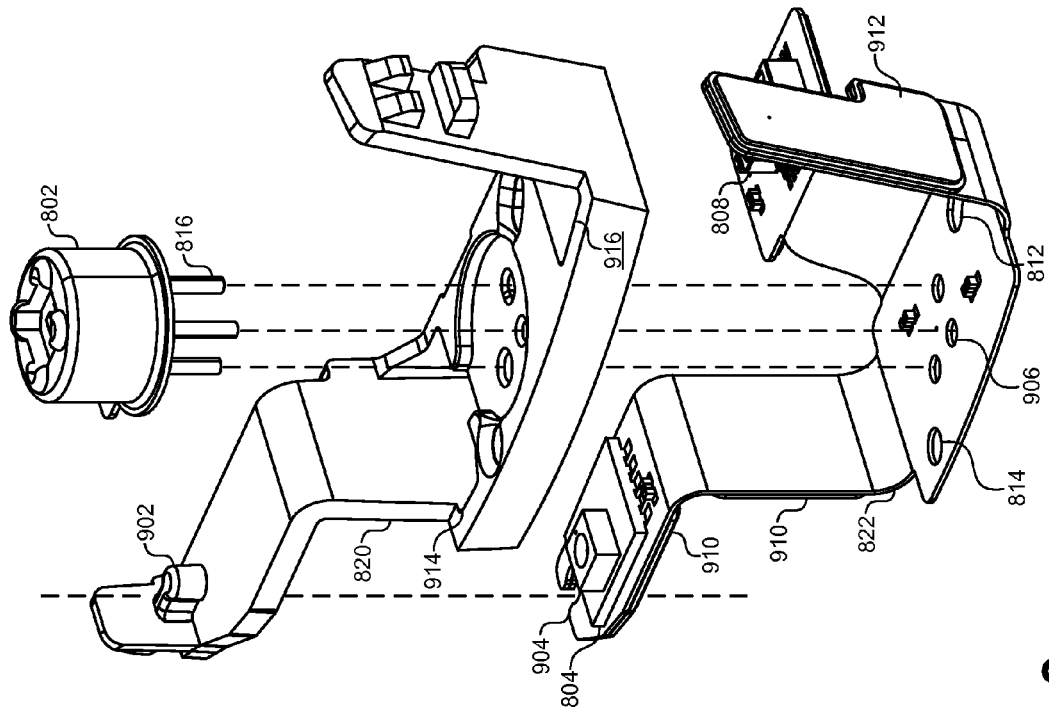
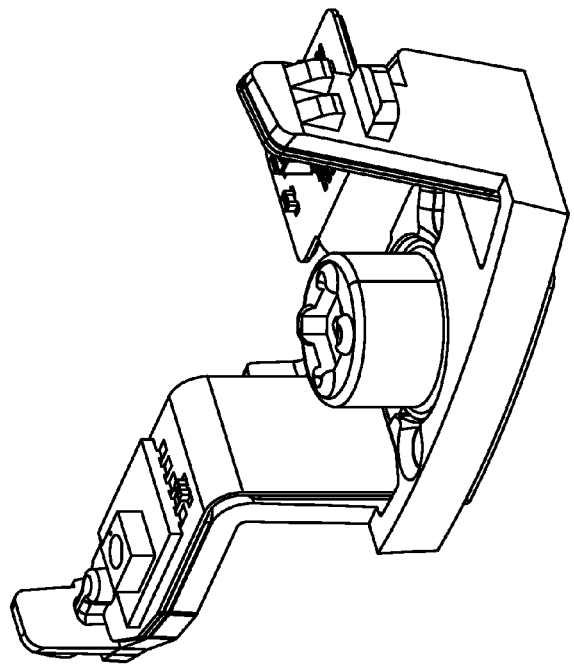
FIG. 9

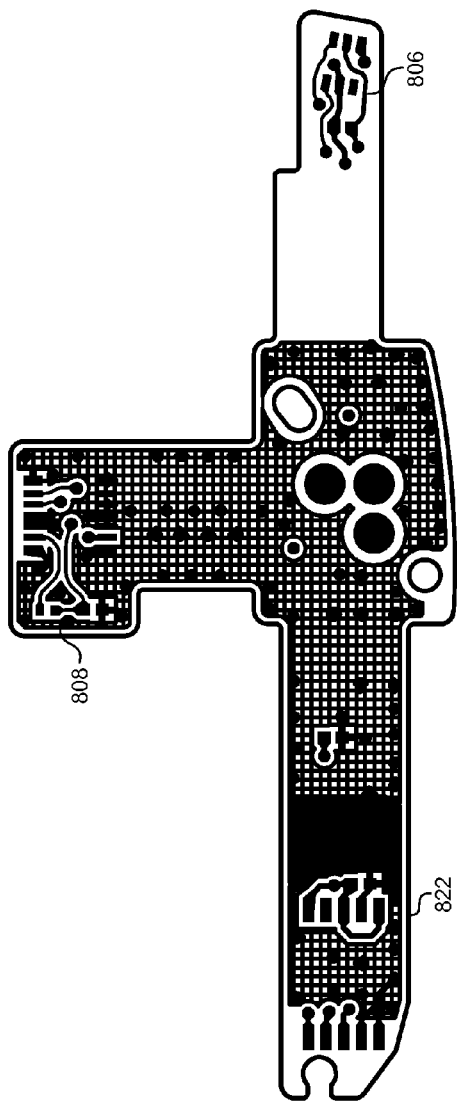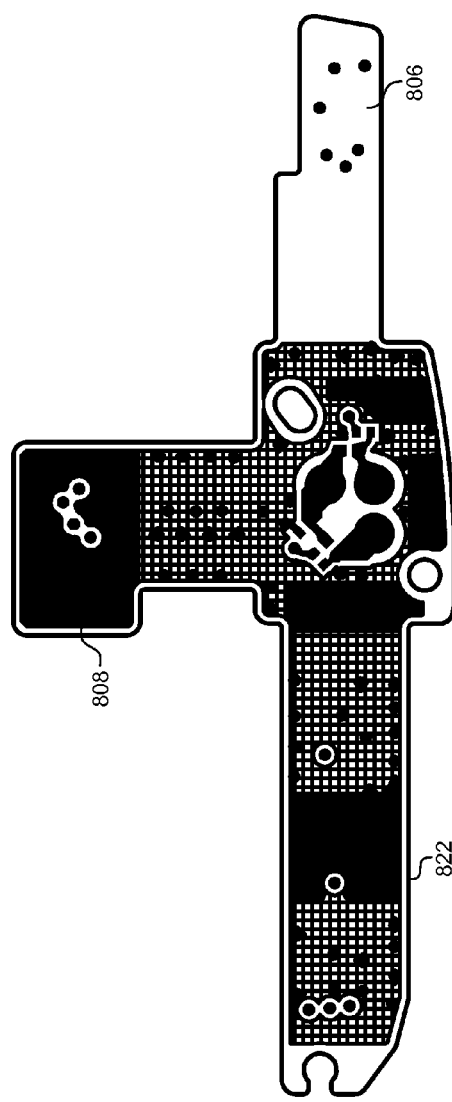
FIG. 10A
FIG. 10B

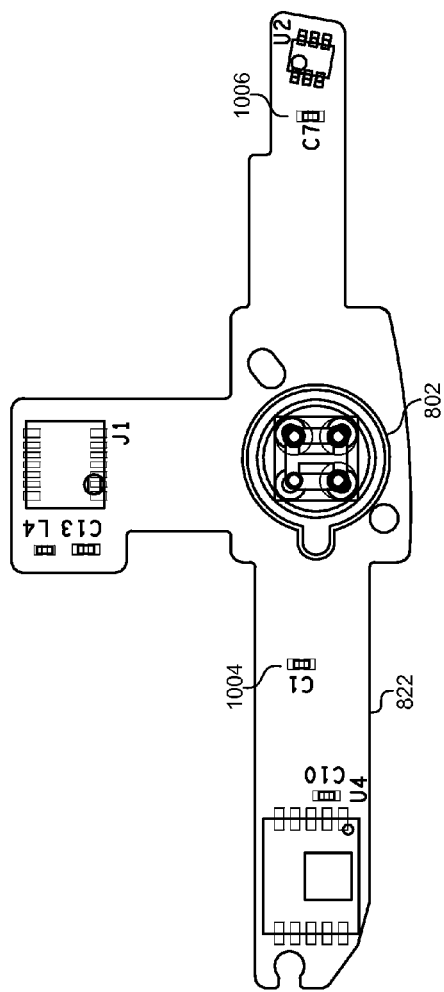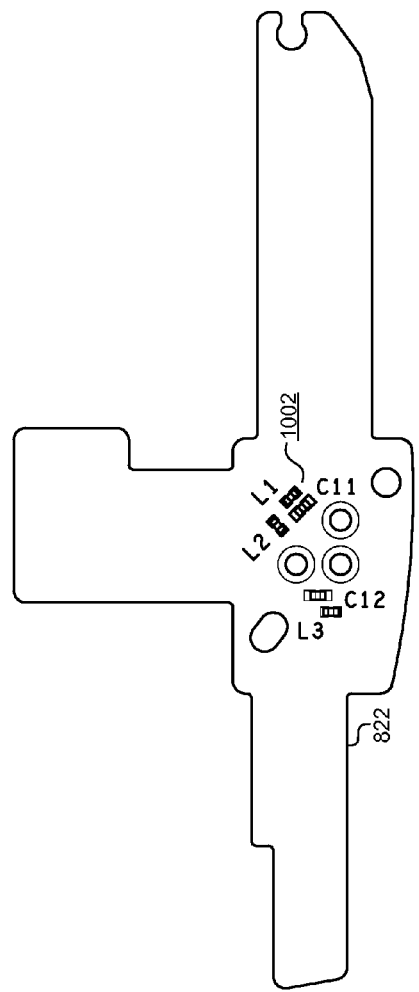
FIG. 10C
FIG. 10D

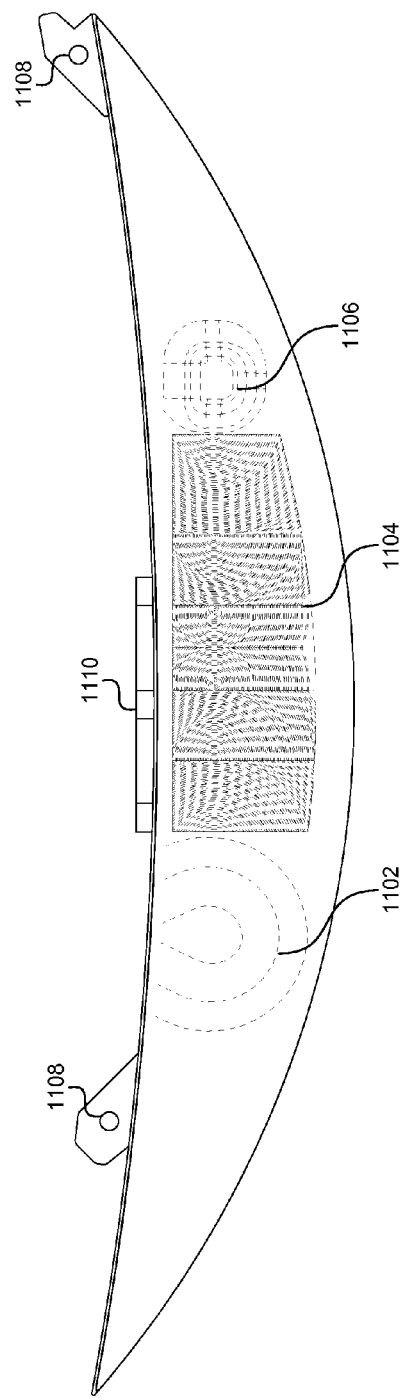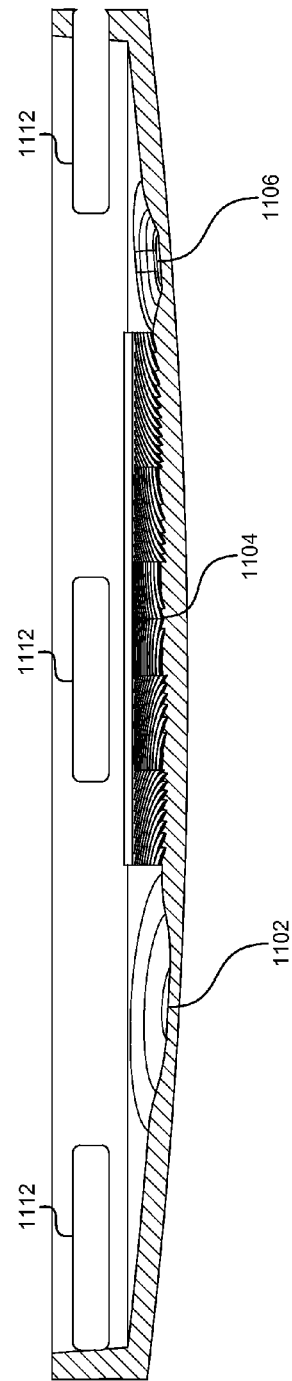
FIG. 11A
FIG. 11B

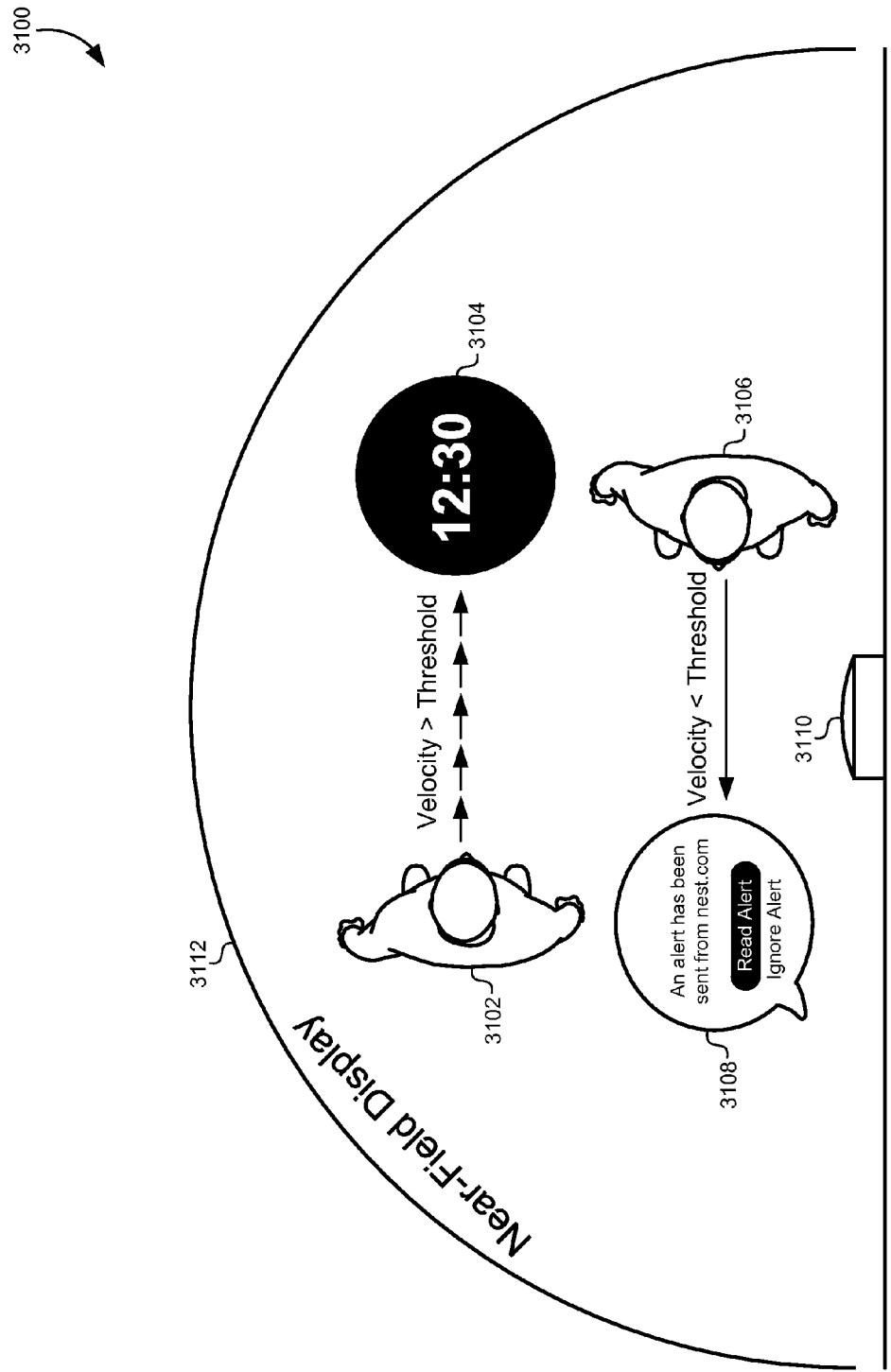

THERMOSTAT WITH MULTIPLE SENSING SYSTEMS INTEGRATED THEREIN

BACKGROUND

Microprocessor controlled "smart" thermostats may have advanced environmental control capabilities that can save energy while also keeping occupants comfortable. To do this, these smart thermostats require more information from the occupants as well as the environments where the thermostats are located. These thermostats may also be capable of connection to computer networks, including both local area networks (or other "private" networks) and wide area networks such as the Internet (or other "public" networks), in order to obtain current and forecasted outside weather data, cooperate in so-called demand-response programs (e.g., automatic conformance with power alerts that may be issued by utility companies during periods of extreme weather), enable users to have remote access and/or control thereof through their network-connected device (e.g., smartphone, tablet computer, PC-based web browser), and other advanced functionalities. Of particular importance is the ability to accurately assess the state of occupancy of a home and to provide a meaningful, yet simple user interface for responding to user inputs.

BRIEF SUMMARY

In some embodiments, a thermostat may include a proximity sensor for detecting user presence and a temperature sensor that provides temperature measurements for calculating an ambient temperature in an area surrounding the thermostat. The thermostat may also include a sensor mount assembly containing the proximity sensor and the temperature sensor, where the sensor mount assembly includes a first alignment feature. The thermostat may additionally include a lens assembly including a first area, a second area, and a second alignment feature, where the second area includes a Fresnel lens, and the first area is thinner than the second area. The thermostat may further include a front cover, where an outward-facing surface of the lens assembly is shaped to continuously conform to a curvature of the front cover. The thermostat may also include a frame member comprising third and fourth alignment features configured for respective matable alignment with the first and second alignment features and further configured such that the proximity sensor and the temperature sensor are maintained in generally close, non-touching proximity to the lens assembly, the first area of the lens assembly being aligned with the proximity sensor, and the second area of the lens assembly being aligned with the temperature sensor.

In some embodiments, a method of aligning sensor and lens elements in a smart thermostat may include providing a sensor mount assembly that includes a proximity sensor for detecting user presence, a temperature sensor that provides temperature measurements for calculating an ambient temperature in an area surrounding the thermostat, and a first alignment feature. The method may also include providing a lens assembly that includes a first area, a second area comprising a Fresnel lens where the first area is thinner than the second area, and a second alignment feature. The method may additionally include providing a frame member comprising third and fourth alignment features configured for respective matable alignment with the first and second alignment features and further configured such that the proximity sensor and the temperature sensor are maintained in generally close, non-touching proximity to the lens assembly, the first area of the lens assembly being aligned with the proximity sensor, and the second area of the lens assembly being aligned with the temperature sensor. The method may also include connecting the sensor mount assembly to the frame member by mating the first alignment feature with the third alignment feature, and connecting the lens assembly to the frame member by mating the second alignment feature with the fourth alignment feature.

Some embodiments may include one or more of the following features in any combination and without limitation. The sensor mount assembly may include a flexible circuit board to which the proximity sensor and the temperature sensor are mounted. The sensor mount assembly may include a bracket comprising at least two different elevations such that the proximity sensor and the temperature sensor sit at the at least two different elevations relative to the lens. The temperature sensor may include an IC body and a metal pin through which the temperature measurements for calculating the ambient temperature in the area surrounding the thermostat are received, where a portion of the sensor mount assembly is rotated at an angle such that the metal pin is closer to the lens assembly than the IC body. The sensor mount assembly may include a second proximity sensor. The proximity sensor may include a passive infrared (PIR) sensor, and the distance between the second area of the lens assembly and the PIR sensor may be between 6 mm and 8 mm. The lens assembly may be fabricated from a continuous piece of high-density polyethylene (HDPE) using an injection molding process. The proximity sensor may include a multi-channel thermopile comprising at least a left channel and a right channel. The distance between the temperature sensor and the first area of the lens may be less than 3 mm. The thermostat may also include electromagnetic shielding that wraps around the proximity sensor and around at least a portion of the sensor mount assembly.

BRIEF DESCRIPTION OF THE DRAWINGS

FIG. 6G-6H illustrate exploded front and rear perspective views, respectively, of a back plate unit with respect to its primary components, according to some embodiments.

FIGS. 8A-8H illustrate various views of the sensor flex assembly.

FIG. 9 illustrates a view of the PIR, the bracket, and the flexible circuit board as they are assembled to form the sensor flex assembly.

FIGS. 10A-10B illustrate conductor patterns on the flexible circuit board to isolate the temperature sensor from internal heating effects.

FIGS. 10C-10D illustrate the components layout on the flexible circuit board to isolate the temperature sensor from internal heating effects.

FIGS. 11A-E illustrates various views of a multifunction lens element.

FIG. 31 illustrates a diagram of progressive user displays based on user velocities, according to some embodiments.

DETAILED DESCRIPTION OF THE INVENTION

Figure 1:
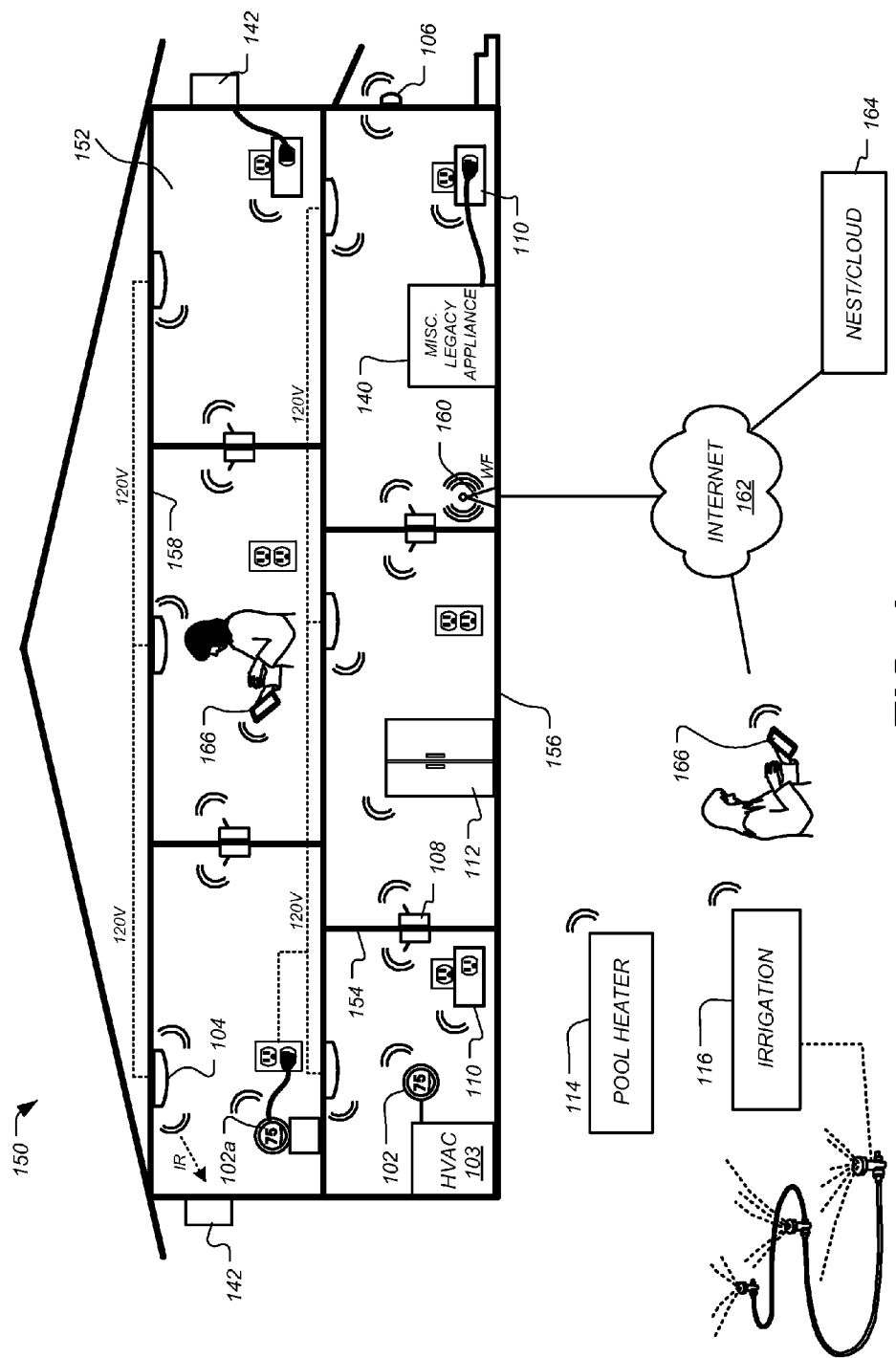
FIG. 1 illustrates an example of a smart home environment within which one or more of the devices, methods, systems, services, and/or computer program products described further herein can be applicable.

The subject matter of this patent specification relates to the subject matter of the following commonly assigned applications, filed on the same day as the present application, each of which is incorporated by reference herein:

U.S. patent application Ser. No. 14/836,699, filed on Aug. 26, 2015, titled THERMOSTAT WITH MULTIPLE SENSING SYSTEMS INTEGRATED THEREIN, to Stefanski et al.

U.S. patent application Ser. No. 14/836,648, filed on Aug. 26, 2015, titled THERMOSTAT WITH MULTIPLE SENSING SYSTEMS INCLUDING PRESENCE DETECTION SYSTEMS INTEGRATED THEREIN, to Goyal et al.

U.S. patent application Ser. No. 14/836,568, filed on Aug. 26, 2015, titled AUTOMATED DISPLAY ADJUSTMENTS FOR SMART-HOME DEVICE BASED ON VIEWER LOCATION OR OTHER SENSED VIEWER-RELATED PARAMETERS, to Goyal et al.

U.S. patent application Ser. No. 14/836,744, filed on Aug. 26, 2015, titled SMART THERMOSTAT ROBUST AGAINST ADVERSE EFFECTS FROM INTERNAL HEAT-GENERATING COMPONENTS, to Stefanski et al.

U.S. patent application Ser. No. 14/836,660, filed on Aug. 26, 2015, titled THERMOSTAT ELECTRONIC DISPLAY AND LENSING ELEMENT THEREFOR, to Giustina.

U.S. patent application Ser. No. 14/836,631, filed on Aug. 26, 2015, titled ROTATION DETECTION FOR RING-SHAPED USER INPUT MEMBER OF SMART-HOME DEVICE, to Stefanski et al.

U.S. patent application Ser. No. 14/836,595, filed on Aug. 26, 2015, titled USER INTERFACE MEMBER FOR ELECTRONIC DEVICE, to Giustina et al.

U.S. patent application Ser. No. 14/836,323, filed on Aug. 26, 2015, titled INTEGRATED ANTENNA SYSTEM AND RELATED COMPONENTS MANAGEMENT FOR A SMART THERMOSTAT, to Honjo et al.

The above-referenced patent applications are collectively referenced herein as "the commonly assigned incorporated applications."

The Smart-Home Environment

A detailed description of the inventive body of work is provided herein. While several embodiments are described, it should be understood that the inventive body of work is not limited to any one embodiment, but instead encompasses numerous alternatives, modifications, and equivalents. In addition, while numerous specific details are set forth in the following description in order to provide a thorough understanding of the inventive body of work, some embodiments can be practiced without some or all of these details. Moreover, for the purpose of clarity, certain technical material that is known in the related art has not been described in detail in order to avoid unnecessarily obscuring the inventive body of work.

As used herein the term "HVAC" includes systems providing both heating and cooling, heating only, cooling only, as well as systems that provide other occupant comfort and/or conditioning functionality such as humidification, dehumidification and ventilation.

As used herein the terms power "harvesting," "sharing" and "stealing" when referring to HVAC thermostats all refer to thermostats that are designed to derive power from the power transformer through the equipment load without using a direct or common wire source directly from the transformer.

As used herein the term "residential" when referring to an HVAC system means a type of HVAC system that is suitable to heat, cool and/or otherwise condition the interior of a building that is primarily used as a single family dwelling. An example of a cooling system that would be considered residential would have a cooling capacity of less than about 5 tons of refrigeration (1 ton of refrigeration=12,000 Btu/h).

As used herein the term "light commercial" when referring to an HVAC system means a type of HVAC system that is suitable to heat, cool and/or otherwise condition the interior of a building that is primarily used for commercial purposes, but is of a size and construction that a residential HVAC system is considered suitable. An example of a cooling system that would be considered residential would have a cooling capacity of less than about 5 tons of refrigeration.

As used herein the term "thermostat" means a device or system for regulating parameters such as temperature and/or humidity within at least a part of an enclosure. The term "thermostat" may include a control unit for a heating and/or cooling system or a component part of a heater or air conditioner. As used herein the term "thermostat" can also refer generally to a versatile sensing and control unit (VSCU unit) that is configured and adapted to provide sophisticated, customized, energy-saving HVAC control functionality while at the same time being visually appealing, non-intimidating, elegant to behold, and delightfully easy to use.

FIG. 1 illustrates an example of a smart home environment within which one or more of the devices, methods, systems, services, and/or computer program products described further herein can be applicable. The depicted smart home environment includes a structure 150, which can include, e.g., a house, office building, garage, or mobile home. It will be appreciated that devices can also be integrated into a smart home environment that does not include an entire structure 150, such as an apartment, condominium, or office space. Further, the smart home environment can control and/or be coupled to devices outside of the actual structure 150. Indeed, several devices in the smart home environment need not physically be within the structure 150 at all. For example, a device controlling a pool heater or irrigation system can be located outside of the structure 150.

The depicted structure 150 includes a plurality of rooms 152, separated at least partly from each other via walls 154. The walls 154 can include interior walls or exterior walls. Each room can further include a floor 156 and a ceiling 158. Devices can be mounted on, integrated with and/or supported by a wall 154, floor or ceiling.

The smart home depicted in FIG. 1 includes a plurality of devices, including intelligent, multi-sensing, network-connected devices that can integrate seamlessly with each other and/or with cloud-based server systems to provide any of a variety of useful smart home objectives. One, more or each of the devices illustrated in the smart home environment and/or in the figure can include one or more sensors, a user interface, a power supply, a communications component, a modularity unit and intelligent software as described herein. Examples of devices are shown in FIG. 1.

An intelligent, multi-sensing, network-connected thermostat 102 can detect ambient climate characteristics (e.g., temperature and/or humidity) and control a heating, ventilation and air-conditioning (HVAC) system 103. One or more intelligent, network-connected, multi-sensing hazard detection units 104 can detect the presence of a hazardous substance and/or a hazardous condition in the home environment (e.g., smoke, fire, or carbon monoxide). One or more intelligent, multi-sensing, network-connected entryway interface devices 106, which can be termed a "smart doorbell", can detect a person's approach to or departure from a location, control audible functionality, announce a person's approach or departure via audio or visual means, or control settings on a security system (e.g., to activate or deactivate the security system).

Each of a plurality of intelligent, multi-sensing, network-connected wall light switches 108 can detect ambient lighting conditions, detect room-occupancy states and control a power and/or dim state of one or more lights. In some instances, light switches 108 can further or alternatively control a power state or speed of a fan, such as a ceiling fan. Each of a plurality of intelligent, multi-sensing, network-connected wall plug interfaces 110 can detect occupancy of a room or enclosure and control supply of power to one or more wall plugs (e.g., such that power is not supplied to the plug if nobody is at home). The smart home may further include a plurality of intelligent, multi-sensing, network-connected appliances 112, such as refrigerators, stoves and/or ovens, televisions, washers, dryers, lights (inside and/or outside the structure 150), stereos, intercom systems, garage-door openers, floor fans, ceiling fans, whole-house fans, wall air conditioners, pool heaters 114, irrigation systems 116, security systems (including security system components such as cameras, motion detectors and window/door sensors), and so forth. While descriptions of FIG. 1 can identify specific sensors and functionalities associated with specific devices, it will be appreciated that any of a variety of sensors and functionalities (such as those described throughout the specification) can be integrated into the device.

In addition to containing processing and sensing capabilities, each of the devices 102, 104, 106, 108, 110, 112, 114 and 116 can be capable of data communications and information sharing with any other of the devices 102, 104, 106, 108, 110, 112, 114 and 116, as well as to any cloud server or any other device that is network-connected anywhere in the world. The devices can send and receive communications via any of a variety of custom or standard wireless protocols (Wi-Fi, ZigBee, 6LoWPAN, Thread, Bluetooth, BLE, HomeKit Accessory Protocol (HAP), Weave, etc.) and/or any of a variety of custom or standard wired protocols (CAT6 Ethernet, HomePlug, etc.). The wall plug interfaces 110 can serve as wireless or wired repeaters, and/or can function as bridges between (i) devices plugged into AC outlets and communicating using Homeplug or other power line protocol, and (ii) devices that not plugged into AC outlets.

For example, a first device can communicate with a second device via a wireless router 160. A device can further communicate with remote devices via a connection to a network, such as the Internet 162. Through the Internet 162, the device can communicate with a central server or a cloud-computing system 164. The central server or cloud-computing system 164 can be associated with a manufacturer, support entity or service provider associated with the device. For one embodiment, a user may be able to contact customer support using a device itself rather than needing to use other communication means such as a telephone or Internet-connected computer. Further, software updates can be automatically sent from the central server or cloud-computing system 164 to devices (e.g., when available, when purchased, or at routine intervals).

By virtue of network connectivity, one or more of the smart-home devices of FIG. 1 can further allow a user to interact with the device even if the user is not proximate to the device. For example, a user can communicate with a device using a computer (e.g., a desktop computer, laptop computer, or tablet) or other portable electronic device (e.g., a smartphone). A webpage or app can be configured to receive communications from the user and control the device based on the communications and/or to present information about the device's operation to the user. For example, the user can view a current setpoint temperature for a device and adjust it using a computer. The user can be in the structure during this remote communication or outside the structure.

The smart home also can include a variety of non-communicating legacy appliances 140, such as old conventional washer/dryers, refrigerators, and the like which can be controlled, albeit coarsely (ON/OFF), by virtue of the wall plug interfaces 110. The smart home can further include a variety of partially communicating legacy appliances 142, such as IR-controlled wall air conditioners or other IR-controlled devices, which can be controlled by IR signals provided by the hazard detection units 104 or the light switches 108.

Figure 2:
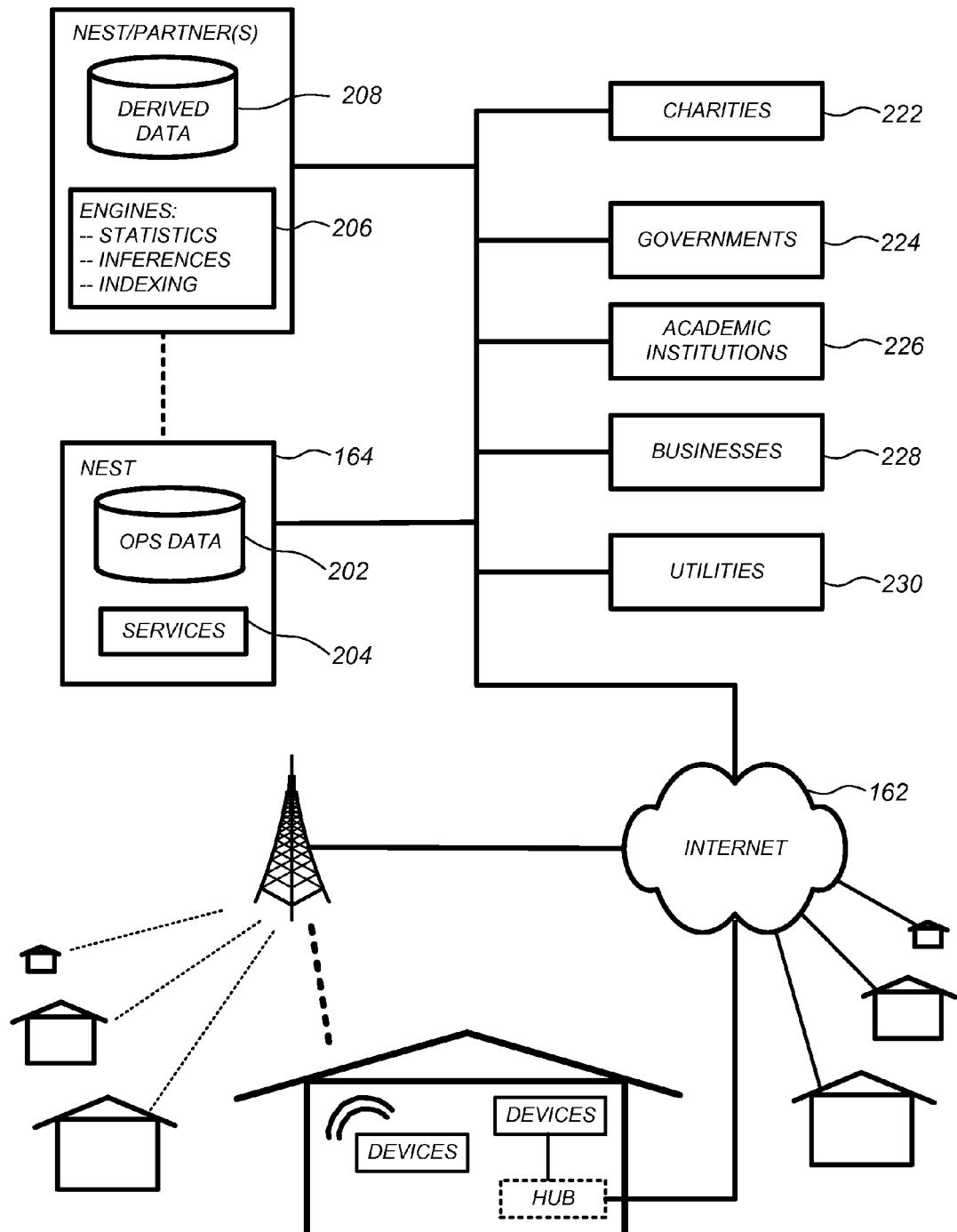
FIG. 2 illustrates a network-level view of an extensible devices and services platform with which the smart home of FIG. 1 can be integrated, according to some embodiments.

FIG. 2 illustrates a network-level view of an extensible devices and services platform with which the smart home of FIG. 1 can be integrated, according to some embodiments. Each of the intelligent, network-connected devices from FIG. 1 can communicate with one or more remote central servers or cloud computing systems 164. The communication can be enabled by establishing connection to the Internet 162 either directly (for example, using 3G/4G connectivity to a wireless carrier), though a hubbed network (which can be scheme ranging from a simple wireless router, for example, up to and including an intelligent, dedicated whole-home control node), or through any combination thereof.

The central server or cloud-computing system 164 can collect operation data 202 from the smart home devices. For example, the devices can routinely transmit operation data or can transmit operation data in specific instances (e.g., when requesting customer support). The central server or cloud-computing architecture 164 can further provide one or more services 204. The services 204 can include, e.g., software update, customer support, sensor data collection/logging, remote access, remote or distributed control, or use suggestions (e.g., based on collected operation data 204 to improve performance, reduce utility cost, etc.). Data associated with the services 204 can be stored at the central server or cloud-computing system 164 and the central server or cloud-computing system 164 can retrieve and transmit the data at an appropriate time (e.g., at regular intervals, upon receiving request from a user, etc.).

One salient feature of the described extensible devices and services platform, as illustrated in FIG. 2, is a processing engines 206, which can be concentrated at a single server or distributed among several different computing entities without limitation. Processing engines 206 can include engines configured to receive data from a set of devices (e.g., via the Internet or a hubbed network), to index the data, to analyze the data and/or to generate statistics based on the analysis or as part of the analysis. The analyzed data can be stored as derived data 208. Results of the analysis or statistics can thereafter be transmitted back to a device providing ops data used to derive the results, to other devices, to a server providing a webpage to a user of the device, or to other non-device entities. For example, use statistics, use statistics relative to use of other devices, use patterns, and/or statistics summarizing sensor readings can be transmitted. The results or statistics can be provided via the Internet 162. In this manner, processing engines 206 can be configured and programmed to derive a variety of useful information from the operational data obtained from the smart home. A single server can include one or more engines.

The derived data can be highly beneficial at a variety of different granularities for a variety of useful purposes, ranging from explicit programmed control of the devices on a per-home, per-neighborhood, or per-region basis (for example, demand-response programs for electrical utilities), to the generation of inferential abstractions that can assist on a per-home basis (for example, an inference can be drawn that the homeowner has left for vacation and so security detection equipment can be put on heightened sensitivity), to the generation of statistics and associated inferential abstractions that can be used for government or charitable purposes. For example, processing engines 206 can generate statistics about device usage across a population of devices and send the statistics to device users, service providers or other entities (e.g., that have requested or may have provided monetary compensation for the statistics). As specific illustrations, statistics can be transmitted to charities 222, governmental entities 224 (e.g., the Food and Drug Administration or the Environmental Protection Agency), academic institutions 226 (e.g., university researchers), businesses 228 (e.g., providing device warranties or service to related equipment), or utility companies 230. These entities can use the data to form programs to reduce energy usage, to preemptively service faulty equipment, to prepare for high service demands, to track past service performance, etc., or to perform any of a variety of beneficial functions or tasks now known or hereinafter developed.

Figure 3:
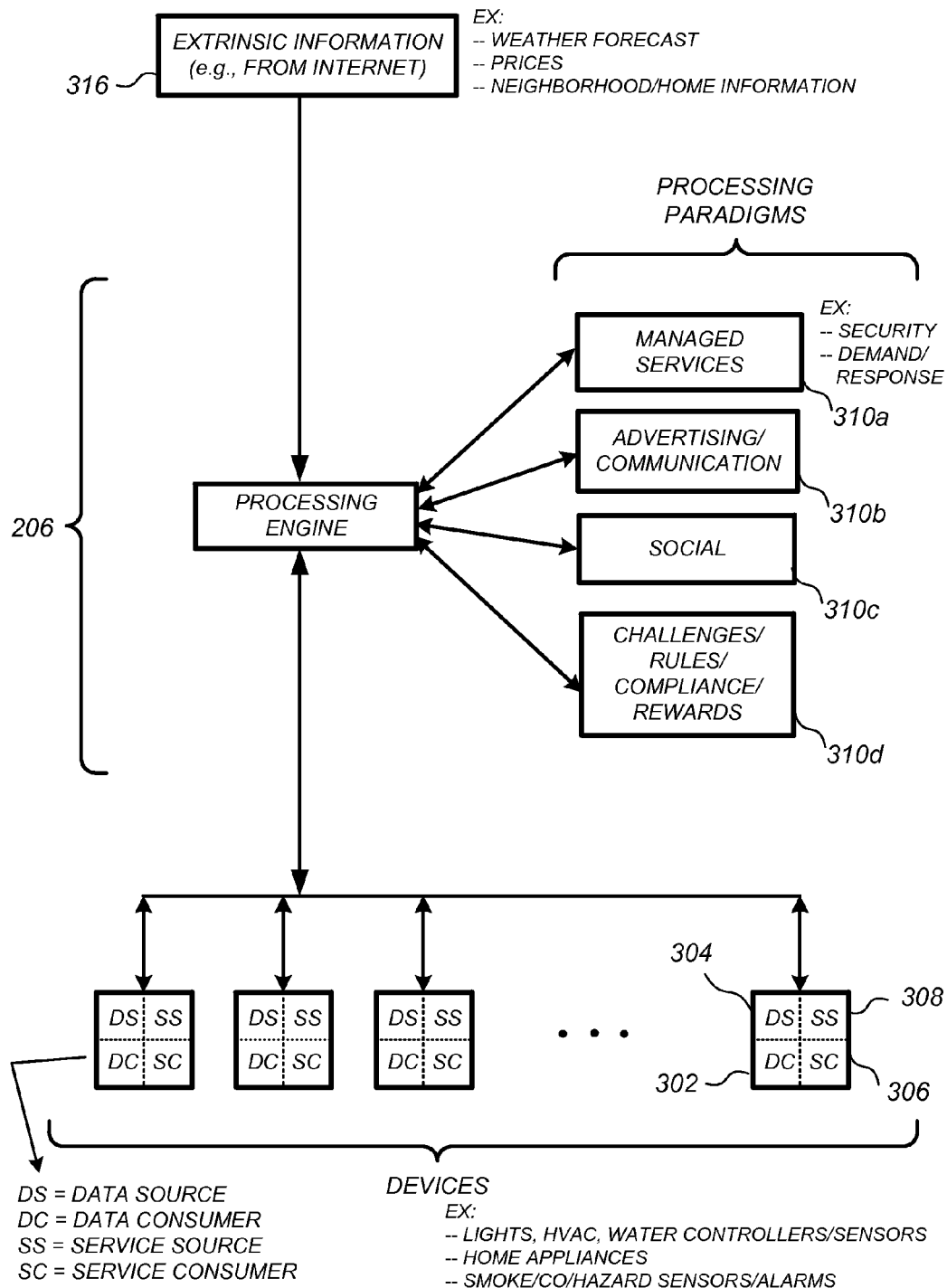
FIG. 3 illustrates an abstracted functional view of the extensible devices and services platform of FIG. 2, according to some embodiments.

FIG. 3 illustrates an abstracted functional view of the extensible devices and services platform of FIG. 2, with particular reference to the processing engine 206 as well as the devices of the smart home. Even though the devices situated in the smart home will have an endless variety of different individual capabilities and limitations, they can all be thought of as sharing common characteristics in that each of them is a data consumer 302 (DC), a data source 304 (DS), a services consumer 306 (SC), and a services source 308 (SS). Advantageously, in addition to providing the essential control information needed for the devices to achieve their local and immediate objectives, the extensible devices and services platform can also be configured to harness the large amount of data that is flowing out of these devices. In addition to enhancing or optimizing the actual operation of the devices themselves with respect to their immediate functions, the extensible devices and services platform can also be directed to "repurposing" that data in a variety of automated, extensible, flexible, and/or scalable ways to achieve a variety of useful objectives. These objectives may be predefined or adaptively identified based on, e.g., usage patterns, device efficiency, and/or user input (e.g., requesting specific functionality).

For example, FIG. 3 shows processing engine 206 as including a number of paradigms 310. Processing engine 206 can include a managed services paradigm 310a that monitors and manages primary or secondary device functions. The device functions can include ensuring proper operation of a device given user inputs, estimating that (e.g., and responding to) an intruder is or is attempting to be in a dwelling, detecting a failure of equipment coupled to the device (e.g., a light bulb having burned out), implementing or otherwise responding to energy demand response events, or alerting a user of a current or predicted future event or characteristic. Processing engine 206 can further include an advertising/communication paradigm 310b that estimates characteristics (e.g., demographic information), desires and/or products of interest of a user based on device usage. Services, promotions, products or upgrades can then be offered or automatically provided to the user. Processing engine 206 can further include a social paradigm 310c that uses information from a social network, provides information to a social network (for example, based on device usage), processes data associated with user and/or device interactions with the social network platform. For example, a user's status as reported to their trusted contacts on the social network could be updated to indicate when they are home based on light detection, security system inactivation or device usage detectors. As another example, a user may be able to share device-usage statistics with other users. Processing engine 206 can include a challenges/rules/compliance/rewards paradigm 310d that informs a user of challenges, rules, compliance regulations and/or rewards and/or that uses operation data to determine whether a challenge has been met, a rule or regulation has been complied with and/or a reward has been earned. The challenges, rules or regulations can relate to efforts to conserve energy, to live safely (e.g., reducing exposure to toxins or carcinogens), to conserve money and/or equipment life, to improve health, etc.

Processing engine can integrate or otherwise utilize extrinsic information 316 from extrinsic sources to improve the functioning of one or more processing paradigms. Extrinsic information 316 can be used to interpret operational data received from a device, to determine a characteristic of the environment near the device (e.g., outside a structure that the device is enclosed in), to determine services or products available to the user, to identify a social network or social-network information, to determine contact information of entities (e.g., public-service entities such as an emergency-response team, the police or a hospital) near the device, etc., to identify statistical or environmental conditions, trends or other information associated with a home or neighborhood, and so forth.

An extraordinary range and variety of benefits can be brought about by, and fit within the scope of, the described extensible devices and services platform, ranging from the ordinary to the profound. Thus, in one "ordinary" example, each bedroom of the smart home can be provided with a smoke/fire/CO alarm that includes an occupancy sensor, wherein the occupancy sensor is also capable of inferring (e.g., by virtue of motion detection, facial recognition, audible sound patterns, etc.) whether the occupant is asleep or awake. If a serious fire event is sensed, the remote security/monitoring service or fire department is advised of how many occupants there are in each bedroom, and whether those occupants are still asleep (or immobile) or whether they have properly evacuated the bedroom. While this is, of course, a very advantageous capability accommodated by the described extensible devices and services platform, there can be substantially more "profound" examples that can truly illustrate the potential of a larger "intelligence" that can be made available. By way of perhaps a more "profound" example, the same data bedroom occupancy data that is being used for fire safety can also be "repurposed" by the processing engine 206 in the context of a social paradigm of neighborhood child development and education. Thus, for example, the same bedroom occupancy and motion data discussed in the "ordinary" example can be collected and made available for processing (properly anonymized) in which the sleep patterns of schoolchildren in a particular ZIP code can be identified and tracked. Localized variations in the sleeping patterns of the schoolchildren may be identified and correlated, for example, to different nutrition programs in local schools.

Figure 4:
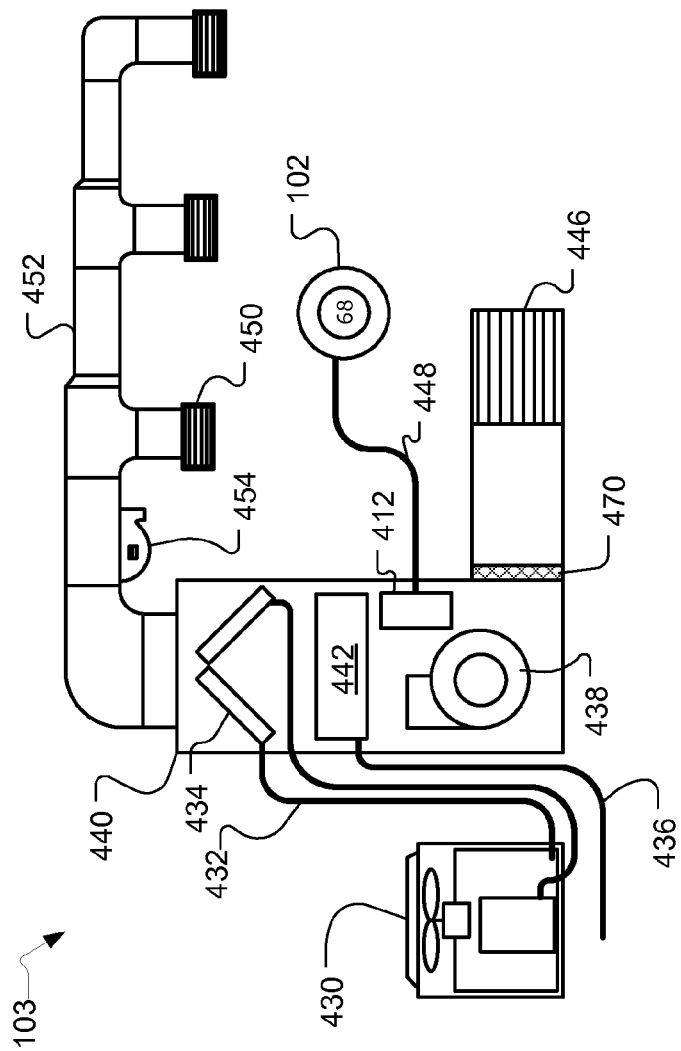
FIG. 4 illustrates a schematic diagram of an HVAC system, according to some embodiments.

FIG. 4 is a schematic diagram of an HVAC system, according to some embodiments. HVAC system 103 provides heating, cooling, ventilation, and/or air handling for an enclosure, such as structure 150 depicted in FIG. 1. System 103 depicts a forced air type heating and cooling system, although according to other embodiments, other types of HVAC systems could be used such as radiant heat based systems, heat-pump based systems, and others.

For carrying out the heating function, heating coils or elements 442 within air handler 440 provide a source of heat using electricity or gas via line 436. Cool air is drawn from the enclosure via return air duct 446 through filter 470, using fan 438 and is heated through heating coils or elements 442. The heated air flows back into the enclosure at one or more locations via supply air duct system 452 and supply air registers such as register 450. In cooling, an outside compressor 430 passes a refrigerant gas through a set of heat exchanger coils and then through an expansion valve. The gas then goes through line 432 to the cooling coils or evaporator coils 434 in the air handler 440 where it expands, cools and cools the air being circulated via fan 438. A humidifier 454 may optionally be included in various embodiments that returns moisture to the air before it passes through duct system 452. Although not shown in FIG. 4, alternate embodiments of HVAC system 103 may have other functionality such as venting air to and from the outside, one or more dampers to control airflow within the duct system 452 and an emergency heating unit. Overall operation of HVAC system 103 is selectively actuated by control electronics 412 communicating with thermostat 102 over control wires 448.

The Smart-Home Thermostat

Figure 5A:
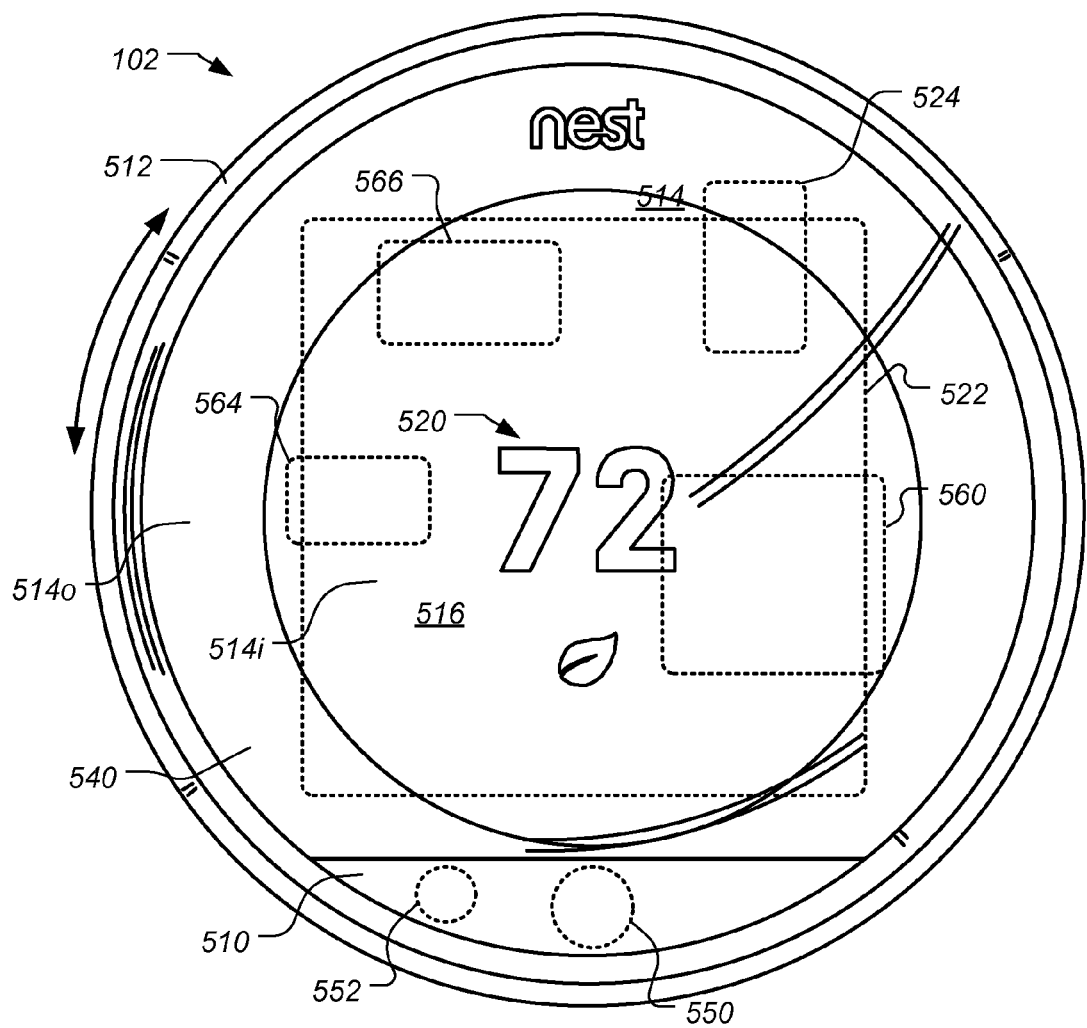
FIG. 5A-5D illustrate a thermostat having a visually pleasing, smooth, sleek and rounded exterior appearance while at the same time including one or more sensors for detecting occupancy and/or users, according to some embodiments.
Figure 5B:
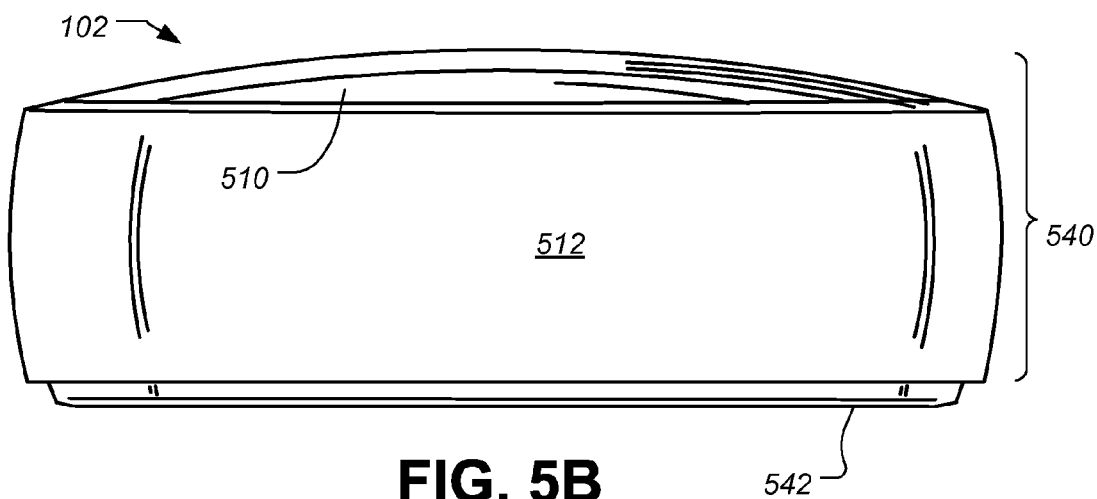
Figure 5C:
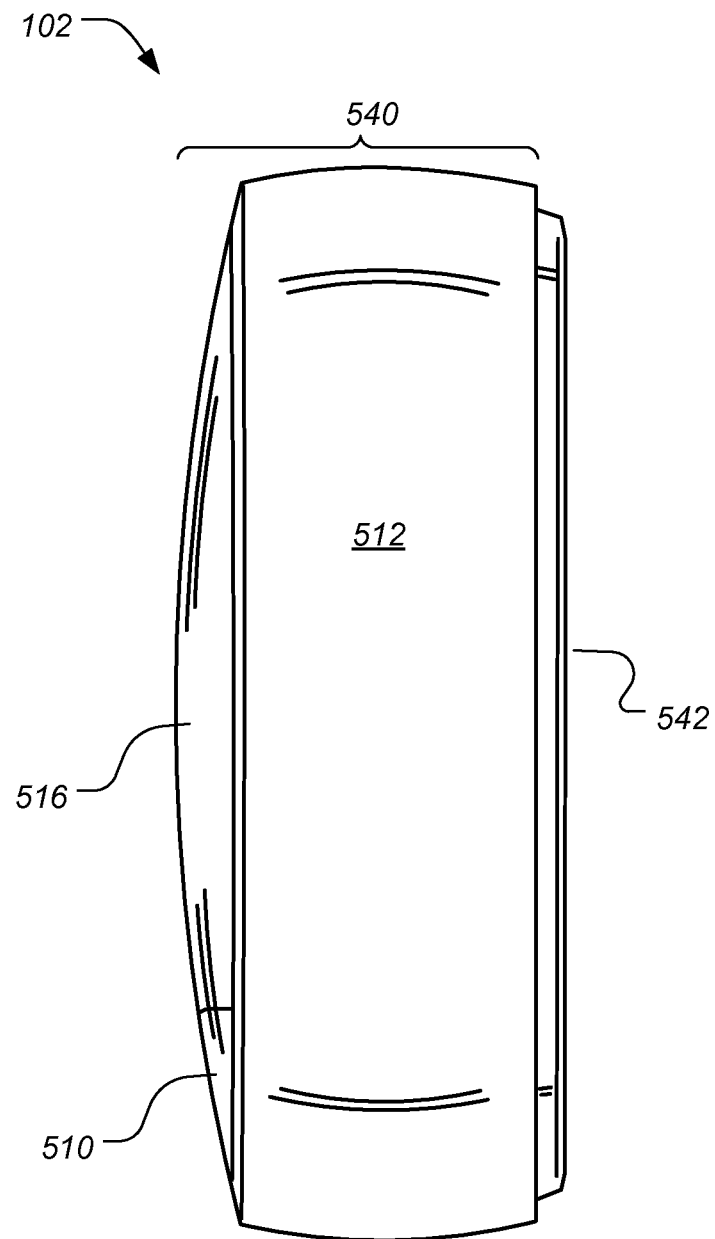
Figure 5D:
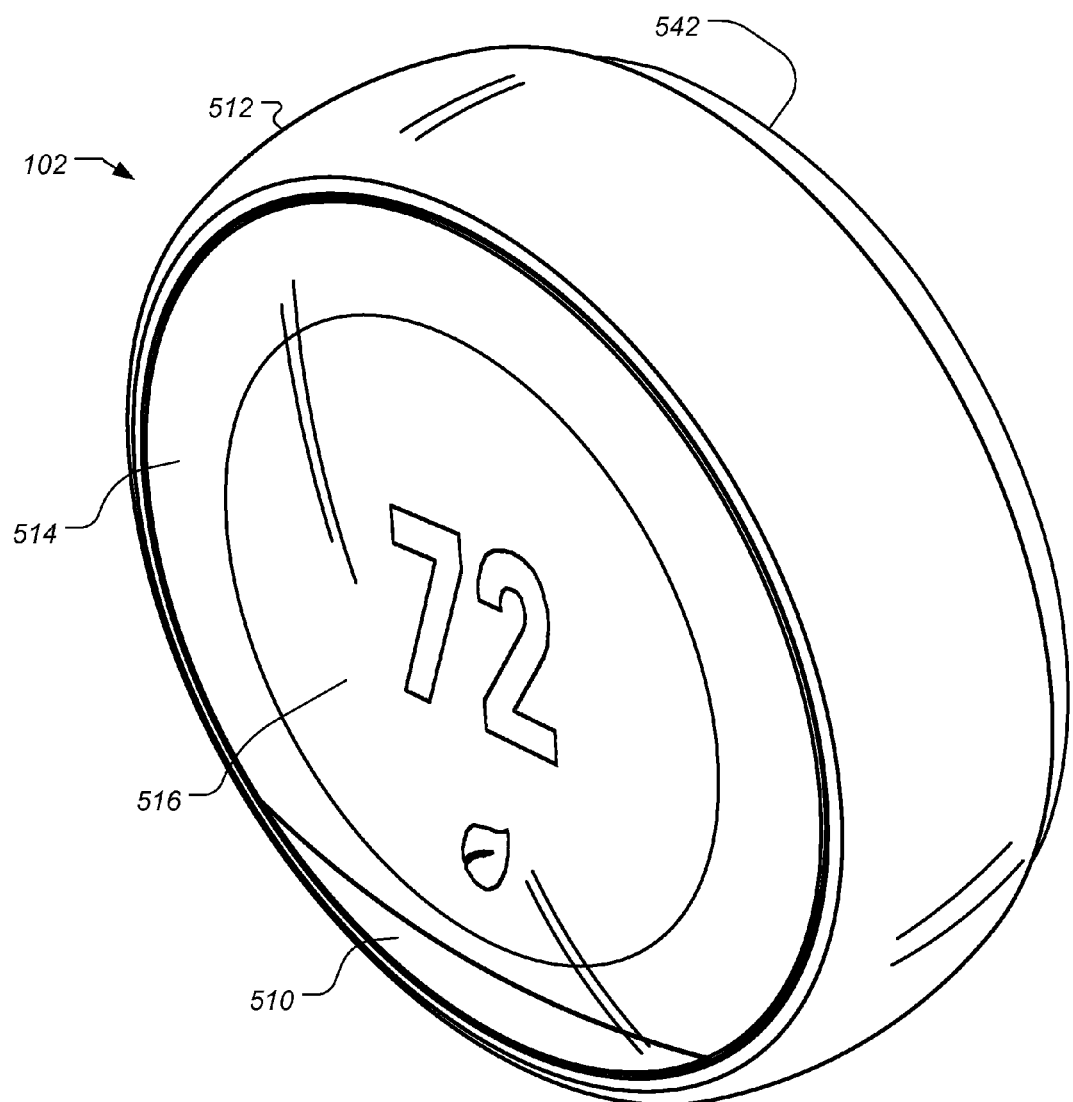

FIGS. 5A-5D illustrate a thermostat having a rounded exterior appearance and including one or more sensors for detecting environmental conditions, such as occupancy and/or users, temperature, ambient light, humidity, and so forth. FIG. 5A is front view, FIG. 5B is a bottom elevation, FIG. 5C is a right side elevation, and FIG. 5D is perspective view of thermostat 102. Unlike many prior art thermostats, thermostat 102 has a simple and elegant design. Moreover, user interaction with thermostat 102 is facilitated and greatly enhanced over known conventional thermostats. The thermostat 102 includes control circuitry and is electrically connected to an HVAC system 103, such as is shown in FIGS. 1-4. Thermostat 102 is wall mountable, is circular in shape, and has an outer rotatable ring 512 for receiving user input. Thermostat 102 has a large convex rounded front face lying inside the outer rotatable ring 512. According to some embodiments, thermostat 102 is approximately 84 mm in diameter and protrudes from the wall, when wall mounted, by 30 mm. The outer rotatable ring 512 allows the user to make adjustments, such as selecting a new setpoint temperature. For example, by rotating the outer ring 512 clockwise, the real-time (i.e. currently active) setpoint temperature can be increased, and by rotating the outer ring 512 counter-clockwise, the real-time setpoint temperature can be decreased.

The front face of the thermostat 102 comprises a cover 514 that according to some embodiments is polycarbonate, and a lens 510 having an outer shape that matches the contours of the curved outer front face of the thermostat 102. According to some embodiments, Fresnel lens elements may are formed on the interior surface of the lens 510 such that they are not obviously visible by viewing the exterior of the thermostat 102. Behind the lens 510 is a passive infrared (PIR) sensor 550 for detecting occupancy, a temperature sensor that is thermally coupled to the lens 510, and a multi-channel thermopile for detecting occupancy, user approaches, and motion signatures. The Fresnel lens elements of the lens 510 are made from a high-density polyethylene (HDPE) that has an infrared transmission range appropriate for sensitivity to human bodies. The lens 510 may also include thin sections that allow a near-field proximity sensor 552, such as a multi-channel thermopile, and a temperature sensor to "see-through" the lens 510 with minimal interference from the polyethylene. As shown in FIGS. 5A-5D, the front edge of the outer rotatable ring 512, cover 514, and lens 510 are shaped such that they together form an integrated convex rounded front face that has a common outward arc or spherical shape arcing outward.

Although being formed from a single lens-like piece of material such as polycarbonate, the cover 514 has two different regions or portions including an outer portion 514o and a central portion 514i. According to some embodiments, the cover 514 is darkened around the outer portion 514o, but leaves the central portion 514i visibly clear so as to facilitate viewing of an electronic display 516 disposed underneath. According to some embodiments, the cover 514 acts as a lens that tends to magnify the information being displayed in electronic display 516 to users. According to some embodiments the central electronic display 516 is a dot-matrix layout (i.e. individually addressable) such that arbitrary shapes can be generated. According to some embodiments, electronic display 516 is a backlit, color liquid crystal display (LCD). An example of information displayed on the electronic display 516 is illustrated in FIG. 5A, and includes central numerals 520 that are representative of a current setpoint temperature. The thermostat 102 may be constructed such that the electronic display 516 is at a fixed orientation and does not rotate with the outer rotatable ring 512. For some embodiments, the cover 514 and lens 510 also remain at a fixed orientation and do not rotate with the outer ring 512. In alternative embodiments, the cover 514 and/or the lens 510 can rotate with the outer rotatable ring 512. According to one embodiment in which the diameter of the thermostat 102 is about 84 mm, the diameter of the electronic display 516 is about 54 mm. According to some embodiments the curved shape of the front surface of thermostat 102, which is made up of the cover 514, the lens 510 and the front facing portion of the ring 512, is spherical, and matches a sphere having a radius of between 100 mm and 180 mm. According to some embodiments, the radius of the spherical shape of the thermostat front is about 156 mm.

Motion sensing with PIR sensor 550 as well as other techniques can be used in the detection and/or prediction of occupancy. According to some embodiments, occupancy information is used in generating an effective and efficient scheduled program. A second near-field proximity sensor 552 is also provided to detect an approaching user. The near-field proximity sensor 552 can be used to detect proximity in the range of up to 10-15 feet. the PIR sensor 550 and/or the near-field proximity sensor 552 can detect user presence such that the thermostat 102 can initiate "waking up" and/or providing adaptive screen displays that are based on user motion/position when the user is approaching the thermostat and prior to the user touching the thermostat. Such use of proximity sensing is useful for enhancing the user experience by being "ready" for interaction as soon as, or very soon after the user is ready to interact with the thermostat. Further, the wake-up-on-proximity functionality also allows for energy savings within the thermostat by "sleeping" when no user interaction is taking place our about to take place.

According to some embodiments, the thermostat 102 may be controlled by at least two types of user input, the first being a rotation of the outer rotatable ring 512 as shown in FIG. 5A, and the second being an inward push on head unit 540 until an audible and/or tactile "click" occurs. For such embodiments, the head unit 540 is an assembly that includes the outer ring 512, the cover 514, the electronic display 516, and the lens 510. When pressed inwardly by the user, the head unit 540 travels inwardly by a small amount, such as 0.5 mm, against an interior switch (not shown), and then springably travels back out when the inward pressure is released, providing a tactile "click" along with a corresponding audible clicking sound. Thus, for the embodiment of FIGS. 5A-5D, an inward click can be achieved by direct pressing on the outer rotatable ring 512 itself, or by indirect pressing of the outer rotatable ring 512 by virtue of providing inward pressure on the cover 514, the lens 510, or by various combinations thereof. For other embodiments, the thermostat 102 can be mechanically configured such that only the outer ring 512 travels inwardly for the inward click input, while the cover 514 and lens 510 remain motionless.

FIG. 5B and FIG. 5C are bottom and right side elevation views of the thermostat 102. According to some embodiments, the thermostat 102 includes a processing system 560, display driver 564 and a wireless communications system 566. The processing system 560 is adapted to cause the display driver 564 and display 516 to display information to the user, and to receiver user input via the outer rotatable ring 512. The processing system 560, according to some embodiments, is capable of carrying out the governance of the operation of thermostat 102 including various user interface features. The processing system 560 is further programmed and configured to carry out other operations, such as maintaining and updating a thermodynamic model for the enclosure in which the HVAC system is installed. According to some embodiments, a wireless communications system 566 is used to communicate with devices such as personal computers, other thermostats or HVAC system components, smart phones, local home wireless networks, routers, gateways, home appliances, security systems, hazard detectors, remote thermostat management servers, distributed sensors and/or sensor systems, and other components it the modern smart-home environment. Such communications may include peer-to-peer communications, communications through one or more servers located on a private network, or and/or communications through a cloud-based service.

According to some embodiments, the thermostat 102 includes a head unit 540 and a backplate (or wall dock) 542. Head unit 540 of thermostat 102 is slidably mountable onto back plate 542 and slidably detachable therefrom. According to some embodiments the connection of the head unit 540 to backplate 542 can be accomplished using magnets, bayonet, latches and catches, tabs, and/or ribs with matching indentations, or simply friction on mating portions of the head unit 540 and backplate 542. Also shown in FIG. 5A is a rechargeable battery 522 that is recharged using recharging circuitry 524 that uses power from backplate that is either obtained via power harvesting (also referred to as power stealing and/or power sharing) from the HVAC system control circuit(s) or from a common wire, if available. According to some embodiments, the rechargeable battery 522 may include a single cell lithium-ion battery, or a lithium-polymer battery.

Figure 6A:
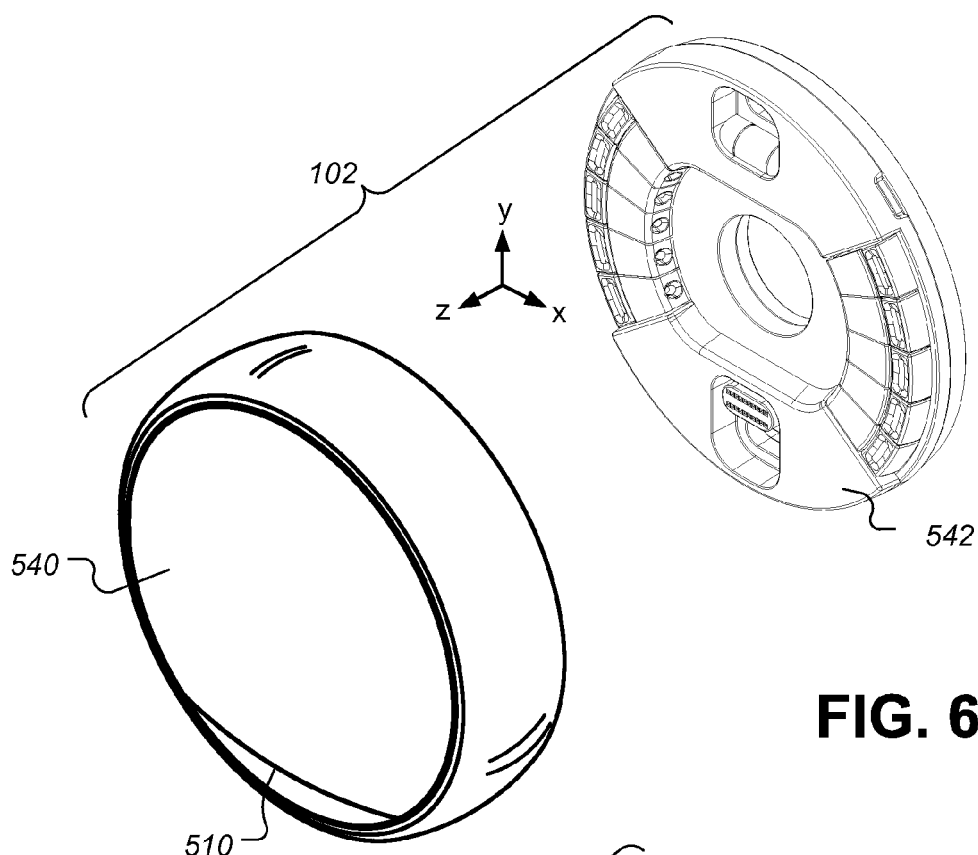
FIG. 6A-6B illustrate exploded front and rear perspective views, respectively, of a thermostat with respect to its two main components, according to some embodiments.
Figure 6B:
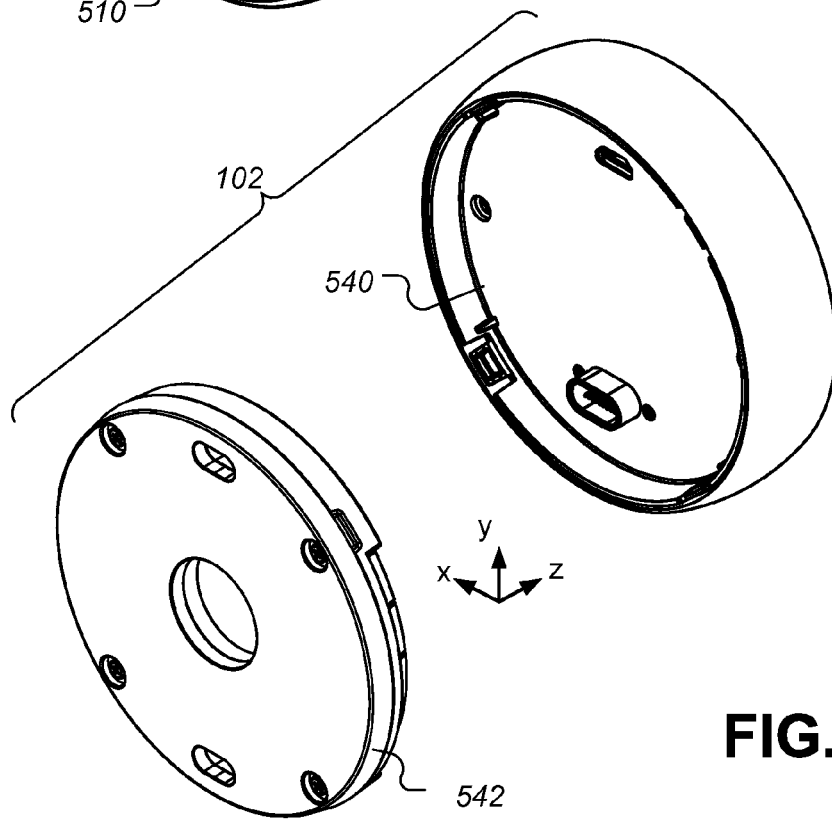

FIGS. 6A-6B illustrate exploded front and rear perspective views, respectively, of the thermostat 102 with respect to its two main components, which are the head unit 540 and the backplate 542. In the drawings shown herein, the "z" direction is outward from the wall, the "y" direction is the toe-to-head direction relative to a walk-up user, and the "x" direction is the user's left-to-right direction.

Figure 6C:
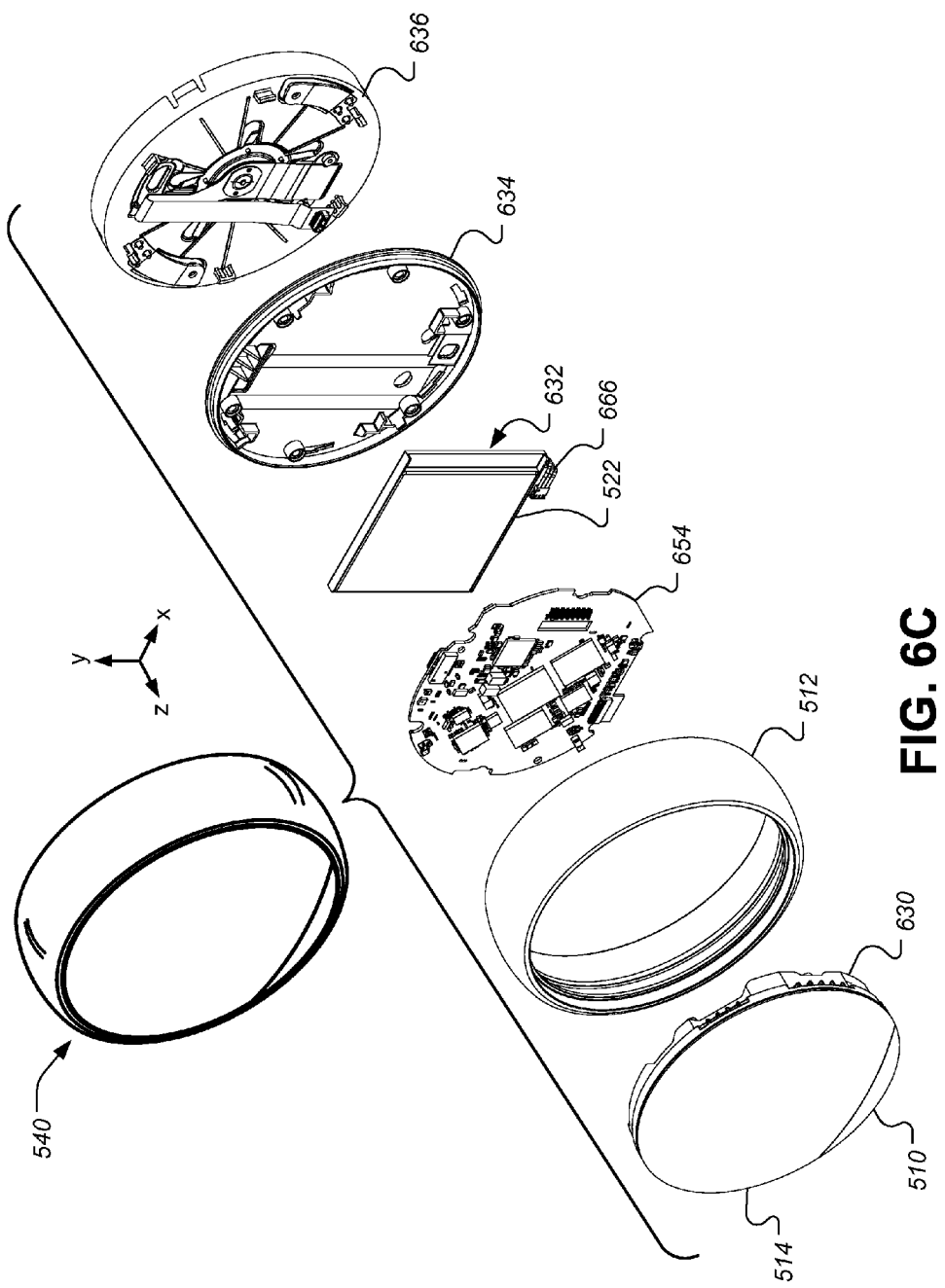
FIG. 6C-6D illustrate exploded front and rear perspective views, respectively, of a head unit with respect to its primary components, according to some embodiments.
Figure 6D:
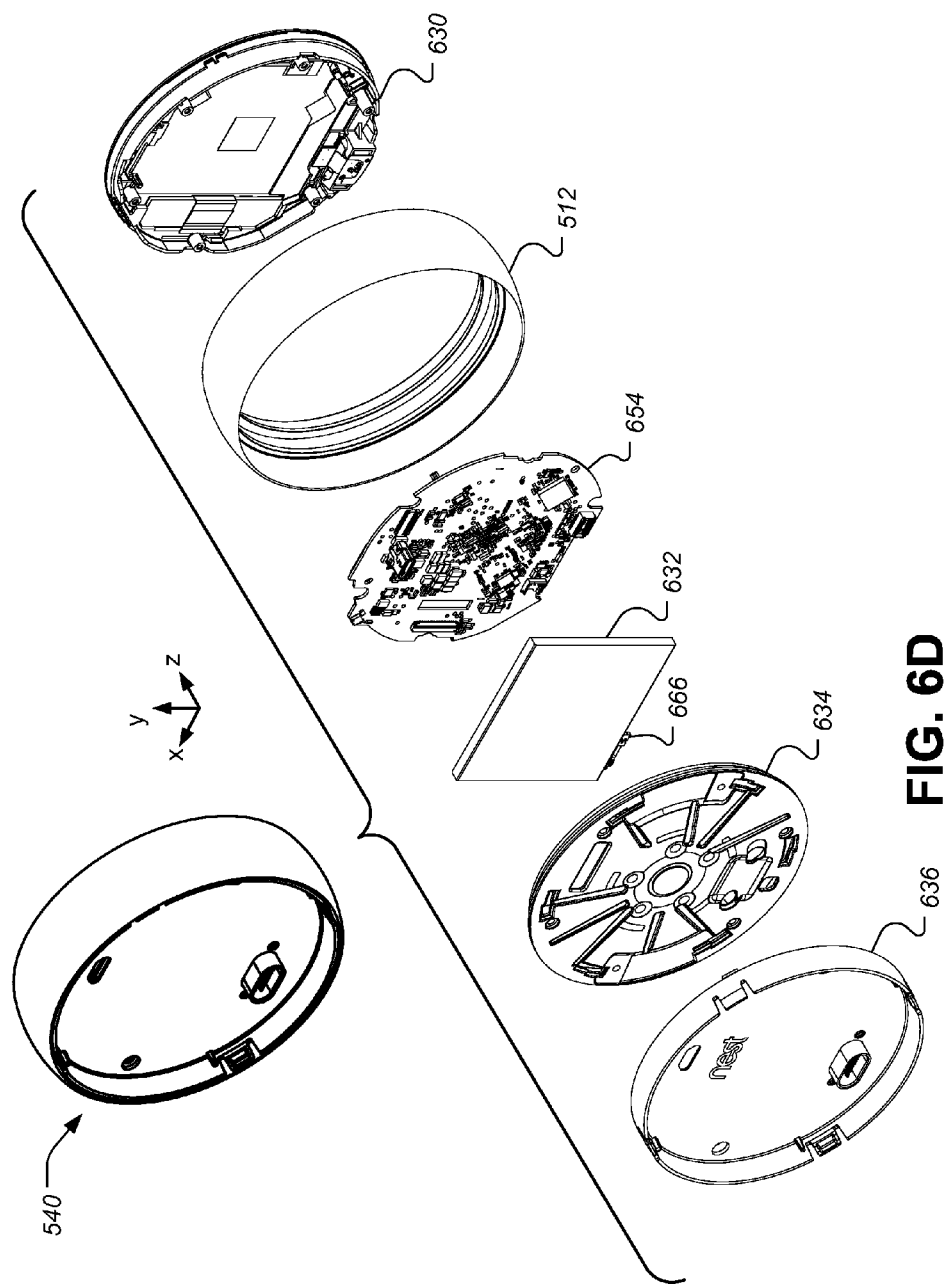

FIGS. 6C-6D illustrate exploded front and rear perspective views, respectively, of the head unit 540 with respect to its primary components. Head unit 540 includes, a back cover 636, a bottom frame 634, a battery assembly 632 with the rechargeable battery 522, a head unit printed circuit board (PCB) 654, the outer rotatable ring 512, the cover 514, and the lens 510. Behind the lens is the display assembly 630, which will be described in relation to FIGS. 6E-6F below. Electrical components on the head unit PCB 654 can connect to electrical components on the back plate 542 by virtue of a plug-type electrical connector on the back cover 636. The head unit PCB 654 is secured to head unit back cover 636 and display assembly 630. The outer rotatable ring 512 is held between a bearing surface on the display assembly 630 and bearing surfaces on the bottom frame 634. Motion of the outer rotatable ring 512 in the z direction is constrained by flat bearing surfaces on the display assembly 630 and bottom frame 634, while motion of the ring in x and y directions are constrained at least in part by circular rounded surfaces on the bottom frame 634. According to some embodiments, the bearing surfaces of the bottom frame 634 and/or the display assembly 630 are greased and/or otherwise lubricated to both smooth and dampen rotational movement for the outer ring 512. The head unit printed PCB 654 may include some or all of processing system 560, display driver 564, wireless communication system 566, and battery recharging circuitry 524 as shown and described with respect to FIG. 5A, as well as one or more additional memory storage components. According to some embodiments, circuitry and components are mounted on both sides of head unit PCB 654. Although not shown, according to some embodiments, shielding can surround circuitry and components on both sides of the head unit PCB 654.

Battery assembly 632 includes a rechargeable battery 522. Battery assembly 632 also includes connecting wires 666, and a battery mounting film that is attached to battery 522 using a strong adhesive and/or the any rear shielding of head unit PCB 654 using a relatively weaker adhesive. According to some embodiments, the battery assembly 632 is user-replaceable.

Figure 6E:
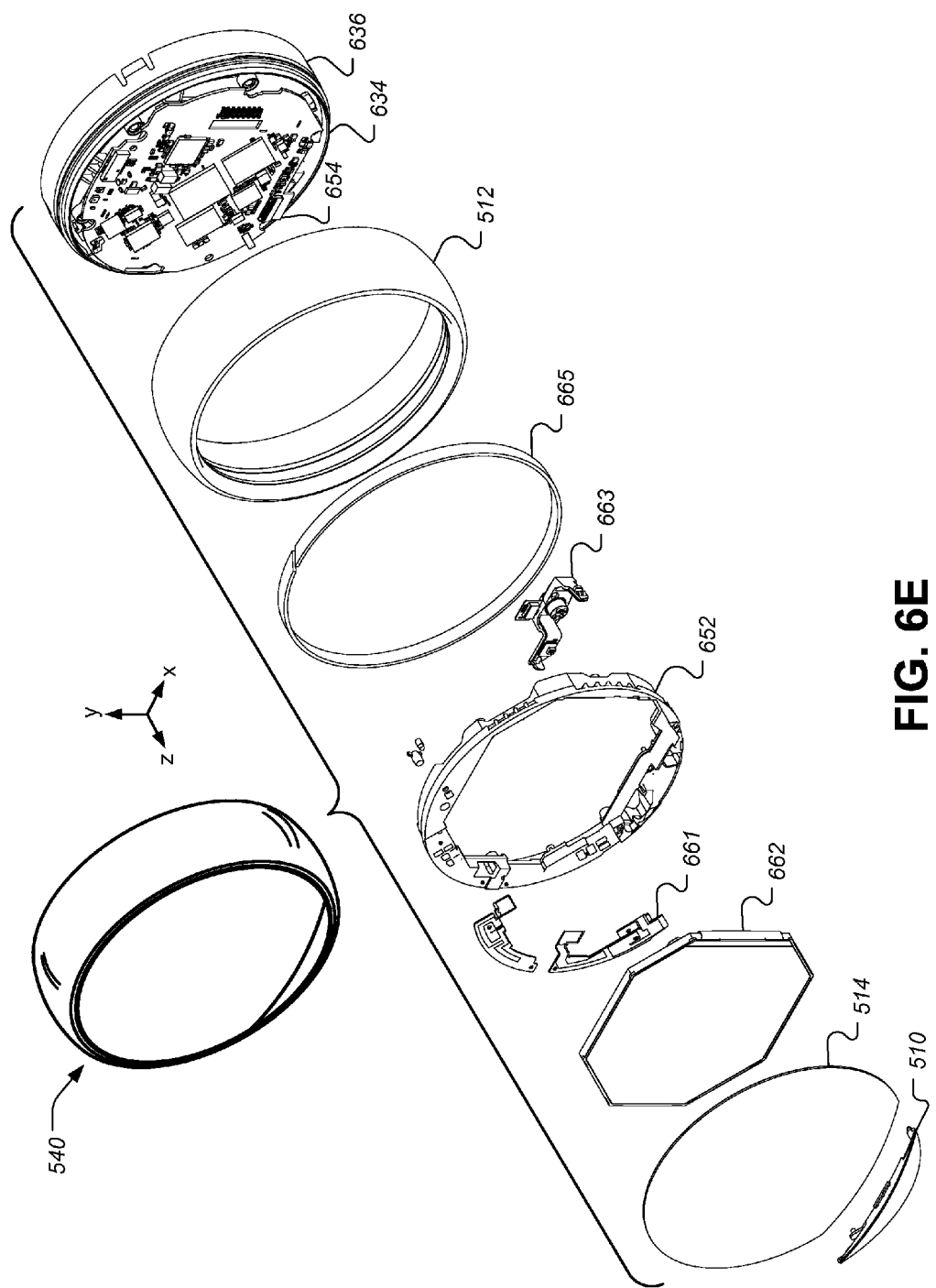
FIG. 6E-6F illustrate exploded front and rear perspective views, respectively, of a head unit display assembly with respect to its primary components, according to some embodiments.
Figure 6F:
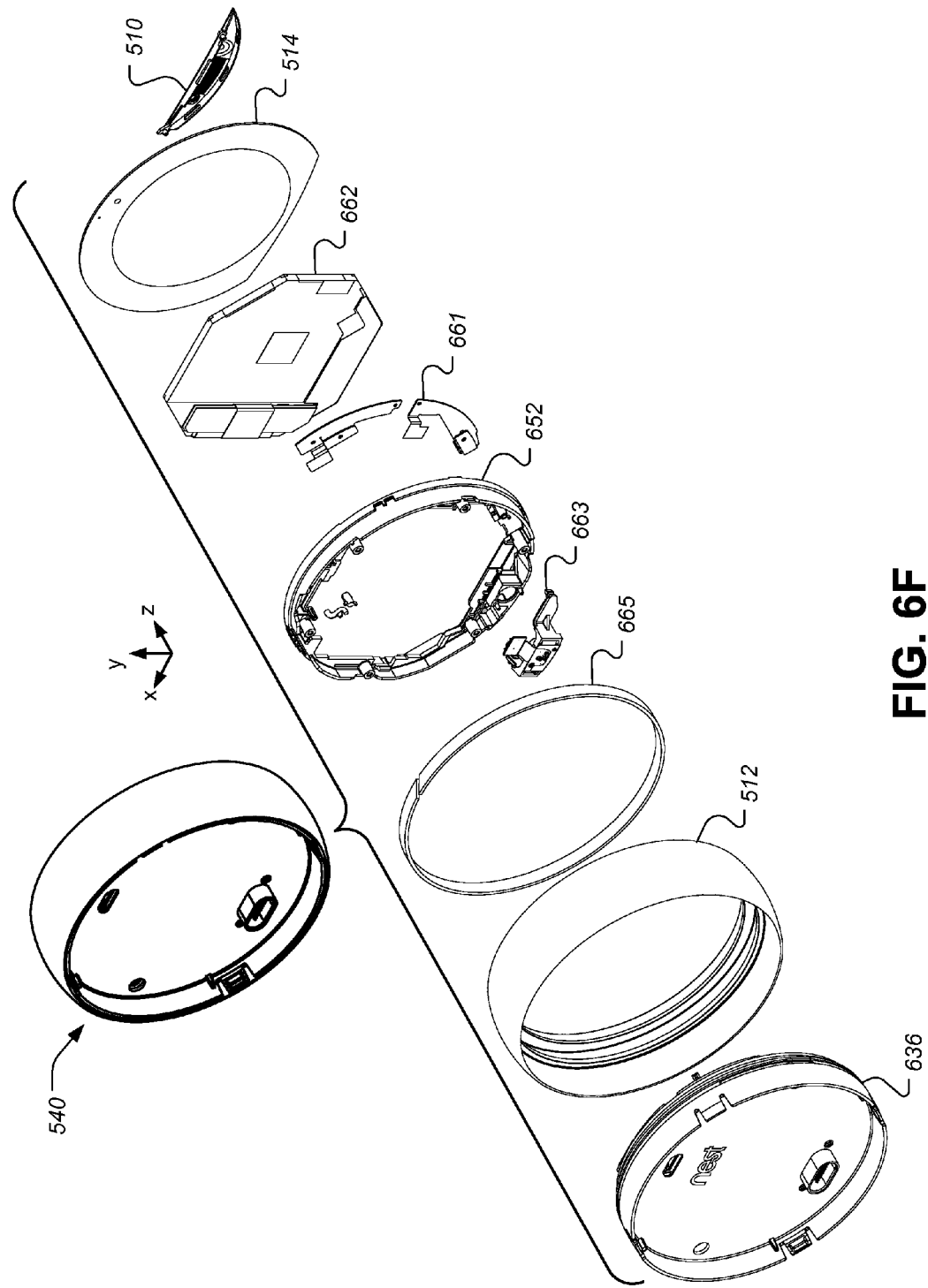

FIGS. 6E-6F illustrate exploded front and rear perspective views, respectively, of the head unit 540 with an exploded view of the display assembly 630. The display assembly 630 comprises the cover 514, the lens 510, an LCD module 662, a pair of RF antennas 661, a head unit top frame 652, a sensor flex assembly 663, and a magnetic ring 665. The sensor flex assembly 663 connects to the head unit PCB 654 using a connector on a flexible PCB. The sensor flex assembly 663 also includes the PIR sensor 550 and the near-field proximity sensor 552. Additionally, the sensor flex assembly 663 may include a temperature sensor IC that is positioned close to the lens 515 so as to accurately measure temperature outside of the thermostat 102 without being overly affected by internal heating of thermostat components. The sensor flex assembly 663 may be comprised of these three sensors, along with a flexible PCB (including the connector for the head unit PCB 654) and a plastic bracket to which the sensors and flexible PCB are mounted. The bracket ensures that the sensor flex assembly 663 is positioned and oriented consistently and correctly with respect to the lens 510. The lens 510 includes two sections that are thinned to approximately 0.3 mm in front of the near-field proximity sensor 552 and the temperature sensor. The lens 510 also includes a section with a Fresnel lens pattern in front of the PIR sensor 550. In some embodiments, additional temperature sensors may be placed throughout the thermostat 102, such as a temperature sensor on the head unit PCB 654 and a temperature sensor on the back plate PCB 680.

The head unit PCB 554 includes a Hall effect sensor that senses rotation of the magnetic ring 665. The magnetic ring 665 is mounted to the inside of the outer rotatable ring 512 using an adhesive such that the outer rotatable ring 512 and the magnetic ring 665 are rotated together. The magnetic ring 665 includes striated sections of alternating magnetic polarity that are diagonally positioned around the magnetic ring 665. The Hall effect sensor senses the alternations between magnetic polarities as the outer ring 512 is rotated. The Hall effect sensor can be controlled by a primary processor, which is a higher powered processor, without excessive power drain implications because the primary processor will invariably be awake already when the user is manually turning the outer rotatable ring 512 to control the user interface. Advantageously, very fast response times can also be provided by the primary processor.

The antennas 661 are mounted to the top surface of the head unit top frame 652. The wireless communications system 566 may include Wi-Fi radios of various frequencies (e.g., 2.4 GHz and 5.0 GHz), along with an IEEE 802.15.4-compliant radio unit for a local-area smart home device network that may include other thermostats, hazard detectors, security system modules, and so forth. The IEEE 802.15.4 unit may use the Thread protocol for achieving such communications. In some embodiments, the wireless communications system 566 may also include a Bluetooth low energy (BLE) radio for communication with user devices.

The processing system 560 may be primarily located on the head unit PCB 654 and may include a primary processor and a secondary processor. The primary processor may be a comparatively high-powered processor, such as the AM3703 chip, or the MCIMX6X3EVK10AB chip from Freescale™, and may be programmed to perform sophisticated thermostat operations, such as time-to-temperature calculations, occupancy determination algorithms, ambient temperature compensation calculations, software updates, wireless transmissions, operation of the display driver 564, and regulation of the recharging circuitry 524. The secondary processor, such as the STM32L chip from ST microelectronics, may be a comparatively low-power processor when compared to the primary processor. The secondary processor may interact with the HVAC system to control a series of FET switches that control the functioning of the HVAC system. The secondary processor may also interface with various sensors in thermostat 102, such as the temperature sensors, a humidity sensor, an ambient light sensor, and/or the like. The secondary processor may also share duties with the primary processor in regulating the recharging circuitry 522 to provide power to all of the electrical systems on board the thermostat 102. Generally, the primary processor will operate in a "sleep" mode until high-power processing operations (e.g., wireless communications, user interface interactions, time-to-temperature calculations, thermal model calculations, etc.) are required, while the secondary processor will operate in an "awake" mode more often than the primary processor in order to monitor environmental sensors and wake the primary processor when needed.

FIGS. 6G-6H illustrate exploded front and rear perspective views, respectively, of the back plate unit 542 with respect to its primary components, according to some embodiments. Back plate unit 542 comprises a back plate rear plate 682, a back plate PCB 680, and a back plate cover 670. Visible in FIG. 6G are the HVAC wire connectors 684 that include integrated mechanical wire insertion sensing circuitry, and relatively large capacitors 686 that are used by part of the power stealing circuitry that is mounted on the back plate PCB 680. According to some embodiments, backplate 542 includes electronics and a temperature/humidity sensor in housing. Wire connectors 684 are provided to allow for connection to HVAC system wires, which pass though the large central circular opening 690, which is visible in each of the backplate primary components. Also visible in each of the backplate primary components are two mounting holes 692 and 694 for use in fixing the backplate to the wall. Also visible in FIGS. 6G-6H are a bubble level 672 to allow the user to install the thermostat 102 in a level position without additional tools.

The back plate PCB 680 also may include approximately seven custom power isolation ICs 685 that isolate the internal electronics of the thermostat 102 from the relatively high 24 VAC signals of the HVAC system. The power isolation ICs 685 are custom software-resettable fuses that both monitor transient and anomalous voltage/current signals on the HVAC power/return wires and switch off the connection to isolate the thermostat against any dangerous signals that could damage the internal electronics. The power isolation ICs 685 receive command signals encoded in a clock square wave from the processing system 560 to open and close a pair of power FETs for each HVAC return wire in order to activate the corresponding HVAC function (e.g., fan, air-conditioning, heat, heat pump, etc.). A complete description of the power isolation ICs 685 is given in the commonly assigned U.S. patent application Ser. No. 14/591,804 filed on Jan. 7, 2015, which is hereby incorporated herein by reference in its entirety for all purposes.

Figure 7:
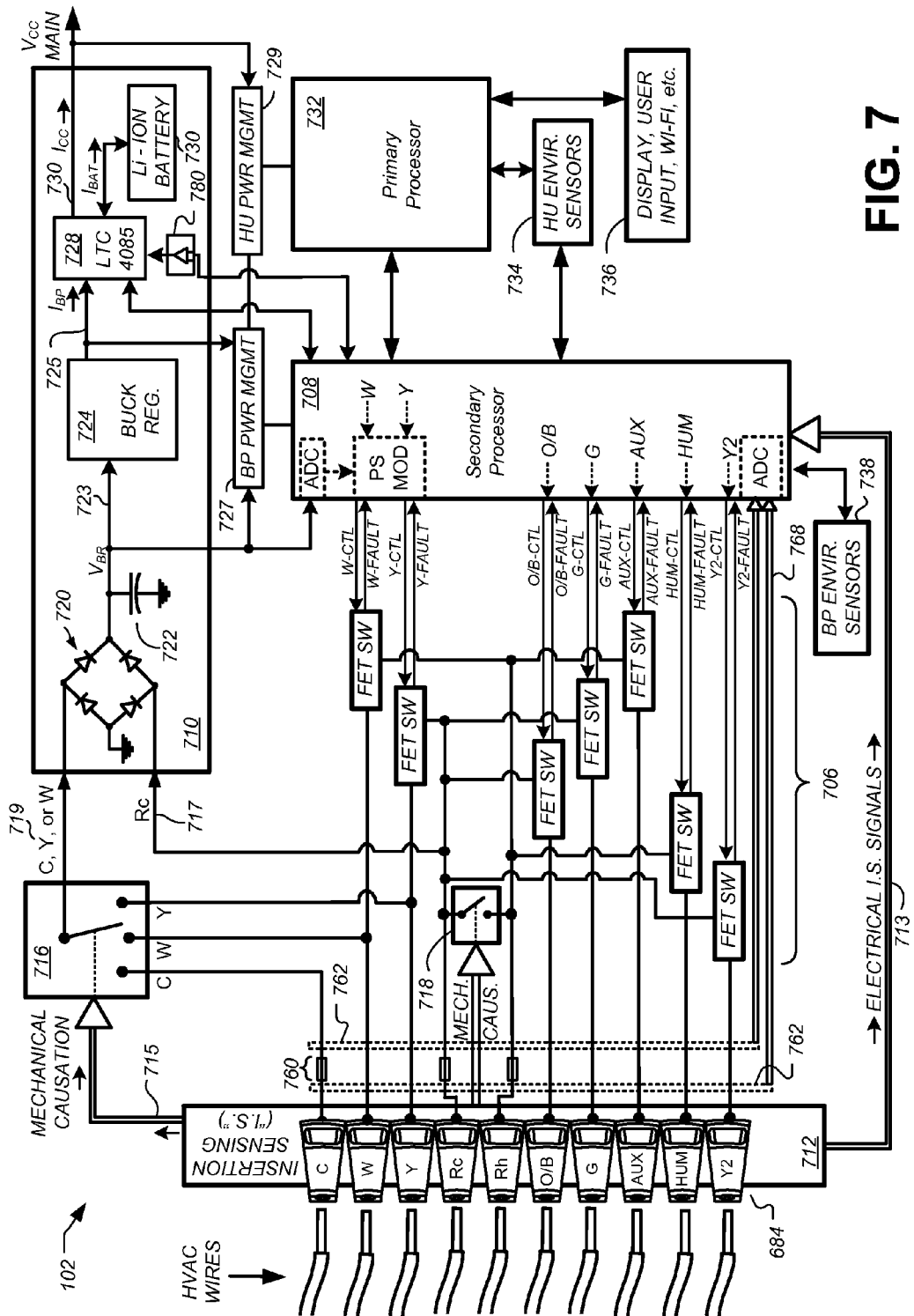
FIG. 7 illustrates a block diagram illustrating circuitry within a thermostat, according to some embodiments.

FIG. 7 illustrates a power management and power harvesting system for a smart thermostat, according to some embodiments. FIG. 7 shows connections to common HVAC wiring, such as a W (heat call relay wire); Y (cooling call relay wire); Y2 (second stage cooling call relay wire); Rh (heat call relay power); Rc (cooling call relay power); G (fan call relay wire); O/B (heat pump call relay wire); AUX (auxiliary call relay wire); HUM (humidifier call relay wire); and C (common wire). As discussed above, the thermostat 102 comprises a plurality of FET switches 706 (such as the power isolation ICs 685 of FIG. 6H above) used for carrying out the essential thermostat operations of connecting or "shorting" one or more selected pairs of HVAC wires together according to the desired HVAC operation. The operation of each of the FET switches 706 is controlled by the secondary processor 708 which can comprise, for example, an STM32L 32-bit ultra-low power ARM-based microprocessor available from ST Microelectronics.

Thermostat 102 further comprises powering circuitry 710 that comprises components contained on both the backplate 542 and head unit 540. Generally speaking, it is the purpose of powering circuitry 710 to extract electrical operating power from the HVAC wires and convert that power into a usable form for the many electrically-driven components of the thermostat 102. Thermostat 102 further comprises insertion sensing components 712 configured to provide automated mechanical and electrical sensing regarding the HVAC wires that are inserted into the thermostat 102. Thermostat 102 further comprises a relatively high-power primary processor 732, such as an AM3703 Sitara ARM microprocessor available from Texas Instruments, that provides the main general governance of the operation of the thermostat 102. Thermostat 102 further comprises environmental sensors 734/738 (e.g., temperature sensors, humidity sensors, active IR motion sensors, passive IR motion sensors, multi-channel thermopiles, ambient visible light sensors, accelerometers, ambient sound sensors, ultrasonic/infrasonic sound sensors, microwave sensors, GPS sensors, etc.), as well as other components 736 (e.g., electronic display devices and circuitry, user interface devices and circuitry, wired communications circuitry, wireless communications circuitry, etc.) that are operatively coupled to the primary processor 732 and/or secondary processor 708 and collectively configured to provide the functionalities described in the instant disclosure.

The insertion sensing components 712 include a plurality of HVAC wiring connectors 684, each containing an internal springable mechanical assembly that, responsive to the mechanical insertion of a physical wire thereinto, will mechanically cause an opening or closing of one or more dedicated electrical switches associated therewith. With respect to the HVAC wiring connectors 684 that are dedicated to the C, W, Y, Rc, and Rh terminals, those dedicated electrical switches are, in turn, networked together in a manner that yields the results that are illustrated in FIG. 7 by the blocks 716 and 718. The output of block 716, which is provided at a node 719, is dictated solely by virtue of the particular combination of C, W, and Y connectors into which wires have been mechanically inserted in accordance with the following rules: if a wire is inserted into the C connector, then the node 719 becomes the C node regardless of whether there are any wires inserted into the Y or W connectors; if no wire is inserted into the C connector and a wire is inserted into the Y connector, then the node 719 becomes the Y node regardless of whether there is a wire inserted into the W connector; and if no wire is inserted into either of the C or Y connectors, then the node 719 becomes the W node. Block 718 is shown as being coupled to the internal sensing components 712 by virtue of double lines termed "mechanical causation," for the purpose of denoting that its operation, which is either to short the Rc and Rh nodes together or not to short the Rc and Rh nodes together. Whether the block 718 will short, or not short, the Rc and Rh nodes together is dictated solely by virtue of the particular combination of Rc and Rh connectors into which wires have been mechanically inserted. Block 718 will keep the Rc and Rh nodes shorted together, unless wires have been inserted into both the Rc and Rh connectors, in which case the block 718 will not short the Rc and Rh nodes together because a two-HVAC-transformer system is present. The insertion sensing circuitry 712 is also configured to provide at least two signals to the secondary processor 708, the first being a simple "open" or "short" signal that corresponds to the mechanical insertion of a wire, and the second being a voltage or other level signal that represents a sensed electrical signal at that terminal. The first and second electrical signals for each of the respective wiring terminals can advantageously be used as a basis for basic "sanity checking" to help detect and avoid erroneous wiring conditions.

Basic operation of each of the FET switches 706 is achieved by virtue of a respective control signal (e.g., W-CTL, Y-CTL) provided by the secondary processor 708 that causes the corresponding FET switch 706 to "connect" or "short" its respective HVAC lead inputs for an ON control signal, and that causes the corresponding FET switch 706 to "disconnect" or "leave open" or "open up" its respective HVAC lead inputs for an "OFF" control signal. By virtue of the above-described operation of block 718, it is automatically the case that for single-transformer systems having only an "R" wire (rather than separate Rc and Rh wires as would be present for two-transformer systems), that "R" wire can be inserted into either of the Rc or Rh terminals, and the Rh-Rc nodes will be automatically shorted to form a single "R" node, as needed for proper operation. In contrast, for dual-transformer systems, the insertion of two separate wires into the respective Rc and Rh terminals will cause the Rh-Rc nodes to remain disconnected to maintain two separate Rc and Rh nodes, as needed for proper operation.

Referring now to the powering circuitry 710 in FIG. 7, provided is a configuration that automatically adapts to the powering situation presented to the thermostat 102 at the time of installation and thereafter. The powering circuitry 710 comprises a full-wave bridge rectifier 720, a storage and waveform-smoothing bridge output capacitor 722 (which can be, for example, on the order of 30 microfarads), a buck regulator circuit system 724, a power-and-battery (PAB) regulation circuit 728, and a rechargeable lithium-ion battery 730. In conjunction with other control circuitry including backplate power management circuitry 727, head unit power management circuitry 729, and the secondary processor 708, the powering circuitry 710 is configured and adapted to have the characteristics and functionality described hereinbelow.

By virtue of the configuration illustrated in FIG. 7, when there is a "C" wire presented upon installation, the powering circuitry 710 operates as a relatively high-powered, rechargeable-battery-assisted AC-to-DC converting power supply. When there is not a "C" wire presented, the powering circuitry 710 operates as a power-stealing, rechargeable-battery-assisted AC-to-DC converting power supply. As illustrated in FIG. 7, the powering circuitry 710 generally serves to provide the voltage Vcc MAIN that is used by the various electrical components of the thermostat 102, and that in one embodiment will usually be about 3.7V~3.95V. The general purpose of powering circuitry 710 is to convert the 24 VAC presented between the input leads 719 and 717 to a steady DC voltage output at the Vcc MAIN node to supply the thermostat electrical power load.

Operation of the powering circuitry 710 for the case in which the "C" wire is present is now described. When the 24 VAC input voltage between nodes 719 and 717 is rectified by the full-wave bridge rectifier 720, a DC voltage at node 723 is present across the bridge output capacitor 722, and this DC voltage is converted by the buck regulator system 724 to a relatively steady voltage, such as 4.4 volts, at node 725, which provides an input current $I_{BP}$ to the power-and-battery (PAB) regulation circuit 728.

The secondary processor 708 controls the operation of the powering circuitry 710 at least by virtue of control leads leading between the secondary processor 708 and the PAB regulation circuit 728, which for one embodiment can include an LTC4085-4 chip available from Linear Technologies Corporation. The LTC4085-4 is a USB power manager and Li-Ion/Polymer battery charger originally designed for portable battery-powered applications. The PAB regulation circuit 728 provides the ability for the secondary processor 708 to specify a maximum value $I_{BP}(max)$ for the input current $I_{BP}$. The PAB regulation circuit 728 is configured to keep the input current at or below $I_{BP}(max)$, while also providing a steady output voltage Vcc, such as 4.0 volts, while also providing an output current Icc that is sufficient to satisfy the thermostat electrical power load, while also tending to the charging of the rechargeable battery 730 as needed when excess power is available, and while also tending to the proper discharging of the rechargeable battery 730 as needed when additional power (beyond what can be provided at the maximum input current $I_{BP}(max)$) is needed to satisfy the thermostat electrical power load.

Operation of the powering circuitry 710 for the case in which the "C" wire is not present is now described. As used herein, "inactive power stealing" refers to the power stealing that is performed during periods in which there is no active call in place based on the lead from which power is being stolen. As used herein, "active power stealing" refers to the power stealing that is performed during periods in which there is an active call in place based on the lead from which power is being stolen.

During inactive power stealing, power is stolen from between, for example, the "Y" wire that appears at node 719 and the Rc lead that appears at node 717. There will be a 24 VAC HVAC transformer voltage present across nodes 719/717 when no cooling call is in place (i.e., when the Y-Rc FET switch is open). For one embodiment, the maximum current $I_{BP}(max)$ is set to a relatively modest value, such as 20 mA, for the case of inactive power stealing. Assuming a voltage of about 4.4 volts at node 725, this corresponds to a maximum output power from the buck regulator system 724 of about 88 mW. This power level of 88 mW has been found to not accidentally trip the HVAC system into an "on" state due to the current following through the call relay coil. During this time period, the PAB regulator 728 operates to discharge the battery 730 during any periods of operation in which the instantaneous thermostat electrical power load rises above 88 mW, and to recharge the battery (if needed) when the instantaneous thermostat electrical power load drops below 88 mW. The thermostat 700 is configured such that the average power consumption is well below 88 mW, and indeed for some embodiments is even below 10 mW on a long-term time average.

Operation of the powering circuitry 710 for "active power stealing" is now described. During an active heating/cooling call, it is necessary for current to be flowing through the HVAC call relay coil sufficient to maintain the HVAC call relay in a "tripped" or ON state at all times during the active heating/cooling call. The secondary processor 708 is configured by virtue of circuitry denoted "PS MOD" to turn, for example, the Y-Rc FET switch OFF for small periods of time during the active cooling call, wherein the periods of time are small enough such that the cooling call relay does not "un-trip" into an OFF state, but wherein the periods of time are long enough to allow inrush of current into the bridge rectifier 720 to keep the bridge output capacitor 722 to a reasonably acceptable operating level. For one embodiment, this is achieved in a closed-loop fashion in which the secondary processor 708 monitors the voltage $V_{BR}$ at node 723 and actuates the signal Y-CTL as necessary to keep the bridge output capacitor 722 charged. According to one embodiment, it has been found advantageous to introduce a delay period, such as 60-90 seconds, following the instantiation of an active heating/cooling cycle before instantiating the active power stealing process. This delay period has been found useful in allowing many real-world HVAC systems to reach a kind of "quiescent" operating state in which they will be much less likely to accidentally un-trip away from the active cooling cycle due to active power stealing operation of the thermostat 102. According to another embodiment, it has been found further advantageous to introduce another delay period, such as 60-90 seconds, following the termination of an active cooling cycle before instantiating the inactive power stealing process. This delay period has likewise been found useful in allowing the various HVAC systems to reach a quiescent state in which accidental tripping back into an active cooling cycle is avoided.

Sensor Flex Assembly

As described above in relation to FIG. 6A-6H, the smart thermostat includes a sensor flex assembly 663 positioned towards the lower front portion of the smart thermostat. The sensor flex assembly includes three different sensors that are used to detect and interpret environmental conditions in the area surrounding the thermostat at the installation location. While some sensors on the smart thermostat can be located internally to measure internal heating, current flow through the power management system, mechanical actuation of the user interface ring, and so forth, other sensors may benefit from being located as close to the outside environment as possible. For example, sensors such as an ambient temperature sensor, an ambient light sensor, a PIR motion detector, and/or a multi-channel thermopile may be used to detect motion, temperature, light, and occupancy within the area surrounding the thermostat. Each of the sensors may require some sort of interface with the outside environment that surrounds the smart thermostat. The sensor flex assembly 663 provides for a mechanical/electrical solution that properly positions and aligns these external-facing sensors such that they can measure external conditions while being positioned inside the housing of the smart thermostat.

Figure 8B:
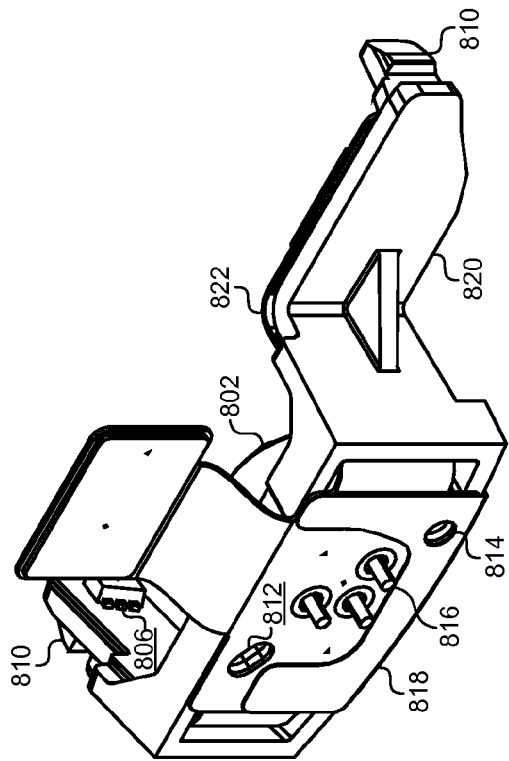
Figure 8A:
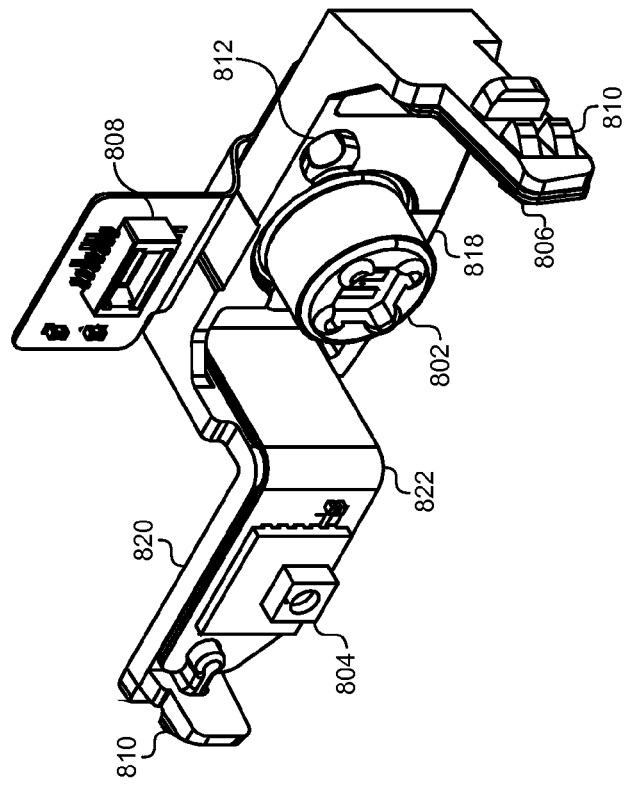
Figure 8F:
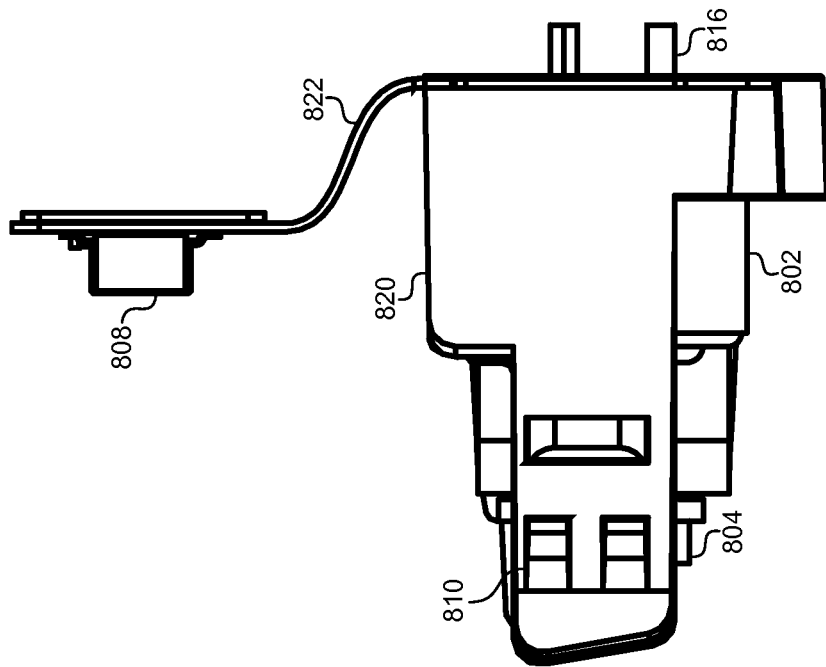
Figure 8E:
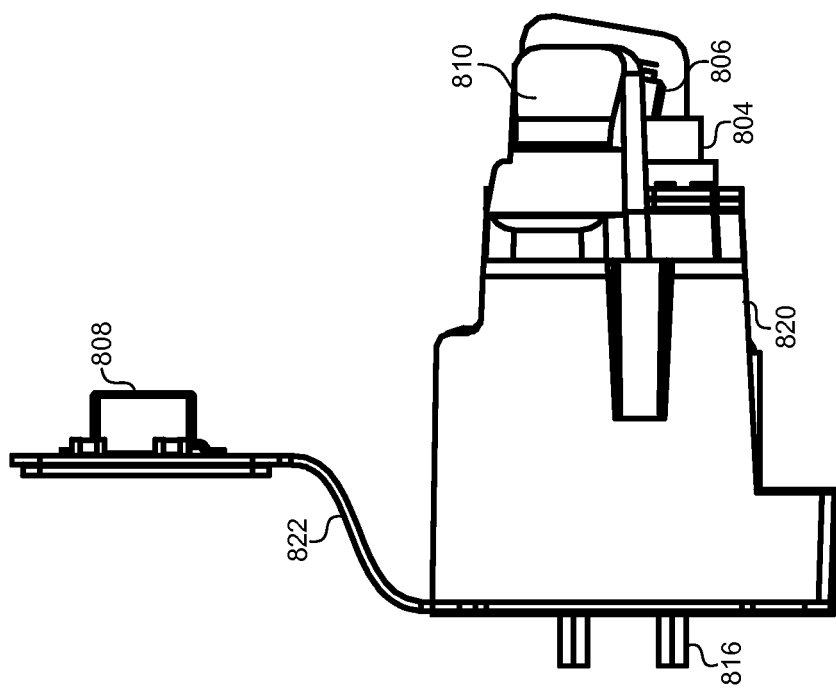

FIGS. 8A-8B illustrate perspective views of the sensor flex assembly. FIGS. 8C-8D illustrate top and bottom views of the sensor flex assembly. FIGS. 8E-8F illustrate left and right side views of the sensor flex assembly. FIGS. 8G-8H illustrate front and back views of the sensor flex assembly. The sensor flex assembly includes at least three different sensors packaged in three separate integrated circuits. The first sensor is a PIR sensor 802 that can detect far-field infrared signals that can be interpreted as motion from a user. The PIR sensor 802 may be implemented using the PYD5731 package from Excelitas™ and may have a responsive range of up to 30 feet. The PIR sensor 802 can be mounted using through-hole pins 816 arranged on the back of the PIR sensor 802 that can be used during installation to ensure that the PIR sensor 802 is oriented in the correct position.

The sensor flex assembly may also include a temperature sensor 806 that is used primarily to detect an ambient temperature in the environment surrounding the smart thermostat. The temperature sensor 806 may be implemented using a TMP112 serial temperature sensor from Texas Instruments™, or another temperature sensor that includes an ambient light sensor (ALS) in the same package. In some embodiments, the temperature sensor 806 may receive a temperature reading through one of the metal pins of the package of the temperature sensor 806. In some embodiments, the temperature sensor 806 may also include an integrated humidity sensor. In addition to locating the temperature sensor 806 as close to the thermostat housing as possible, it may also be desirable to thermally isolate the temperature sensor 806 as much as possible from the rest of the internal circuitry, including the other sensors and systems on the sensor flex assembly.

The sensor flex assembly may also include a multi-channel thermopile 804. The multi-channel thermopile 804 may function as a near-field proximity sensor by detecting infrared energy emitted from occupants as they move within the different responsive ranges of the multiple channels. In some embodiments, the multi-channel thermopile 804 may be implemented using the AsahiKASEI® AK9750 4-channel IR Sensor IC, which uses four quantum IR sensors. The AK9750 also provides outputs from an analog-to-digital converter using 16-bit outputs. These four channels may be arranged such that an up, down, left, and right channel are provided. Using the multi-channel thermopile 804 to detect and interpret user motions and commands will be described in greater detail later in this disclosure.

Each of the three sensor packages may have different placement and orientation requirements in order to maximize their efficiency in detecting the external thermostat conditions. For example, the temperature sensor 806 may need to be located as close to the housing of the thermostat as possible such that the temperature sensor 806 can be coupled to the external environment without being unduly influenced by the internal heating effects of the smart thermostat. Similarly, the multi-channel thermopile 804 may benefit from being located and positioned such that the IR detectors have a wide field of view of the surrounding environment with as little interference from the housing of the thermostat as possible. The PIR sensor 802 may require a predetermined focal length from an IR-energy-directing element, such as a Fresnel lens. The PIR sensor 802 may also require a specific placement and orientation such that it is properly aligned with the Fresnel lens. Despite these different requirements, certain manufacturing and operational efficiencies can be achieved by packaging these three sensors together on the sensor flex assembly. Instead of having to design and place three separate circuit boards at different locations and distances from the front of the thermostat, these three sensors can be assembled and installed together in a single convenient package. For manufacturing purposes, the sensor flex assembly can be manufactured and delivered to the thermostat manufacturer as a complete package. The sensor flex assembly also allows a single connector to facilitate communications between the primary processor and each of the three sensors. Without the sensor flex assembly, three different circuit boards would be required with three different connectors, which would necessarily require a more complex installation and use valuable internal space to route these connections. Providing the sensor flex assembly also makes rework/replacement relatively easy.

In addition to these benefits provided during the manufacturing of the sensor flex assembly, the sensor flex assembly can also make installation easier by guaranteeing that the sensors are properly aligned. The sensor flex assembly may include a plastic bracket 820 that can ensure that the sensors are located and oriented the same across all manufactured units. When installing the sensor flex assembly as a complete piece, the installer can use alignment holes 812, 814 that are matched to pins on the thermostat assembly. Once the sensor flex assembly is properly aligned through the alignment holes 812, 814, clips 810 on each side of the sensor flex assembly can lock the sensor flex assembly in place. This process rigidly fixes the sensor flex assembly into the thermostat and guarantees a consistent positioning alignment of the sensors. A multi-function lens can then be attached in front of the sensor flex assembly, which will guarantee that the sensors are always the desired distance from the lens. The multi-function lens will be described in greater detail below.

In order to eliminate the problems associated with three separate circuit boards for each of the three sensor ICs, a flexible circuit board 822 can be used. The flexible circuit board 822 is comprised of a left wing, to which the multi-channel thermopile 802 can be soldered, a right-wing, to which the temperature sensor 806 can be soldered, a center portion through which the through-hole pins 816 of the PIR sensor 802 can be inserted, and a top wing that includes a connector 808 that can be connected to the main head unit circuit board of the smart thermostat. The left wing and the right wing of the flexible circuit board 822 can be secured to the top of the bracket 820 using adhesives. The center portion of the flexible circuit board 822 can pass behind the bracket 820 and be secured to the center portion of the bracket by soldering the through-hole pins 816 of the PIR sensor 802. By passing the center portion of the flexible circuit board 822 behind the bracket 820, the bracket 820 acts as a spacer between the PIR sensor 802 and the center portion of the flexible circuit board 822. When the through-hole pins 816 of the PIR sensor 802 are soldered to the flexible circuit board 822, solder can possibly wick through the flexible circuit board 822 and short the through-hole pins 816 to the body of the PIR sensor 802. This can result in shorting the power pin to the ground pin of the PIR sensor 822. The spacing provided by the bracket 820 prevents this short from occurring during manufacturing and/or installation.

Some embodiments may include a section of conductive tape 818 that wraps around the body of the PIR sensor 802 and extends around the back of the bracket 820. For example, copper tape may be used as the conductive tape 818. The conductive tape 818 can serve a number of purposes. In some embodiments, the conductive tape 818 can act as a Faraday cage, shielding the PIR sensor 802 from interference from RF energy. The conductive body of the PIR sensor 802 can, in some cases, inadvertently couple RF transmissions into either the sensor or the sensor pins. This can generate an anomalous sensor output when RF transmissions are occurring. As described above, the smart thermostat may include a number of different RF systems, such as a Wi-Fi system (2.4 GHz, 5 GHz), a ZigBee-style radio chip for a local sensor network, a Bluetooth low energy chip to communicate with external devices and/or sensors, and so forth. Each of these chips may generate RF emissions that can be inadvertently coupled to the PIR sensor 802. The conductive tape 818 serves in part to shield the PIR sensor 802 from such interference. Additionally, the conductive tape 818 can tie the conductive body of the PIR sensor 802 to a ground plane on the back side of the flexible circuit board 822.

The orientation of the bracket can guarantee that each of the sensors is properly oriented in relation to the lens on the front of the smart thermostat. The left wing of the bracket 820 and the center portion of the bracket 820 can be oriented at an angle that is approximately parallel to an installation surface such that the multi-channel thermopile 804 and the PIR sensor 802 are oriented such that their fields-of-view emanate perpendicularly away from the plane of the installation surface (e.g., they are directed outwards from a wall into a room). In contrast, the right-wing of the racket 820 is oriented at an angle of between 60° and 80° from the plane of the installation surface. This orientation effectively turns the temperature sensor 806 such that the metal pin/lead of the IC package that receives the external temperature is placed as close as possible to the external environment. Turning the temperature sensor 806 also serves to thermally isolate the metal pin/lead that receives the external temperature from the internal environment of the smart thermostat.

FIG. 9 illustrates a view of the PIR sensor 802, the bracket 820, and the flexible circuit board 822 as they are assembled to form the sensor flex assembly. Before assembly, the multi-channel thermopile 804 and the temperature sensor 806 are soldered to the flexible circuit board 822, along with a handful of other passive circuit components. The left side of the flexible circuit board 822 is fed up through a hole 914 in the bracket 820 and secured to the top side of the bracket with adhesives 910. The notch 904 in the flexible circuit board 822 is aligned with the protrusion 902 on the bracket 820 in order to align the multi-channel thermopile 804 correctly on the bracket 820. The middle section of the flexible circuit board 822 passes beneath the bracket 820. The through-hole pins 816 of the PIR sensor 802 pass through the bracket 820 and the back of the flexible circuit board 822. When the through-hole pins 816 are soldered to the flexible circuit board 822, this joint holds the flexible circuit board 822, the bracket 820, and the PIR sensor 802 together. Finally, the right side of the flexible circuit board 822 passes through a hole 916 in the bracket and is secured to the bracket using an adhesive 912. The portion of the flexible circuit board 822 with the connector 808 is allowed to hang freely such that it can be connected to the main head unit circuit board of the thermostat. Note that the alignment holes 814, 812 pass through flexible circuit board 822 and the bracket 820 in order to avoid stack up errors that would otherwise be aggregated when the separate pieces of the sensor flex assembly were assembled and inserted into the thermostat.

FIGS. 10A-10B illustrate conductor patterns on the flexible circuit board 822 to isolate the temperature sensor 806 from internal heating effects. Modern smart thermostats, such as the smart thermostat described herein, may include a number of heat-generating components that, when active, will generate an excessive amount of heat internal to the thermostat. This internal heat generation can distort measurements made by temperature sensors that are located within the housing of the thermostat. In order to minimize the effects of internal heating, the temperature sensor 806 can be located on the flexible circuit board 822 in a manner that minimizes thermal conduction of heat from the body of the thermostat into the temperature sensor 802.

The flexible circuit board 822 may include layers that are constructed from polymer, nylon, plastic, and/or any other material that act as a thermal isolator. Thus, the flexible circuit board itself will generally not conduct a great deal of heat unless there are copper traces that would allow for heat conduction. In order to isolate the temperature sensor 806, only a minimal amount of copper may be used on the area surrounding the temperature sensor 806. As illustrated by FIGS. 10A-10B, ground and/or power planes on the flexible circuit board 822 have been removed from the right side of the flexible circuit board 822 in order to prevent these copper planes from conducting heat from the rest of the thermostat to the temperature sensor 806. Only four very small copper traces are required to communicate power, ground, and serial communication to the connector 808 from the temperature sensor 806. All other unnecessary copper has been removed. Generally, the rest of the flexible circuit board 822 will include signals that are sandwiched between two ground planes in order to shield those signals from the RF interference described above.

FIGS. 10C-10D illustrate the passive component layout on the flexible circuit board 822 to further isolate the temperature sensor 806 from internal heating effects. Passive components 1002, 1004, 1006 can be used to filter out noise from the RF interference described above. Component values can be chosen specifically to cause the PIR sensor 802 to "float", or appear as a disconnected high impedance at the two specific RF frequencies likely to be encountered (2.4 GHz and 5.0 GHz). Components must be selected such that they are tuned to this wide frequency range. For example, in one embodiment, three inductors are used to in conjunction with the PIR sensor 802, and two bypass capacitors are used near the connector 808.

FIGS. 11A-11B illustrates various views of a multifunction lens element. This lens may correspond to the lens 510 in FIGS. 5A-5D. The lens can be fabricated from a single piece of high-density polyethylene (HDPE). This material is transparent to the wavelengths of the multi-channel thermopile 804 and the PIR sensor 802. Because the lens is fabricated from a single piece of HDPE, several lens elements do not have to be aligned individually with the corresponding sensors on the sensor flex assembly. Instead, the entire lens can be snapped into place on the body of the thermostat and the different sections of the lens can be guaranteed to be properly aligned with their corresponding sensors on the sensor flex assembly.

A multi-channel thermopile lens area 1102 can be fabricated into the lens at the area directly in front of the multi-channel thermopile 804. The closer the multi-channel thermopile 804 can be to the lens, the smaller the radius of the multi-channel thermopile lens area 1102 needs to be. The multi-channel thermopile 804 is used to detect the frequency of light looking straight out from the sensor. Therefore, the thinner the lens, the less interference will be caused by the lens, and the more accurate and/or sensitive the multi-channel thermopile 804 can be. Similarly, a temperature sensor lens area 1106 can be fabricated in the lens at the area directly in front of the temperature sensor 806. Both the temperature sensor 806 and the multi-channel thermopile 804 benefit from the lens being as thin as possible in front of the sensors. Therefore, it may be beneficial for the multi-channel thermopile 804 and the temperature sensor 806 to be precisely positioned in relation to their corresponding lens areas 1102, 1106.

The center of the lens includes a Fresnel lens 1104 that is positioned in front of the PIR sensor 802 and designed to direct infrared energy that is incident on the lens onto the detectors of the PIR sensor 802. There are two sensor regions on the PIR sensor 802, one on the left, and the other on the right. The Fresnel lens 1104 includes six different bands. Three of the six bands direct IR energy onto the left region of the PIR sensor 802, and the other three bands direct IR energy onto the right half of the PIR sensor 802.

The ridges for the Fresnel lens 1104 and the radius cutout lens areas 1102, 1106 can be integrally formed into the lens during manufacturing. In one embodiment, the entire lens can be injection molded with the lens patterns inserted into the injection mold. To install the lens, holes 1112 in the bottom of the lens can fit into clips on the body of the thermostat, and the tabs 1108 can be inserted into corresponding recesses in the body of the thermostat. The lens will generally be constructed from a flexible material, so the tabs 1108 can be inserted first, and the holes 1112 can then be clicked into place. Because this only allows the lens to be installed in a single correct position, it guarantees that the corresponding lens areas 1102, 1106 and Fresnel lens 1104 will be properly aligned with their corresponding sensors.

Figure 11C:
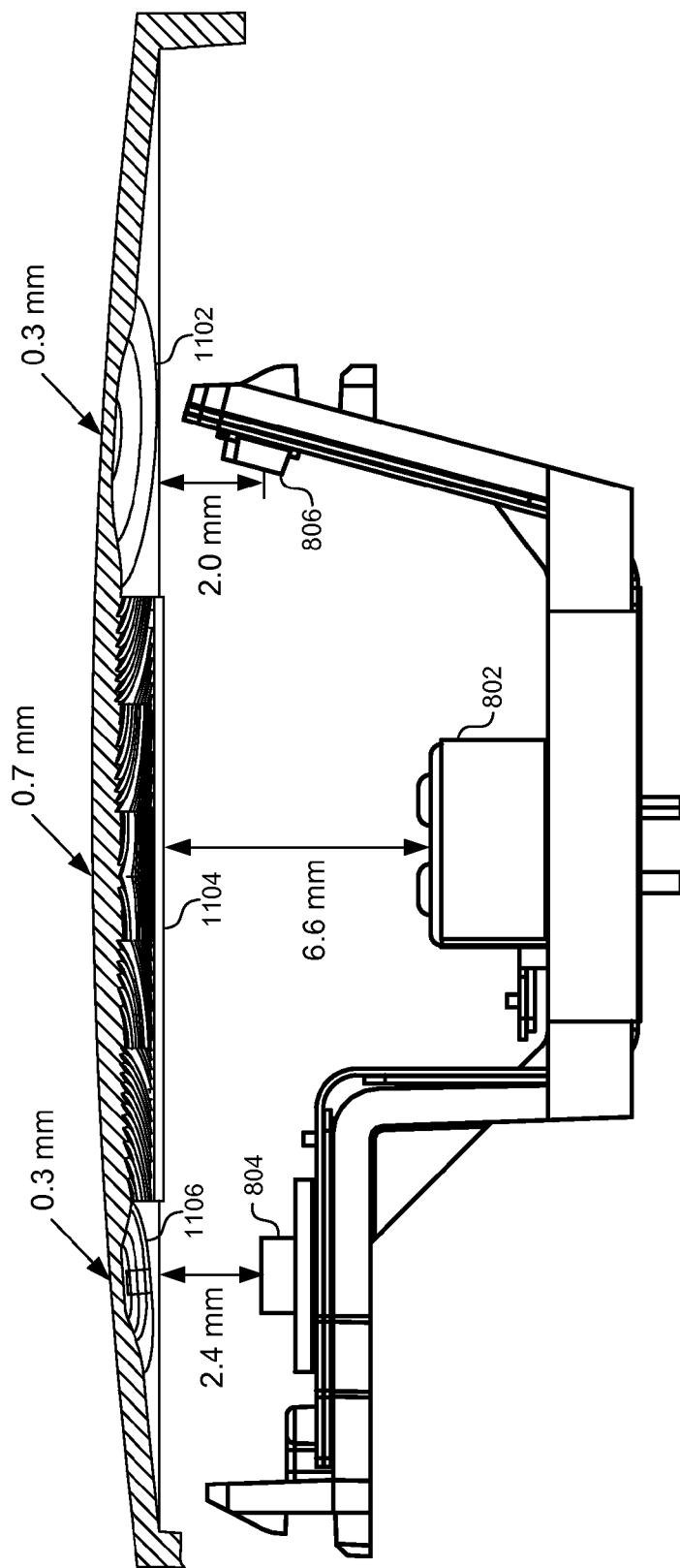

FIG. 11C illustrates how the lens can be installed relative to the sensor flex assembly, according to some embodiments. Note that FIG. 11C is not drawn to scale, but is instead intended to illustrate sensor alignment rather than absolute dimensions. Lens areas 1102, 1106 in front of the multi-channel thermopile 804 and the temperature sensor 806 may be thicknessed to approximately 0.3 mm. The rest of the lens, including the area for the Fresnel lens 1104 may be thickness to approximately 0.7 mm. In order to further couple the temperature sensor 806 to the external environment and isolate the temperature sensor 806 from internal heating of the thermostat, any gap between the temperature sensor 806 and the lens area 1102 can be filled with thermal grease, such as Fujipoly Sarcon No. SPG-30A thermal grease.

In contrast to the multi-channel thermopile 804 and the temperature sensor 806, the PIR sensor 804 requires a certain focal length between the Fresnel lens 1104 and the PIR sensor 802. In some embodiments, this focal length will be between 6 mm and 8 mm. As illustrated by FIG. 11C, the PIR sensor 802 can be positioned approximately 6.6 mm behind the Fresnel lens 1104.

Figure 11E:
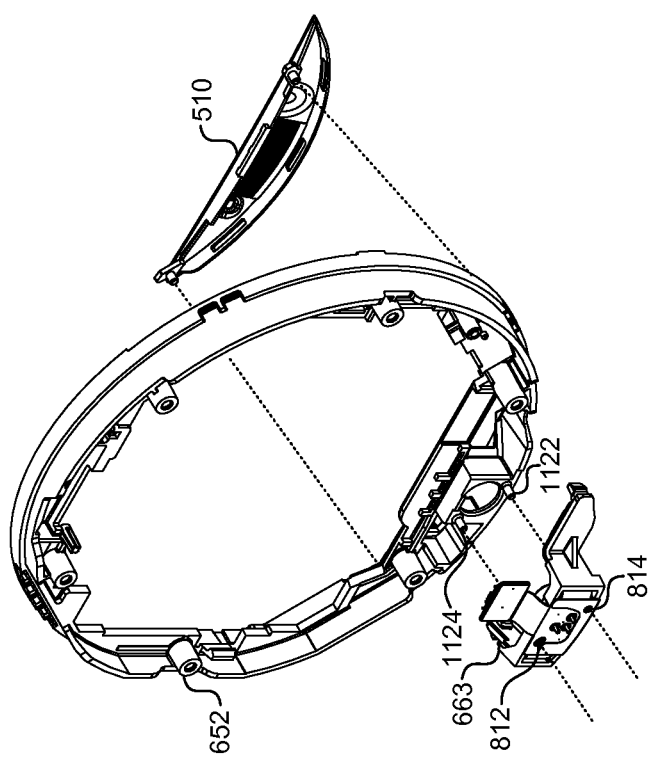
Figure 11D:
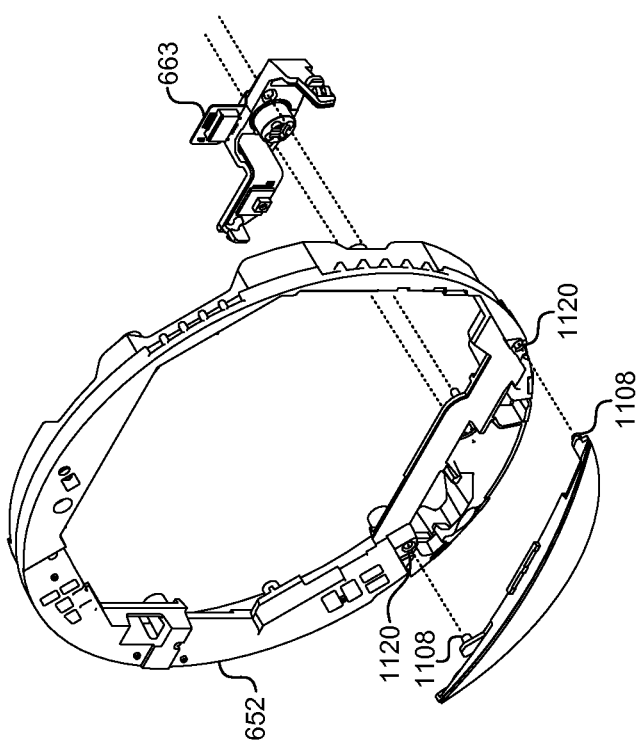

FIGS. 11D-11E illustrate an assembly procedure for the lens 510, the sensor flex assembly 663 and the head unit top frame 652 as depicted in FIGS. 6A-6H above. As used herein, the term "sensor mount assembly" may be used to refer to the sensor flex assembly 663, comprised of the bracket, the flexible circuit board, and the various sensors including the PIR sensor. As used herein, the term "lens assembly" may refer to the lens 510. As used herein, the term "frame member" may be used to refer to the head unit top frame 652, as well as generically referring to any rigid or semi-rigid frame element to which the sensor mount assembly and the lens can be aligned.

Alignment features on the lens assembly 510, the sensor mount assembly 663, and the frame member 662 can be used to assemble all three elements and ensure that the sensors are properly aligned and spaced relative to the lens assembly 510. The tabs 1108 on the lens assembly 510 may be referred to as "alignment features" and/or "a second alignment feature." Similarly, the alignment holes 812, 814 on the sensor mount assembly 663 may be referred to as "alignment features" and/or "a first alignment feature." The frame member 652 may include "a third alignment feature" 1122, 1124 comprised of posts that fit through the alignment holes, and which may be said to be matably coupled with the first alignment feature 812, 814. Similarly, the frame member 652 may include holes comprising "a fourth alignment feature" 1120 that can be coupled with the second alignment feature 1108 on the lens assembly 510 to ensure accurate assembly.

Presence and Motion Detection System

Some embodiments described herein detect the presence of a user in close proximity to a smart-home device and change the operation of the smart-home device accordingly. For example, a smart thermostat may include an advanced user interface that includes scrollable menus, graphical scheduling, setpoint temperature interfaces, animations, and so forth. These advanced operations performed by the user interface are often very power intensive, which can place a strain on the power management system of the smart thermostat when operated too frequently. Therefore, the smart thermostat may utilize proximity sensors and other presence-detecting inputs to determine when a user is approaching the thermostat with the intent to interact with the user interface. This allows the smart thermostat to judiciously conservative its resources, only activating the user interface when necessary for a positive user experience.

The smart thermostat described above includes two different types of proximity sensors. The first proximity sensor has a far-field range extending between 15 feet and 30 feet outwards from the thermostat. In other embodiments, the first proximity sensor may include a far-field range extending between 0 feet and 50 feet, depending on the particular type of hardware sensor used. A second proximity sensor has a near-field range that that may only extend 5 feet to 10 feet outwards from the thermostat. The far-field proximity sensor can be used to generally detect the presence of a user within an enclosure, such as a home. When a presence is detected in the home, the thermostat may continue to operate in a normal mode, controlling the HVAC system as programmed according to a setpoint schedule. However, when no presence is detected in the home, the thermostat may enter into an "auto-away" mode, where the setpoint temperature is raised/lowered in order to conserve energy when the home is unoccupied. The far-field proximity sensor is useful for this operation because it can generally detect users that are within the field of view of thermostat. However, the far-field proximity sensor and proximity sensors in general may have other applications in the smart thermostat beside simply being used for the "auto-away" feature.

The second proximity sensor has a near-field range that can also be used to detect user presence, and can also be useful in detecting users approaching the thermostat in order to interact with the thermostat. Turning the user interface on can provide a welcoming user experience and allows users to see the current temperature, the setpoint temperature, and a current HVAC function without needing to touch the user interface. By detecting a user approach, the thermostat can balance a delicate power-management trade-off, deactivating the user interface when users are not intending to interact with the thermostat, and activating user interface upon user approach.

In some embodiments, user approach is detected when the user first comes within range of the far-field proximity sensor. If the user then moved into the range of the near-field proximity sensor, the user interface would activate. This method for detecting a user approach is described fully in the commonly-assigned U.S. Pat. No. 8,560,128, which is incorporated herein by reference.

In the embodiments described herein, a more advanced second proximity sensor is presented. Specifically, a multi-channel IR thermopile is used to not only detect a user presence within the near-field range, but also to characterize the motion of the user. For example, a proximity sensor with a left channel, a center channel, and a right channel may distinguish between a user moving from left to right walking past the thermostat, a user moving right to left walking past the thermostat, and a user approaching the thermostat from the right in order to interact with the thermostat. Responses from the various channels of the near-field proximity sensor can be used to identify these types of movement patterns. These sensed patterns can be compared to known patterns that indicate that the user is approaching the thermostat in order to interact with the thermostat. Using this information, thermostat systems, such as the user interface, can be more judiciously activated based on user movements.

Once a user has approached the thermostat in order to interact with the user interface, the near-field proximity sensor can perform additional functions. A user can use hand gestures, such as waving their hands from left to right or up and down in order to provide commands to the user interface without touching the thermostat. For example, waving from left to right can activate user menus or scroll back and forth between menu options. Moving the hand of the circular motion (which may sequentially activate a left channel, a down channel, a right channel, an up channel, and so forth) may be used to indicate a user command similar to the rotation of the metal ring around the perimeter of the thermostat. Other command types and uses of the near-field proximity sensor to provide information to the thermostat based on user movements will be described in greater detail below.

Figure 12:
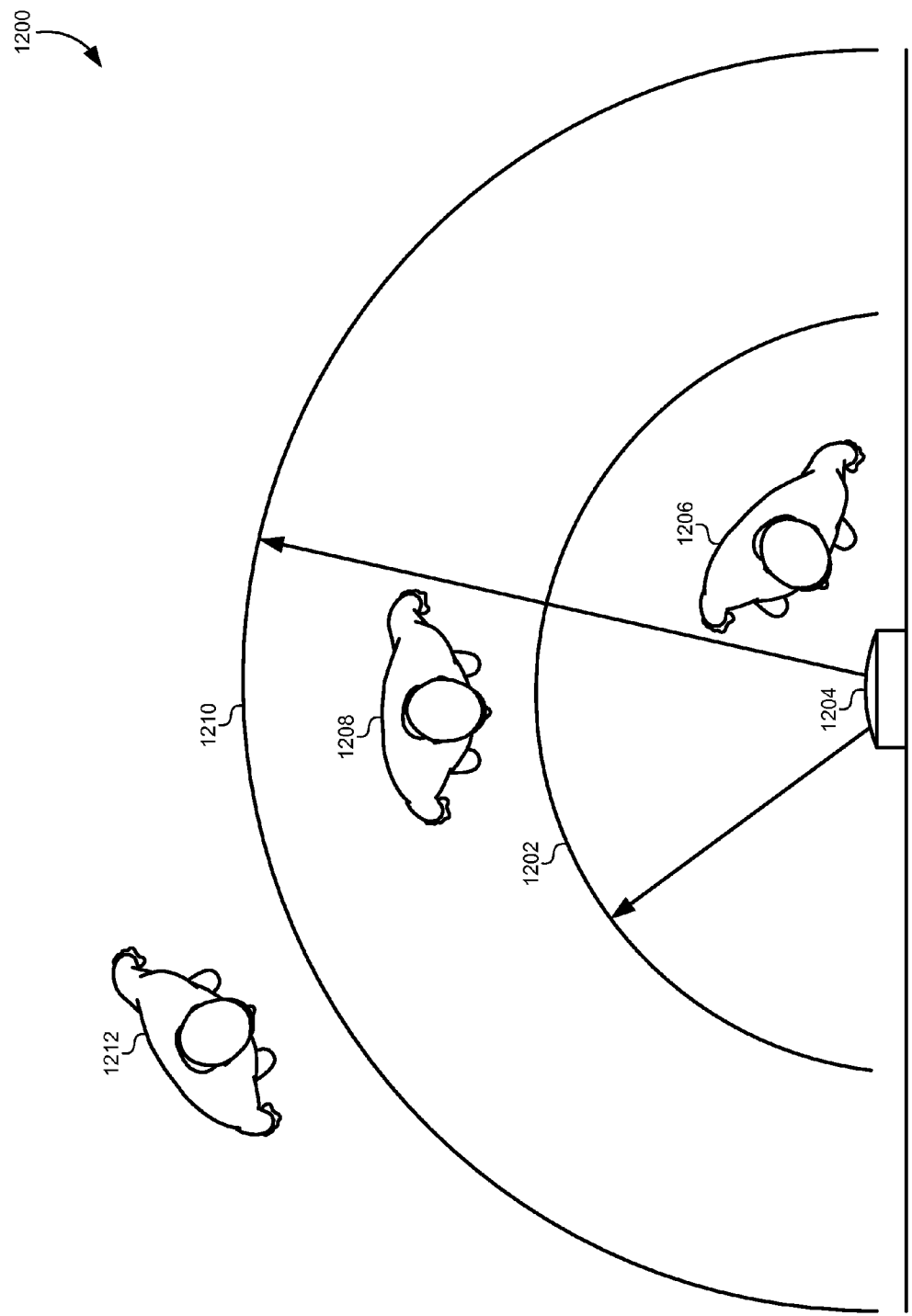
FIG. 12 illustrates a near-field proximity sensor range and a far-field proximity sensor range, according to some embodiments.

FIG. 12 illustrates a near-field proximity sensor range 1202 and a far-field proximity sensor range 1210, according to some embodiments. User 1212 is outside of the far-field proximity sensor range 1210. Therefore, the far-field proximity sensor on the smart-home device 1204 would not generate a response, and the smart-home device 1204 would not "see" user 1212. Because user 1212 is outside of the far-field proximity sensor range 1210, the smart-home device 1204 may eventually enter into an auto-away mode unless the user 1212 moves closer to the smart-home device 1204.

User 1208 is inside the far-field proximity sensor range 1210, but outside of the near-field proximity sensor range 1202. At this stage, the smart-home device 1204 will "see" user 1208, and would know that the enclosure is occupied. This should prevent the smart-home device 1204 from entering into an auto-away mode. While the user 1208 is still far enough away from the smart-home device 1204 that the user interface will not be activated, the smart-home device 1204 can begin watching for different channels of the near-field proximity sensor to generate a response above a predetermined threshold. In this sense, a response from the far-field proximity sensor can enable the processing system of the smart-home device 1204 to begin acting on responses from the near-field proximity sensor. This can serve as a guard band in some embodiments against false positives by requiring that a user progress through the far-field proximity sensor range 1210 and then the near-field proximity sensor range 1202 before taking action such as activating the user interface.

In contrast, user 1206 has entered into the near-field proximity sensor range 1202. In some embodiments, surpassing a single threshold indicating that the user has approached the smart-home device 1204 may be enough to take an action such as activating the user interface. In other embodiments, the type of motion, or the way that the user 1206 approaches the smart-home device 1204 can be compared to predetermined movements signatures to determine whether the user 1206 is approaching the smart-home device 1204 in order to interact with the user interface, or if the user 1206 is merely walking past the smart-home device 1204. Some users may be annoyed when the user interface is activated as they walk by the smart-home device 1204 when they did not intend to interact with the smart-home device 1204. Needless activation may be seen as a waste of energy or a distraction. By comparing the current motion signature to predetermined movements signatures, a determination may be made by the smart-home device 1204 regarding the intention of the user 1206.

As used herein, the term "motion signature" may be used to describe a sequence of directional indications that correspond to responses generated by different channels of the near-field proximity sensor. For example, a motion signature may be as simple as "left, center, right" as a user moves through the respective responses zones of the near-field proximity sensor. In a four-channel proximity sensor, the "center" response may correspond to a response on the down channel, a response on the up channel, and/or a combination of responses on the up and down channels. In another example, a motion signature may include indications of when a user enters and/or leaves an area covered by a channel of the sensor. For example, when entering the area covered by the left channel, the motion signature may include an indication of an "arrival:left." When the user leaves the area covered by the left channel, the motion signature may include an indication of a "departure:left." Arrival/departure indications for one or more zones may be combined to form the total motion signature. Motion signature examples will be described in greater detail below.

Figure 13:
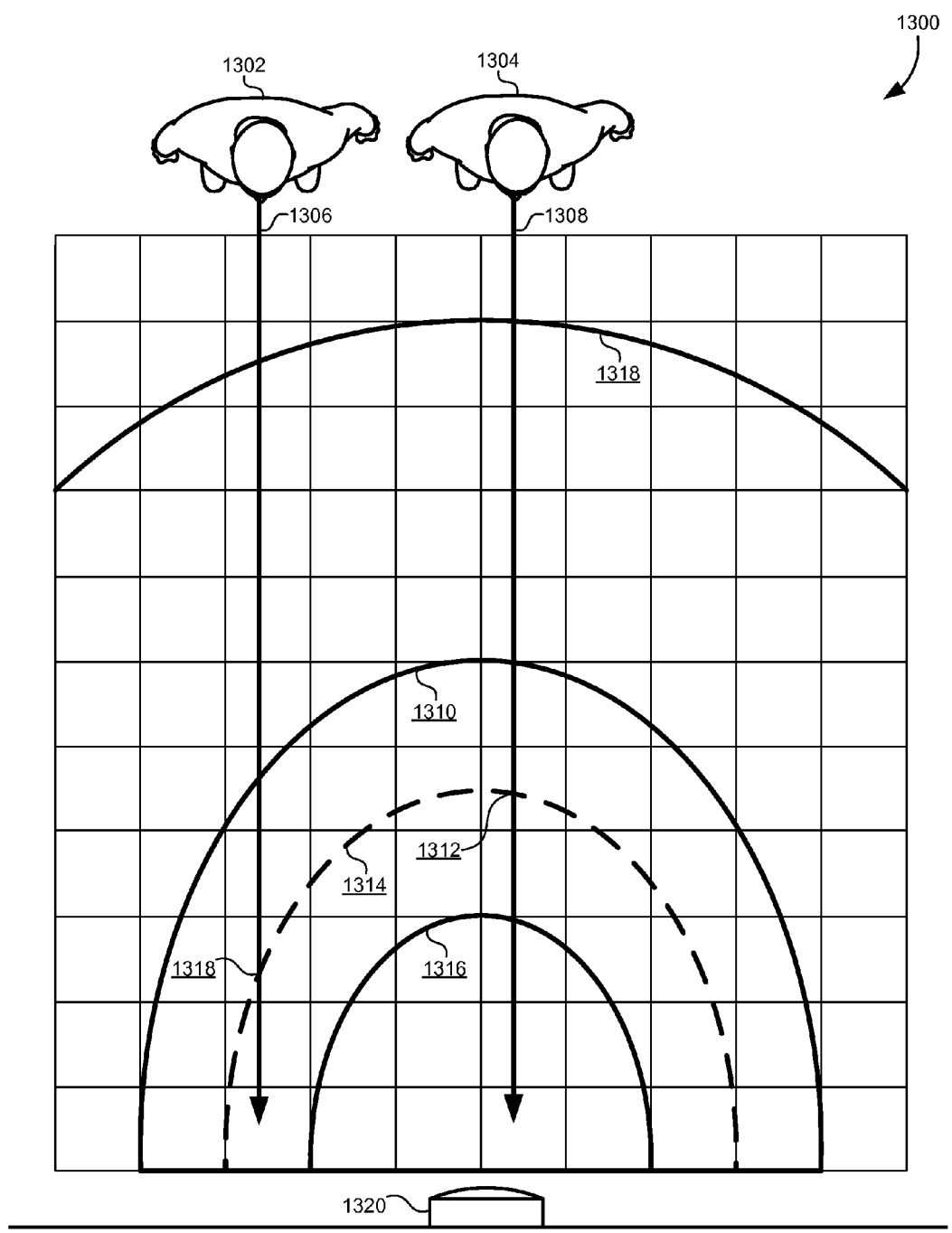
FIG. 13 illustrates a diagram of movements perpendicular to the plane of the smart-home device, according to some embodiments.

FIG. 13 illustrates a diagram of movements perpendicular to the plane of the smart-home device 1320, according to some embodiments. Range 1318 indicates the range of the far-field proximity sensor. The range of the near-field proximity sensor may begin at range 1310, and begin to generate responses between range 1310 and range 1316. At range 1316, a user moving towards the smart-home device 1320 is expected to generate a response. Beyond range 1310, a user moving towards the smart-home device 1320 is not expected to generate a response. Between range 1310 and range 1316 a user moving towards the smart-home device 1320 will begin to generate a response. Range 1314 represents a threshold value when a response is sufficient to be considered an indication of motion.

In one example, user 1302 moves in a straight path 1306 towards a wall on which the smart-home device 1320 is mounted, but not directly towards the smart-home device 1320. When the user 1302 crosses the threshold of range 1314 at location 1318, the near-field proximity sensor of the smart-home device 1320 should generate a response on one or more of the channels. Depending on how the channels are arranged, user 1302 should generate a response on the left channel, and may also generate a response on the up/down channel.

In another example, user 1304 moves in a straight path 1308 directly towards the smart-home device 1302 and perpendicular to the plane of the smart-home device 1302. When the user 1304 crosses range 1314 at location 1312, one or more of the channels of the near-field proximity sensor should generate a response. In this case, it is very likely that the up/down channel of the near-field proximity sensor will generate a strong response. It is also possible that the left channel and/or the right channel may also generate weaker responses.

Sample paths 1306 and 1308 such as those described above can be used as training data to define the threshold level for range 1314. An optimal threshold will usually generate a positive response for path 1308, while path 1306 should be right on the edge of the threshold.

Figure 14:
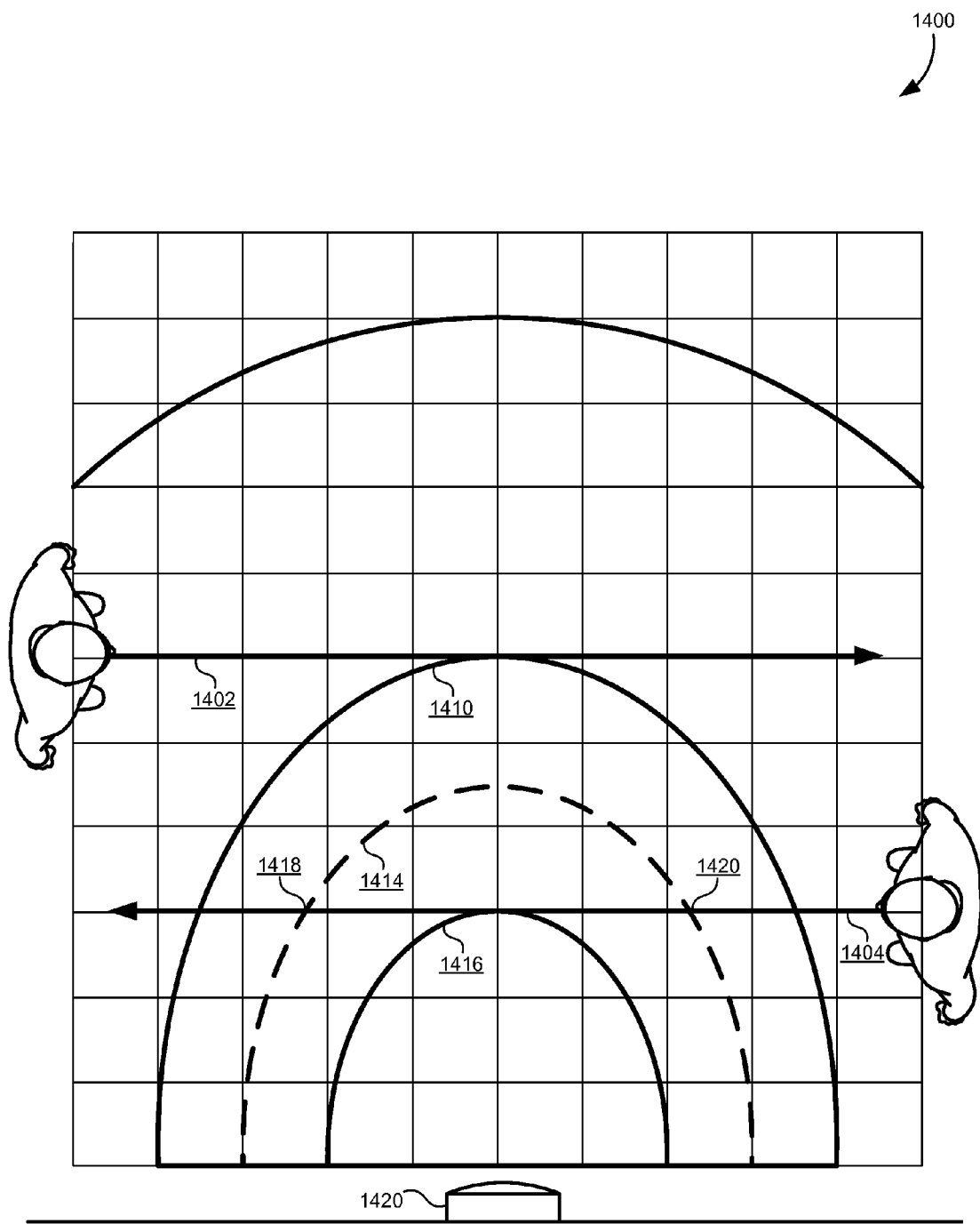
FIG. 14 illustrates sample horizontal paths that may be detected by the smart-home device using a threshold, according to some embodiments.

FIG. 14 illustrates sample horizontal paths that may be detected by the smart-home device 1420 using a threshold 1414, according to some embodiments. Here, a threshold can be selected such that path 1404 that just intersects with range 1416 of the near-field proximity sensor will generate a positive response, while path 1402 that just intersects with range 1410 will not generate a positive response. FIG. 14 also illustrates how and arrival and departure threshold value can be set for each zone. For the center (up/down) channel, 1404 should generate an arrival response at location 1420 while generating a departure response at location 1418. In one particular embodiment, test paths such as these yielded arrival/departure thresholds as listed in table 1 below.

TABLE 1

| Threshold Values | |
|---|---|
| Channel | Value |
| Up/Down Arrival Threshold | 127 |
| Left/Right Arrival Threshold | 129 |
| Up/Down Departure Threshold | −55 |
| Left/Right Departure Threshold | −89 |

The values in table 1 correspond to the AsahiKASEI® AK9750 4-channel IR Sensor IC, which uses four quantum IR sensors. The AK9750 also provides outputs from an analog-to-digital converter using 16-bit outputs. Some embodiments, different thresholds may be used for the up channel than for the down channel, instead of using the same threshold as illustrated in Table 1.

Figure 15:
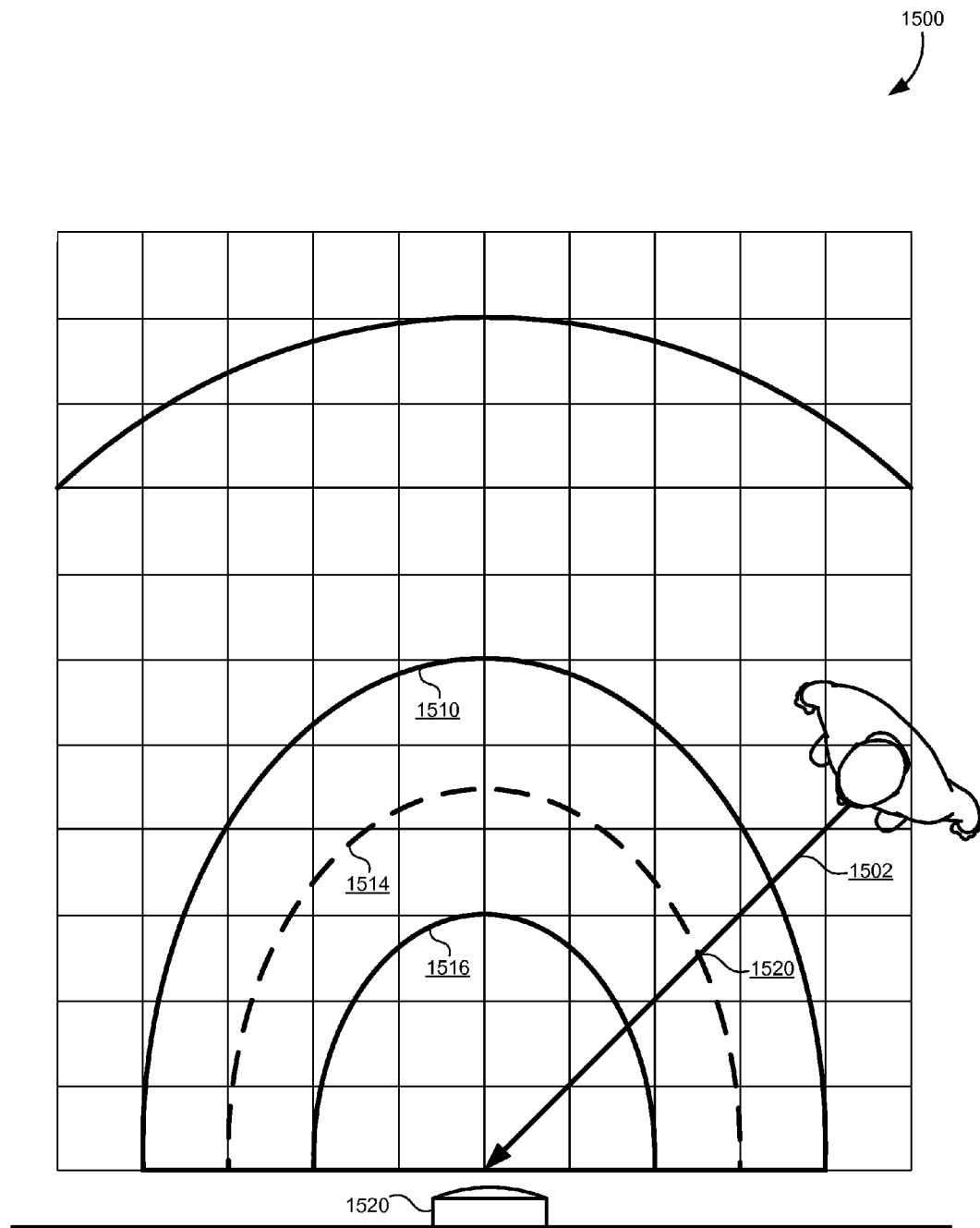
FIG. 15 illustrates an example of a diagonal path towards the smart-home device, according to some embodiments.

FIG. 15 illustrates an example of a diagonal path 1502 towards the smart-home device 1520, according to some embodiments. It is likely that the diagonal path 1502 will generate a response in the right channel as well as the center (up/down) channel, crossing a threshold at location 1520. In some embodiments that include a multi-channel proximity sensor, the multi-channel capability can be disregarded and the multi-channel proximity sensor can be used as a single-channel proximity sensor by simply adding or averaging the responses of the different channels together. In the example of FIG. 15, the response in the left channel and the center channel can be added together to generate a single composite response that indicates the user is within the threshold range of the near-field proximity sensor.

Figure 16:
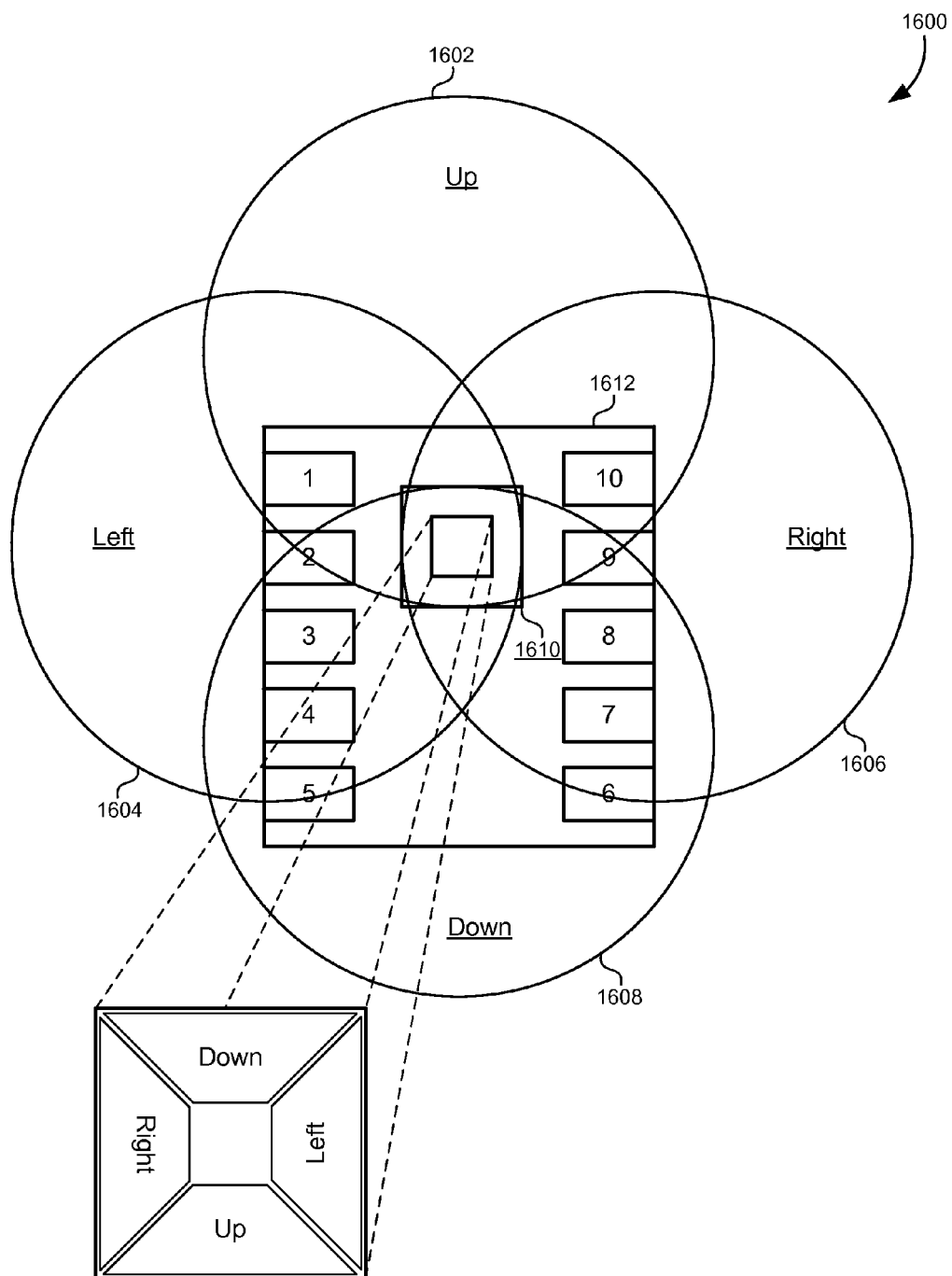
FIG. 16 illustrates the four-channel viewing areas of a near-field proximity sensor, according to some embodiments.

FIG. 16 illustrates the four-channel viewing areas of a near-field proximity sensor 1600, according to some embodiments. The AK9750 includes an IR sensor array 1610 arranged in left, right, up, and down facing orientations on the top of the IC package. As described above, the near-field proximity sensor 1600 is mounted to the sensor flex assembly of the smart thermostat and positioned behind a multi-function lens that provides a Fresnel lens section for the far-field PIR proximity sensor and a thin lens section for the near-field proximity sensor 1600. The IR sensor array 1610 is positioned on the front of the IC package and oriented on the package facing towards the center. For example, the downward facing sensor is positioned at the top of the IR sensor array 1610. The downward facing sensor is oriented such that it is angled slightly towards the bottom of the IC package. Similarly, the left facing sensor is positioned at the right side of the IR sensor array 1610 and oriented such that it is angled slightly towards the left side of the IC package. The IR sensor arrangement on the IR sensor array 1610 generates four overlapping fields of view 1602, 1604, 1606, 1608. As can be seen from FIG. 16, a user approaching from the right will initially trigger a response from the right channel, and then generate simultaneous responses from the up channel and the down channel.

In some embodiments, it is not particularly useful to detect whether a user approaches the smart-home device from below the device or above the device. Instead, the responses of the up channel and the down channel can be combined to generate a center channel. When combining the up channel and the down channel, the down channel can be discounted using a multiplier in order to ignore responses from small children and pets. It is unlikely that a small child is approaching the thermostat with the intent to interact with the thermostat, and activating a user interface when a pet approaches is simply a waste of energy. In one embodiment, a response generated on the down channel can be multiplied by 0.3 before being combined with the response generated from the up channel. Other embodiments may use multipliers in the range of 0.1 to 0.7.

Figure 17:
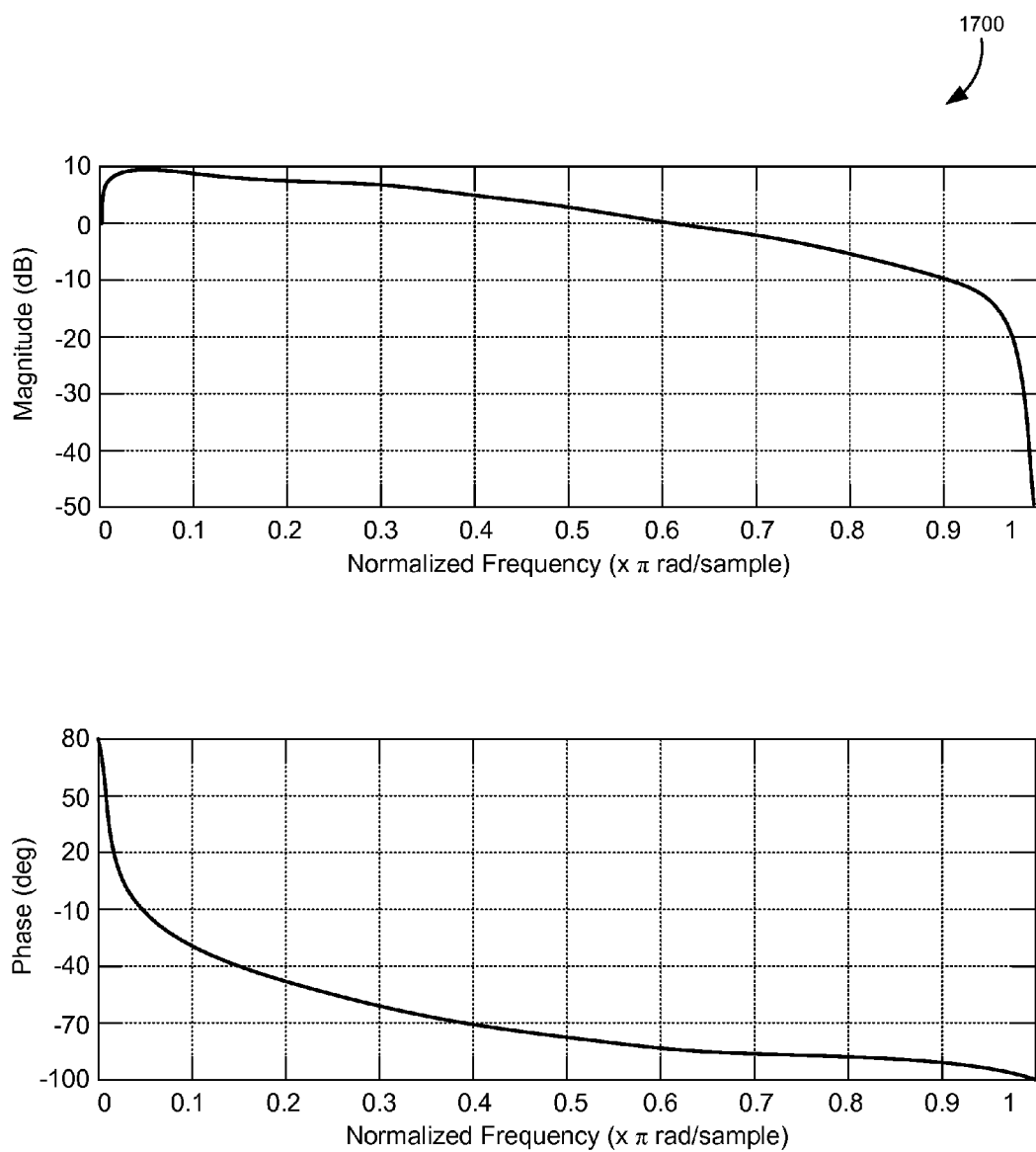
FIG. 17 illustrates a characteristic response of a digital filter designed to filter the output response of the near-field proximity sensor.

FIG. 17 illustrates a characteristic response of a digital filter designed to filter the output response of the near-field proximity sensor before being processed by the microprocessors of the processing system (e.g., primary processor). There is a DC component in samples received from each IR channel of the near-field proximity sensor. The DC compliment reflects the overall IR brightness of the field of view rather than motion within the field of view. The high-frequency components of received samples are dominated by thermal and/or electrical noise, therefore, the received time series of samples from each channel should be filtered using a bandpass filter. For example, the following filter equation may be used.

$$y[n]=x[n]-x[n-2]+c_1 y[n-1]-c_2 y[n-2] \quad (1)$$

In equation (1), x[n] indicates a raw channel sample at time n, and y[n] indicates a filtered version of the channel sample at time n. Constant values may be selected based on the particular type of near-field proximity sensor used. For example, in the case of the AK9750 described above, the following constant values may be used.

$$c_1=1.25236 \text{ and } c_2=0.2637729 \quad (2)$$

The frequency response 1700 of this bandpass filter from equation (1) and equation (2) is illustrated in FIG. 17. Note that the bandpass gain is greater than one (0 dB). In some cases, the bandpass gain was determined as the series combination of a first-order Butterworth highpass filter with a normalized cutoff frequency of 1/200, along with a first-order Butterworth lowpass filter with a normalized cutoff frequency of 1/3. The scale factor on x[n]−x[n−2] has been removed to save one multiplication in the filtering process since this factor can easily be incorporated within the threshold values themselves.

Figure 18:
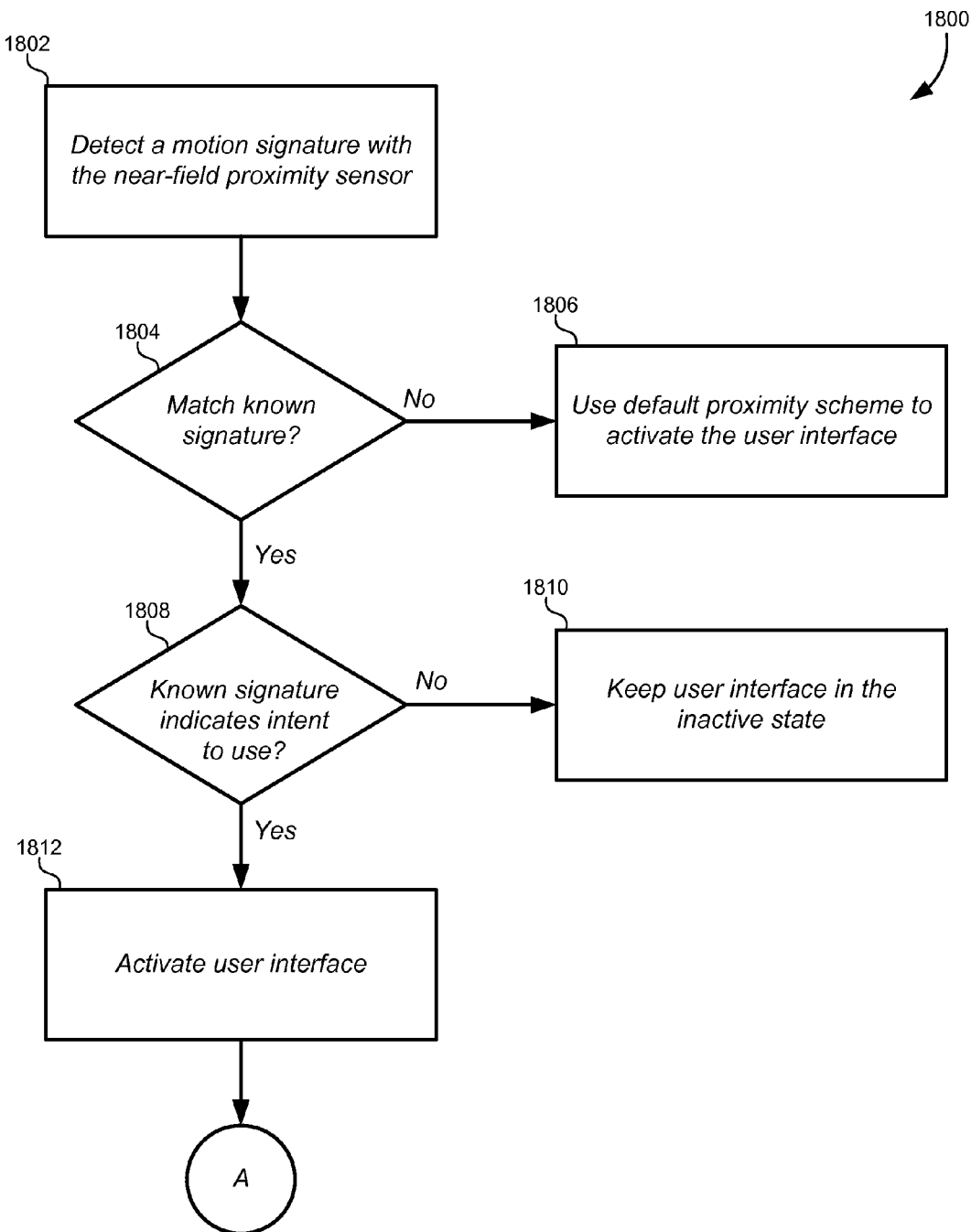
FIG. 18 illustrates a flowchart of a method for detecting a user approach to a smart-home device, according to some embodiments.

FIG. 18 illustrates a flowchart 1800 of a method for detecting a user approach to a smart-home device, according to some embodiments. The method may include detecting the motion signature with a near-field proximity sensor (1802). In simple embodiments, a motion signature may simply be an indication from the near-field proximity sensor that a user has moved within a predetermined threshold distance of the smart-home device. For example, a four-channel near-field proximity sensor can combine the responses from all channels in order to generate a single indication of whether a user is within the range of the near-field proximity sensor. In other embodiments, more complicated motion signatures can be detected by the near-field proximity sensor. As described above, thresholds for each sensor can be set to determine when a user is arriving in the field of view of each channel or departing from the field of view of each channel. For the left and right channels, the filter response from these channels can simple be compared to the threshold values.

$$y_{Left}[n] \geq LR\_ARR\_THRESH,$$

$$y_{Right}[n] \geq LR\_ARR\_THRESH \quad (3)$$

For the up/down channel, the filtered responses of these two channels can be compared to the sum of the up channel and the discounted down channel.

$$y_{Up}[n]+0.3 y_{Down}[n] \geq UD\_ARR\_THRESH \quad (4)$$

Equations (3) and (4) illustrate how filtered responses from each channel can be used to determine whether or not a user is arriving in that channel's field of view. Determining whether a user is departing from that channels field of view uses the same equations with different thresholds (e.g., LR_DEP_THRESH and UD_DEP_THRESH). Therefore, some motion signatures may be comprised of a single indication of whether a user is arriving or departing from a particular channel's field of view.

In some embodiments, even more complex motion signatures may be determined. These more complex motion signatures can be used to determine an intended behavior of the user. For example complex motion signatures can determine whether a user intends to approach the smart-home device to interact with user interface, or whether the user intends to walk past the smart-home device in a hallway without interacting. Complex motion signatures may be comprised of combinations of the individual channel indications described above. For example, if a user is seen to arrive at the left channel, then to arrive at the right channel, then to depart the left channel, it can be inferred that the user has passed across the front of the device from left to right. Instead of turning on the user interface, the smart-home device can remain in a sleep state. Table 2 below lists a sampling of different complex motion signatures that can be constructed from channel indications.

TABLE 2

Motion Signatures

| Channel Indication Sequence | Motion Signature Description |
|---|---|
| ARR_L, ARR_R, DEP_L | User passed across the front of the device from left to right |
| ARR_L, ARR_R, DEP_R | User reached device from left, then departed left |
| ARR_L, ARR_R, DEP_C | User reached device from left, then departed away from device |
| ARR_L, R/L/C_DEP w/o ARR_R | Path was oblique (only visible on the left) |
| ARR_C, R/L/C_DEP | Direct (perpendicular) approach path |

In some embodiments, a timing element may also be added to a motion signature. Each motion signature can include a time between each channel indication received by the processing system. For example, for the sequence described above, the motion signature may be represented by: ARR_L, [1.1 sec], ARR_R, [0.6 sec], DEP_L. Adding timing information can be very useful for determining when a user has stopped in front of the smart-home device. For example, if the user arrives from the left, then arrives from the right, and a certain threshold amount of time elapses (e.g., 0.5 seconds) without receiving a departure indication, it can be assumed that the user has approached the smart-home device from the left and stopped in front of the smart-home device to interact with the smart-home device.

The motion signature can be built gradually as responses are filtered and received from the near-field proximity sensor channels and stored in a motion signature vector that can be compared to known motion signatures. The stored vector can be flushed if a predetermined time interval elapses without any movement, or when a departure is seen on a threshold number of channels.

The method may also include determining whether the received motion signature matches any known motion signatures (1804). The smart-home device may receive known motion signatures in a number of different ways. First, the smart-home device may receive a library of known motion signatures from a central management server. Certain motion signatures—including some of those in Table 2 above—may be common to most environments in which a smart-home device can be installed. For example, the motion signature indicating that a user passes in front of the smart-home device from left to right is a common signature that may occur in many installation locations. The central management server can store a database of motion signatures that are preprogrammed based on trials conducted in a testing environment. Alternatively or additionally, the central management server can receive recorded motion signatures from any of the smart-home devices connected to its network. Because the smart-home devices are distributed in homes throughout a service area, a very large number of motion signatures can be retrieved and analyzed. The central management server can develop a histogram or other statistical analysis of the received motion signatures and select those motion signatures that occur most frequently over the widest distribution of homes. These motion signatures can be assumed to be common to many different installation environments and many different user types. The selected motion signatures can then be downloaded to each of the smart-home devices connected to the network and used as at least an initial baseline for comparison.

The smart-home device may also receive known motion signatures based on historical interactions in its immediate environment. As described in step (1802) above, every time responses are generated from one or more channels of the multi-channel near-field proximity sensor, the smart-home device will record a set of responses to generate a motion signature. After the user leaves the area, the motion signature can then be stored in a historical database of motion signatures observed by the particular smart-home device. As was the case of the central management server, the smart-home device can also perform a statistical analysis of each motion signature, developing a histogram representation using a counter for each observed motion signature that is incremented after each occurrence. The most common motion signatures can be added to the database of known motion signatures and compared in real-time to future motion signatures as they are received by the smart-home device.

The smart-home device may also combine known motion signatures in its database with information received from new motion signatures. For example, a motion signature received from the central management server may include timing requirements for the average person (e.g., how fast the person moves from left to right in front of a thermostat). However, a particular smart-home device may be installed in a home with older occupants who move slower than the average timing requirements. Smart-home device may recognize a pattern of arrivals/departures in an existing motion signature and adjust the timing requirements to match the slower/faster pace of the particular occupants in its installation location. Thus, the database of known motion signatures may include signatures received from a central management server, signatures recorded locally by the smart-home device, and signatures that are a combination of the two as they are dynamically adjusted to match the specific user characteristics.

Comparing the received motion signature with known motion signatures may be processed by the processing system of the smart-home device. Alternatively or additionally, the received motion signature can be sent to the central management server for remote processing, and a response can then be sent to the smart-home device. Because the smart-home devices in this disclosure are connected to the central management server through local wireless networks and the Internet, advance processing and statistical analysis may be passed to the central management server where more processing power is generally available. This may be particularly advantageous for smart-home devices, such as a hazard detector, that use low-power processors and have limited memory storage capabilities.

The process of matching the received motion signature to a known motion signature may be either exact or approximate. For example, a device may require an exact sequence of channel responses, while allowing time requirements to vary within a bandpass range. This would allow users to move faster/slower through the same sequence in front of the smart-home device and still generate what would be recognized as the same motion sequence. In other cases, the known motion signature should be a subset of the received motion signature. These embodiments cover situations where more than one user is in range of the near-field proximity sensor. Channel responses due to a first user may be interleaved with channel responses due to a second user. So long as a recognized sequence appears in order in the motion signature, that sequence can be extracted and identified in the known motion signature database. For example, so long as ARR_L, ARR_R, and DEP_R appear in the motion signature in that order and with the correct timing, then the processing system can identify the left-to-right motion, even if other channel responses (e.g., ARR_C) also appear in the motion signature due to another user.

If the received motion signature does not match a known motion signature, then a default proximity scheme can be used to activate the user interface of the smart-home device and/or perform other operations (1806). The default proximity scheme may simply average/add all of the channel responses together to determine if the user has come within a specified range of the smart-home device, and then act accordingly. However, if the received motion signature matches a known motion signature, then more advanced operations may be carried out. Each known motion signature may also be stored with an indication of user intent. For example, the left-to-right motion signature described above may be stored with an indication that this motion signature rarely corresponds to a user intending to use the smart-home device, but rather corresponds to a user that simply walks by the smart-home device. This indication may be stored as a single bit in some embodiments, or as a statistical percentage in other embodiments. The statistical percentage can be compared to a threshold percentage determined if the smart-home device should interpret the motion signature as an intent to use the device. The threshold can be adjusted up or down universally for all motion signatures to make the smart-home device more or less responsive to user approaches. Some users may prefer that the smart-home device to activate more often than not. In contrast, some users may prefer the smart-home device to conserve energy and only activate the device when it is very likely that the user intends to interact with the device.

Like other systems on the smart-home device, the motion signature detection and recognition algorithms can be learning algorithms that dynamically update and store data in order to better recognize user intent. If a received motion signature matches a known motion signature, and the known motion signature indicates that the user intends to interact with the device, the device may be activated. The indication of user intent stored with the known motion signature can be updated based on whether the user actually interacts with the device. For example, if the user does not interact with the device, the algorithm can "punish" the motion signature by lowering the percentage indicating user intent to use. Similarly, if the user does interact with the device, the algorithm can "reinforce" the motion signature by increasing the percentage indicating user intent to use. Over time, the known motion signature database for the smart-home device may grow to accurately predict user motion sequences that indicate an intent to use such that power conservation can be optimized and user experience can be maximized.

By accessing the indication of intent to use stored with each known motion signature, the smart-home device can thus determine whether action should be taken (1808). If the intent to use indication is below a threshold percentage or otherwise indicates that this motion signature is not likely to indicate an intent to use, then the smart-home device can refrain from taking action by remaining in an inactive state (1810). On the other hand, when the intent use indication is above the threshold percentage or otherwise indicates that this motion signature is likely to indicate an intent to use, the smart-home device can take action by activating systems such as the user interface (1812).

Figure 19:
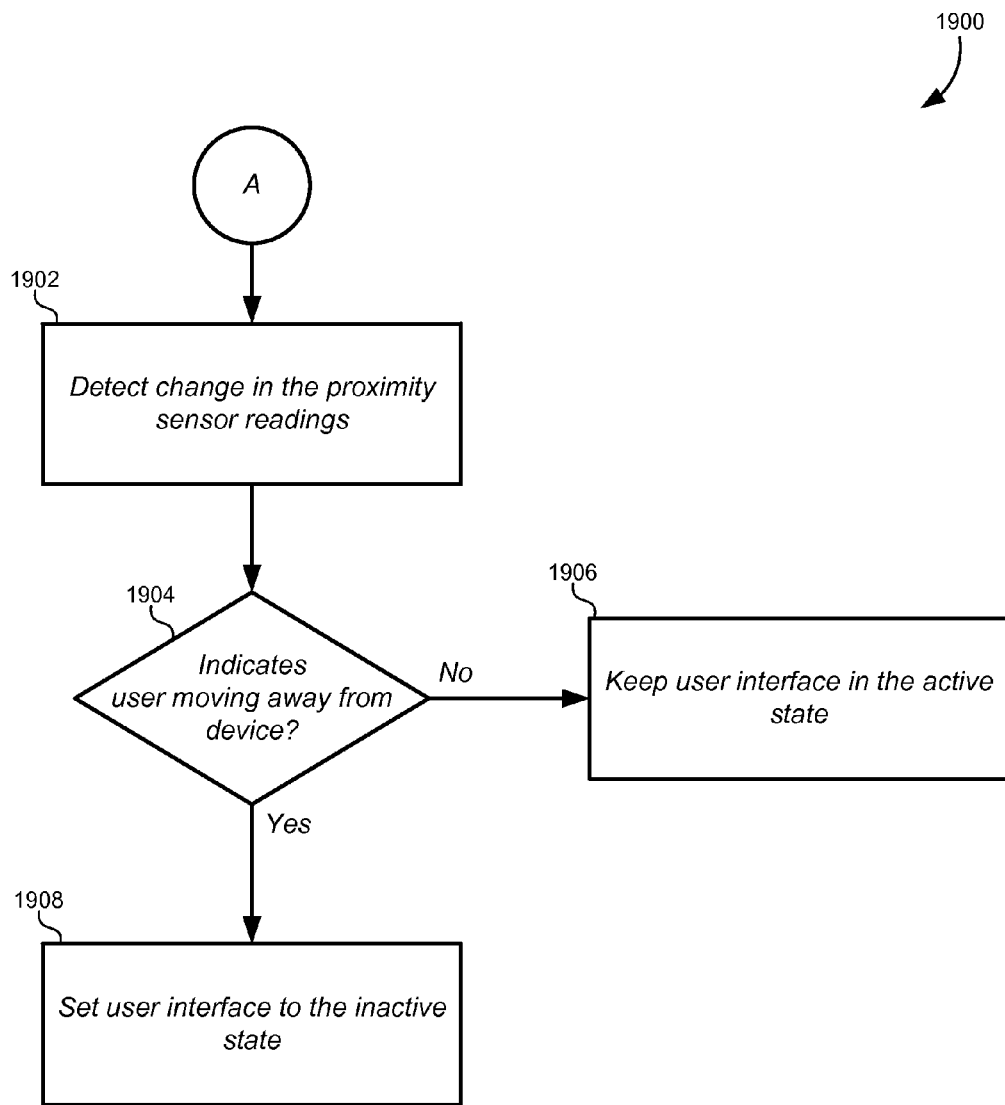
FIG. 19 illustrates a flowchart of a method for continuously processing a motion signature after the smart-home device initiates a responsive action, according to some embodiments.

FIG. 19 illustrates a flowchart 1900 of a method for continuously processing a motion signature after the smart-home device initiates a responsive action, according to some embodiments. At this stage, it is assumed that the smart-home device has detected a motion signature matching a known motion signature that indicates user intent to use. By way of example, it is also assumed that the user interface of the smart-home device is been activated in anticipation of the predicted user interaction. However, in cases where the user changes their mind or otherwise deviates from the predicted action, not only will the prediction algorithm be retrained as described above, but corrective action can be taken by the smart-home device to reverse the activation of systems in response to the incorrect prediction, by, for example, turning off the user interface.

Normally, the user interface would stay on for an interval of 10 seconds to 30 seconds after being activated. In cases where the motion signature incorrectly identified an intent to use, the user interface would stay active for this entire interval even though the user never intended to interact with the smart-home device. However, using the multi-channel near-field proximity sensor described above, the smart-home device can quickly react to this situation in order to conserve energy and not distract users. For example, the motion sequence ARR_L, ARR_R could indicate that a user has approached the smart-home device from the left. Based on the recognition of this motion signature, and based on the historical training indicating that 75% of the time the user intends interact with the thermostat when approaching from the left, the user interface can be activated.

At this point, the method may include detecting changes in the proximity sensor readings (1902). These changes may include specific channel responses that indicate that the user is moving away from the device. For example, any of DEP_R, DEP_L, and/or DEP_C may indicate that the user has moved away from the thermostat. If the changes in the proximity sensor readings indicate that the user is moving away from the device (1904), then corrective action can be taken. For example, the user interface can be switched back to the inactive state immediately (1908). This capability allows the smart-home device to be very responsive when the user approaches the device by turning on a user interface, while also being very responsive when the user moves away. As soon as the smart-home device recognizes that the user interface was activated in error, the user interface will be deactivated. In some cases, the user interface will display information, such as the temperature on the thermostat. When users walk towards the device they may simply want to know the current setpoint temperature. This algorithm allows the smart-home device to respond quickly and display information that is informative to a user. When it is clear based on the channel readings from the near-field proximity sensor that the user is moving away from the smart-home device, the user interface can be deactivated because it is unlikely that the user will use such information while walking away from the smart-home device.

If the change does not indicate that the user is moving away from the device, then the user interface may be kept in the active state (1906). Channels on the sensor may generate responses that are not related to the user. For example, another user may move within range of the smart-home device, a user interacting with the smart-home device may shift their body back and forth slightly between the left, right, and center responsive zones, and so forth. Unless the change in the proximity sensor readings clearly indicate that the user is moving away from the smart-home device, the user interface can remain active to avoid the frustration of interrupting the user experience. Although not shown explicitly in FIG. 19, any input received through the user interface of the smart-home device will also preclude turning off the user interface, regardless of any change in the proximity sensor readings.

In some embodiments, known changes to motion signatures may also be stored in a manner similar to how known motion signatures are stored. The changes detected in step 1902 may be compared to the known changes to motion signatures in order to determine whether they likely indicate that the user is moving away from the device without an intent to use the smart-home device further. This process of comparing, accessing a threshold probability, and taking an action in response may be carried out as described above in relation to FIG. 7 for matching known motion signatures and determining an intent to use.

It should be appreciated that the specific steps illustrated in FIGS. 18-19 provide particular methods of processing movement/motion signatures according to various embodiments of the present invention. Other sequences of steps may also be performed according to alternative embodiments. For example, alternative embodiments of the present invention may perform the steps outlined above in a different order. Moreover, the individual steps illustrated in FIGS. 7-8 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 20:
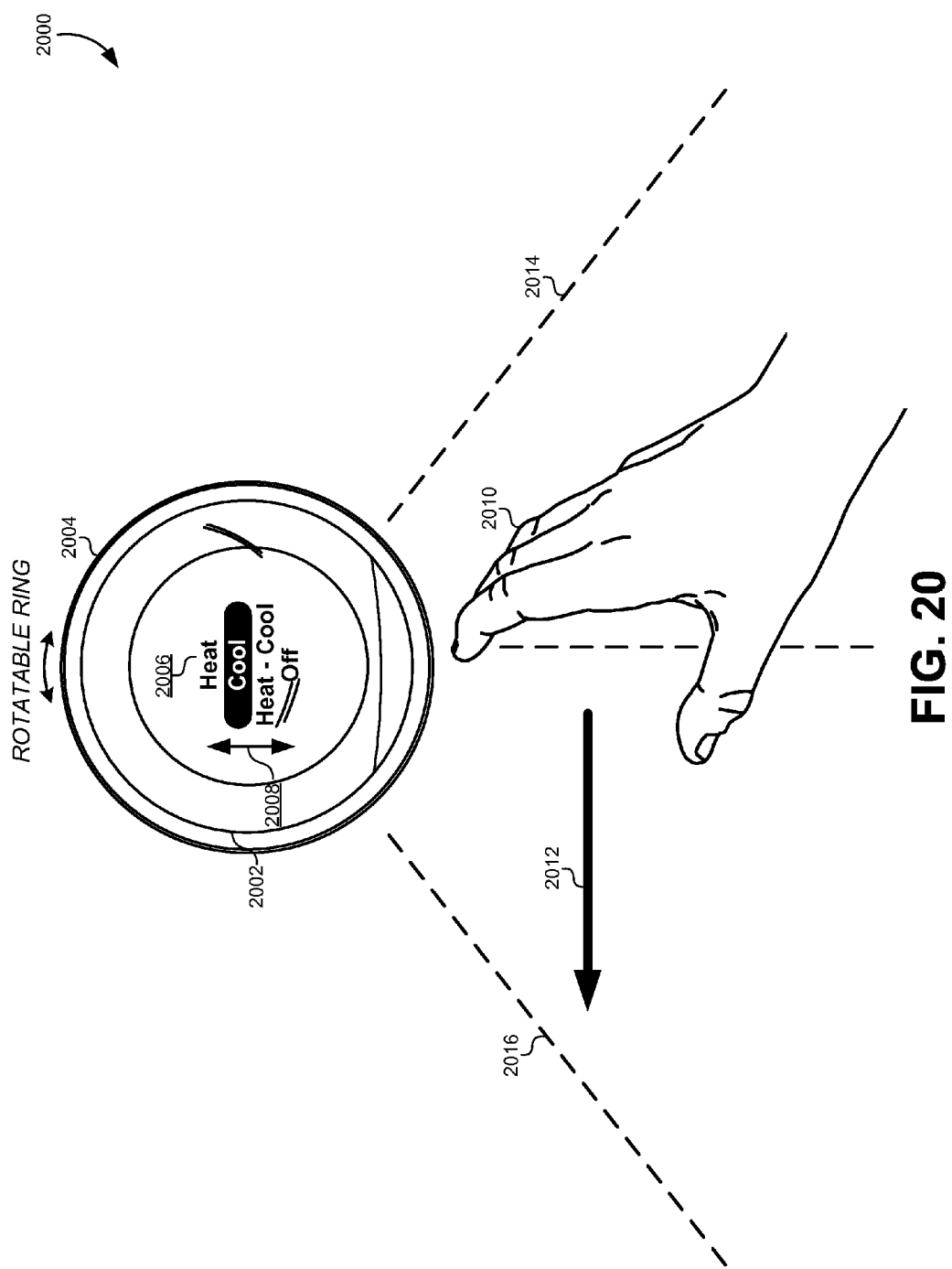
FIG. 20 illustrates a second mode of operation for the near-field proximity sensor during a user interactive session, according to some embodiments.

FIG. 20 illustrates a second mode of operation for the near-field proximity sensor during a user interactive session, according to some embodiments. After receiving user input through the user interface, such as the rotatable ring 2004 around a smart-home device 2002, the multi-channel near-field proximity sensor can transition into a second mode of operation. Alternatively, instead of requiring a user input through the user interface, some embodiments may detect close proximity through the multi-channel proximity sensor or may simply detect a strong response on multiple channels, indicating that the user is standing next to the smart thermostat. In this mode, motion inputs received can instead be used to navigate through a user interface of the smart-home device. For example, when a user waives their hand 2010 in a right-to-left motion 2012, this will generate responses on first the right channel of the proximity sensor, then the left channel of the proximity sensor. It is likely that the entire motion will generate a response on the center channel.) This motion can be used to navigate back and forth through different menus. Similarly, up-and-down motion of the user's hand 2010 would generate responses on the up channel and the down channel of the proximity sensor. This would be interpreted as scrolling within options 2008 of the current menu 2006. In some embodiments, rotating the hand around in a circular motion would in sequence generate responses on the up channel, the left channel, the down channel, the right channel, and so forth. The circular motion would be interpreted by the smart-home device 2002 as an input similar to rotating the rotatable ring 2004. This could be used to increase/decrease the temperature of the current thermostat setpoint. Using hand gestures such as these may be beneficial for users with arthritis or other health-related issues that may make manipulating a mechanical user interface difficult. Gestures such as these can also be useful when users are unable to stay in front of the thermostat during the entire interactive session.

The up/down/left/right/circular hand gestures described above are merely exemplary and not meant to be limiting. Other hand gestures may be used, where the hand of the user acts as an "air mouse." Some embodiments may also use the Z axis emanating outward from the thermostat as an input, such that a user could push their hand towards the thermostat to indicate a "pushing a button in the air" type of input. While operating in this mode, the sensors would not necessarily require certain thresholds, but could instead compare relative responses on various sensor channels. For example, logic could detect when the left sensor sees more responsive energy than the other three sensors, indicating that the user's hand is raised to the left.

Figure 21:
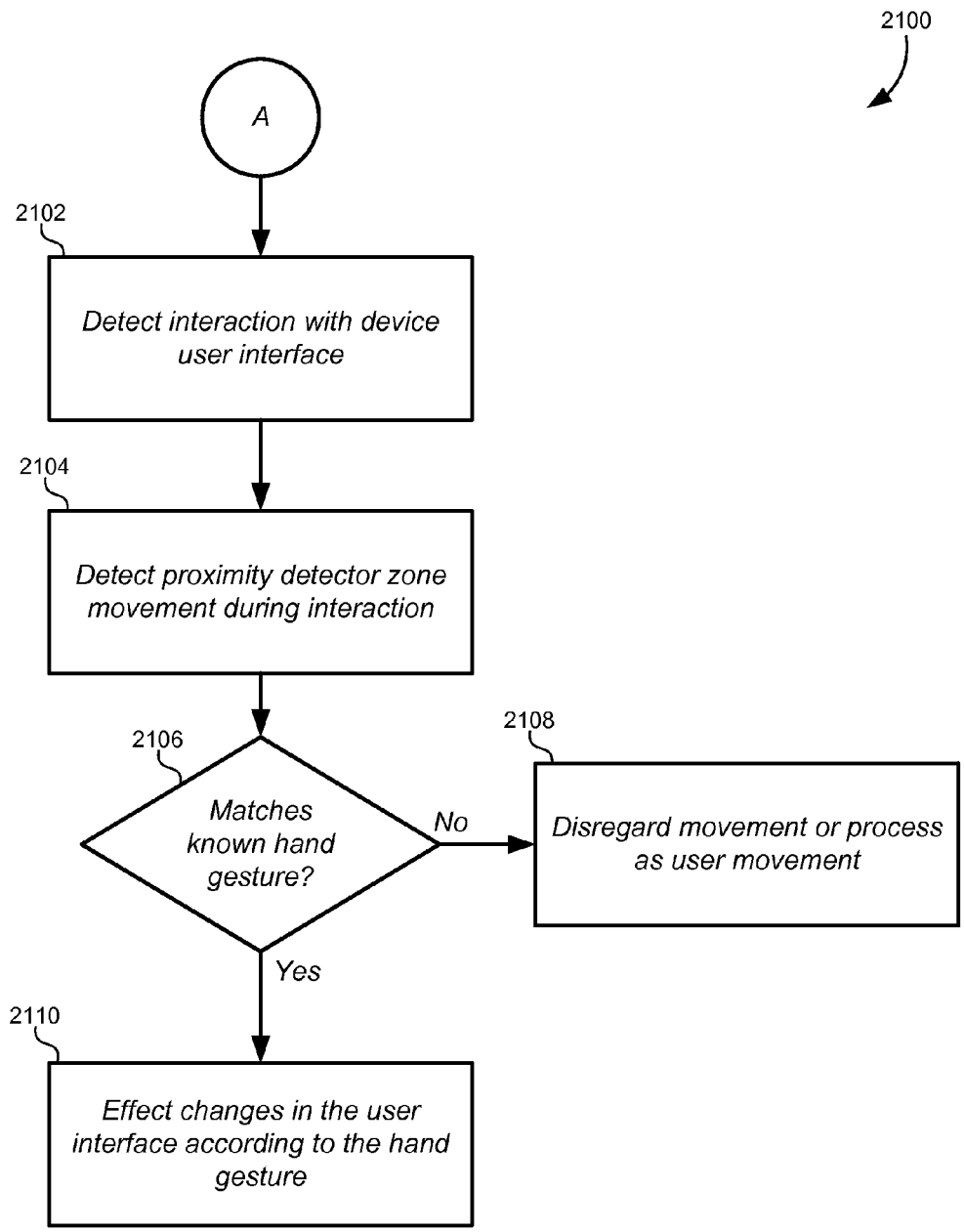
FIG. 21 illustrates a flowchart of a method for interpreting and gestures using the multi-channel proximity sensor, according to some embodiments.

FIG. 21 illustrates a flowchart 2100 of a method for interpreting and gestures using the multi-channel proximity sensor, according to some embodiments. The method may include detecting an interaction with the device user interface (2102). This interaction with the user interface element, such as a rotatable ring, a click device, and/or the like, can signify to the smart-home device that inputs received from the near-field proximity sensor should be interpreted as commands rather than interpreted as part of a motion signature indicating user movement. At this point, the smart-home device knows that the user is intending to interact with the device, so it is able to transition into this new mode of operation without misinterpreting user intent.

The method may also include detecting proximity sensor zone movement during the interaction with the device (2104). As described above, this zone movement may include sequential triggering of the left zone and the right zone, sequential triggering of the up zone and the down zone, or sequential triggering of all four zones indicating a circular motion. It will be understood that these types of zone movement and hand gestures are merely exemplary and used to illustrate the larger body of hand gestures that can be used to control the smart-home device. Therefore, one having skill in the art will understand in light of this disclosure that other hand gestures may be used as dictated by the layout of the particular user interface. For example, some user interfaces may use a diagonal scrolling motion instead of a circular scrolling motion, which would be represented by a sequential triggering of the left/up zones followed by the right/down zones.

In a manner similar to detecting known motion signatures, the zone responses during the interactive user interface session can be compared to known zone responses indicating hand gesture commands (2106). As described above, a database of known hand gestures can be downloaded from the central management server, learned from user training sessions, and/or automatically observed through historical interactions with one or more users. If the observed zone movements matches a known hand gesture, then the known hand gesture can be interpreted as a command, and changes can be made to the user interface according to the hand gesture (2110). Alternatively, if the zone movement does not match any known and gestures corresponding to user interface commands, the smart-home device can disregard the movement (2108). Alternatively, the smart-home device can transition back into the previous mode of operation where the multi-channel near-field proximity sensor interprets zone responses as user movements and generates motion signatures. This situation can arise when users end their interactive session with the thermostat and walk away.

It should be appreciated that the specific steps illustrated in FIG. 21 provide particular methods of interpreting gestures according to various embodiments of the present invention. Other sequences of steps may also be performed according to alternative embodiments. For example, alternative embodiments of the present invention may perform the steps outlined above in a different order. Moreover, the individual steps illustrated in FIG. 21 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 22:
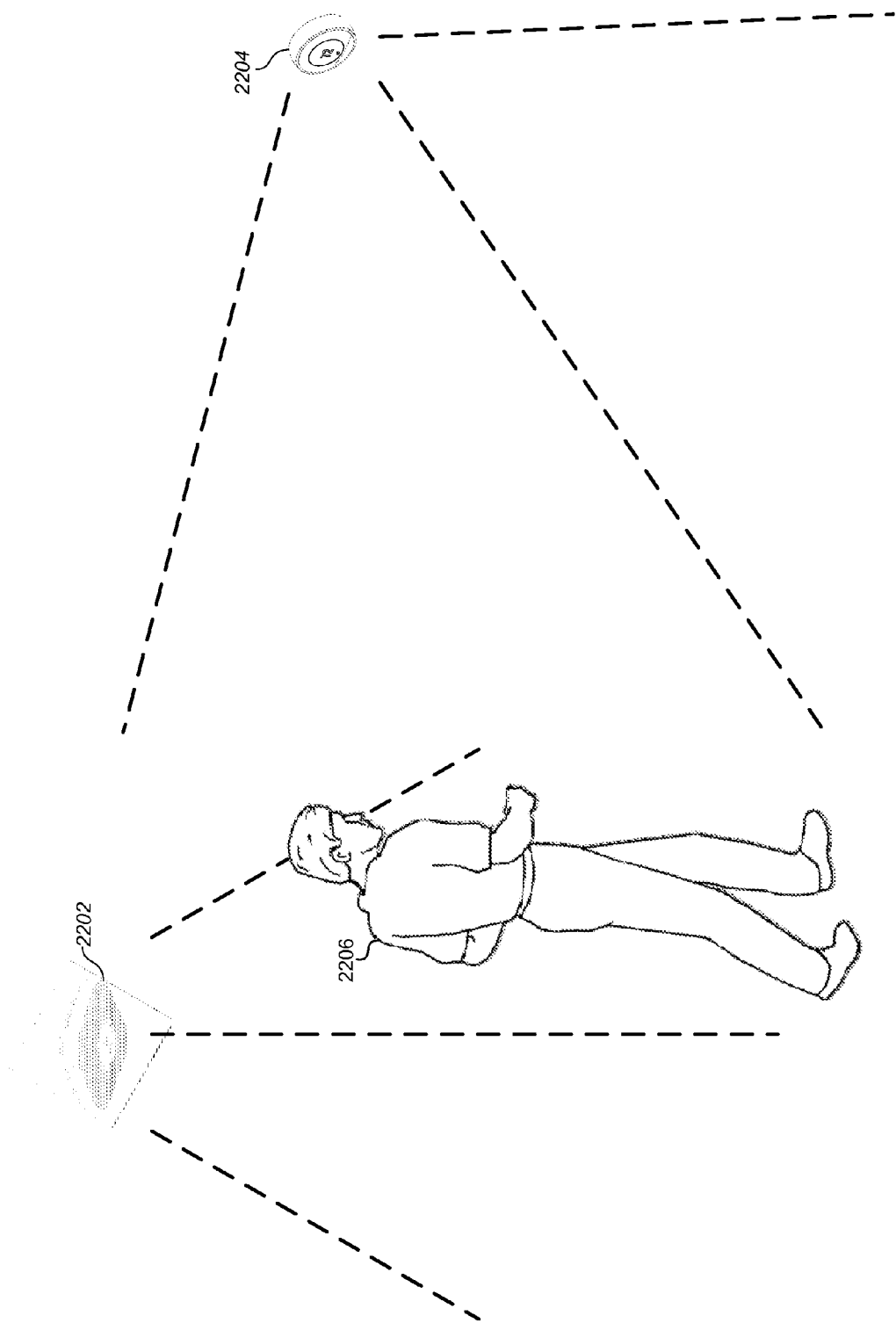
FIG. 22 illustrates using data from more than one smart-home device to track user movements, according to some embodiments.

FIG. 22 illustrates using data from more than one smart-home device to track user movements, according to some embodiments. The smart home environment will typically include more than one smart-home device. For example, a hazard detector 2202 and the thermostat 2204 may be installed in the same room. Often times, users will install the thermostat 2204 vin their hallway somewhat beneath a location where their hazard detector 2202 is installed. Each smart-home device may be equipped with its own proximity sensor(s). When the fields of two or more proximity sensors on multiple devices overlap, the channel response information can be transmitted from one device to the other. This information can be used to reinforce the interpretation of motion signatures by one or more devices.

In some embodiments, a first user may approach the thermostat 2204 in order to interact with the user interface. The thermostat 2204 may begin receiving responses from various channels of the multi-channel proximity sensor indicating the approach of the first user. At the same time, a second user may also enter the field of view of the multi-channel proximity sensor of the thermostat 2204. In some cases, such a situation may present confusing results to the thermostat 2204. Multiple users may appear as a single user that is not approaching the thermostat 2204. However, proximity sensor responses from the hazard detector 2202 may be used to interpret ambiguous results received by the thermostat 2204. For example, if the first user 2206 is in the field of view of the hazard detector 2202 and the second user (not shown) is out of view of the hazard detector 2202, then the motion signature of the first user 2206 will be unambiguous as seen by the hazard detector 2202. The hazard detector 2202 would see a motion signature of the first user 2206 approaching the thermostat 2204. The hazard detector 2202 could then transmit this information to the thermostat 2204 over a local smart-home device network. Using this information, the thermostat 2204 could disregard proximity sensor zone responses that do not agree with the motion signature received from the hazard detector 2202. In this manner, the thermostat 2204 may isolate the movement of the first user 2206 while disregarding movement of the second user (not shown).

In other embodiments, the proximity sensor readings from other smart-home devices can be used to determine an auto-away status for the thermostat 2204. In some installations, the thermostat 2204 may be located in areas that are not subject to frequent traffic when the home is occupied. For example, the thermostat 2204 may be installed at the end of a hallway, or in an unoccupied room. Because the thermostat 2204 in such a location will not see user movements using its proximity sensors (near-field and/or far-field), the thermostat 2204 may erroneously enter an auto-away mode. However, because the thermostat 2204 is in communication with other smart-home devices, such as a hazard detector 2202, the other smart-home devices can share occupancy information across the smart-home network.

Automatic Display Adjustment Based on Viewer Location

In the examples described above, the responses generated by the far-field proximity sensor and the near-field proximity sensor are used to activate a user display on a smart-home device. In addition to merely activating a user interface, some embodiments may offer more sophisticated and advanced user interface features that depend on the responses generated by these two proximity sensors. Depending on a user's velocity, motion path/signature, identity, and/or distance from the smart-home device, the user interface can be modified to display information that would be meaningful and useful for users in each situation.

Figure 23:
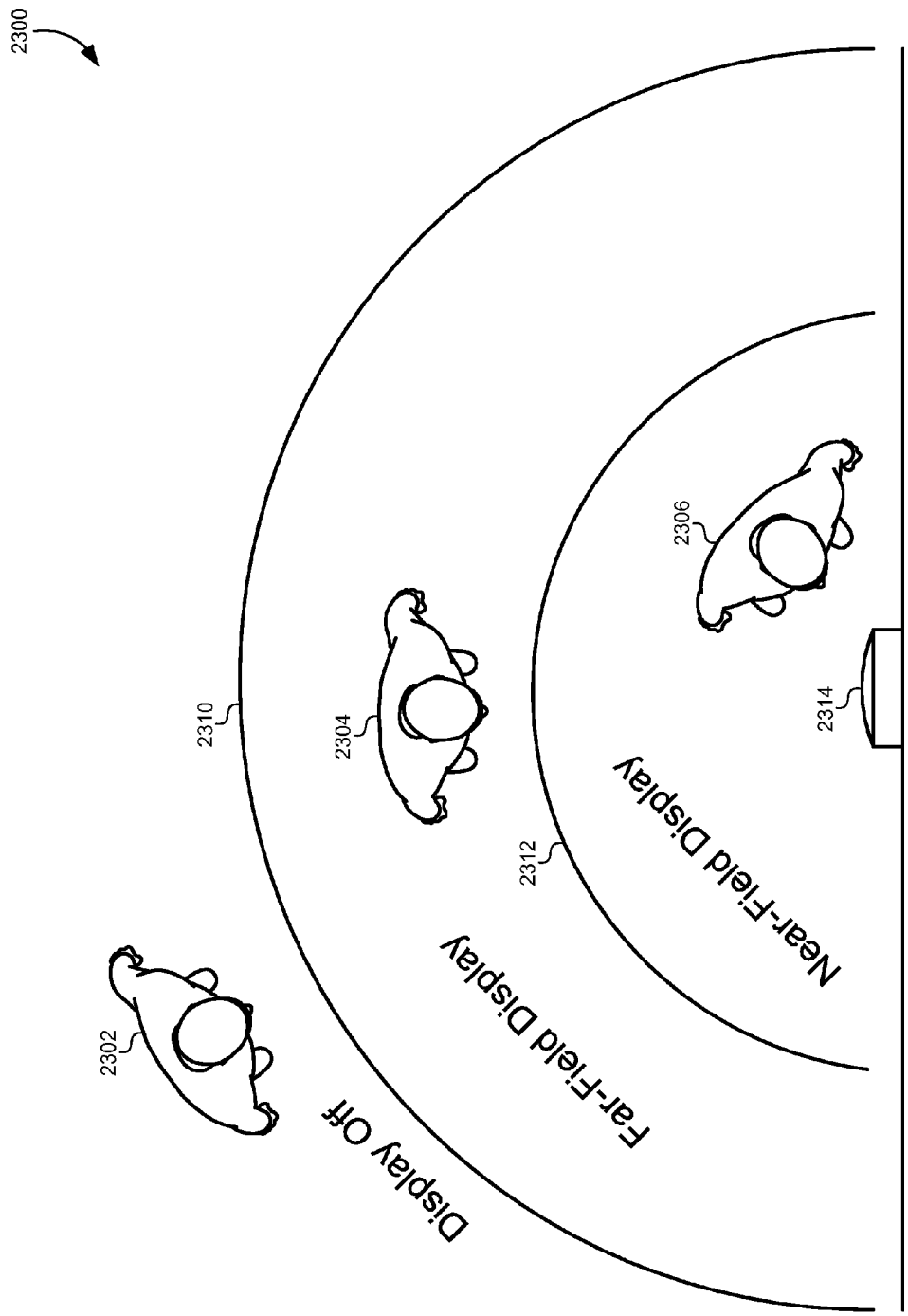
FIG. 23 illustrates a diagram of different user positions relative to a smart-home device, according to some embodiments.

FIG. 23 illustrates a diagram 2300 of different user positions relative to a smart-home device 2314, according to some embodiments. The responsive ranges are illustrated as concentric circles for explanatory purposes only. Actual responsive ranges may be oval, oblong, parabolic, and/or the like, depending on the particular hardware sensor chosen. User 2302 is outside of region 2310 and is thus considered to be out of range of all proximity sensors on the smart-home device 2314. Generally, when the user 2302 is out of range, the user interface of the smart-home device 2314 will be deactivated, in a sleep mode, or "off." When the user 2302 is far enough away from the smart-home device 2314 that he/she is not detected by the far-field proximity sensor, the user 2302 is generally also far enough away that information displayed on the user interface of the smart-home device 2314 would be too small to read. However, some embodiments may use other smart-home devices within the enclosure (e.g., a hazard detector, a smart appliance, a wireless module in a security system, etc.) in order to detect the presence of user 2302 even outside the range of the far-field proximity sensor of the smart-home device 2314. Therefore, some embodiments may activate the user interface of the smart-home device 2314 to display information even though the user 2302 is a great distance away and otherwise undetectable by the smart-home device 2314 alone.

As a user 2304 moves within the range of the far-field proximity sensor, some embodiments may activate the user interface and display information in a far-field setting. The information displayed while the user is in the far-field region 2310, may be displayed in a large font size, using high contrasting colors, or in a manner where substantially all of the user interface area is used by the display. In some embodiments, icons or graphics may be displayed on the user interface to grab the attention of the user without displaying textual/numerical information that would frustrate users being too far away to read it properly. Examples of far-field displays will be discussed in greater detail below.

As the user 2306 enters into the near-field range 2312, and thus generates a response on the near-field proximity sensor, the user interface of the smart-home device 2314 can change the display into a near-field setting. In some embodiments, the near-field graphical display may include smaller fonts, menu options, textual/numerical information, and/or other information that would be more useful to a user 2306 in close proximity to the smart-home device 2314. In some embodiments, the near-field display and the far-field display may show generally the same information in different formats. For example the far-field display may include an enlarged digital clock display, while the near-field display may include a more detailed analog clock display. In some embodiments, the far-field display includes a subset of information that would be displayed in the near-field display. For example, the far-field display may include an alert icon, while the near-field display would include the alert icon populated with textual information.

As illustrated by FIG. 23, some embodiments may have at least three different display options: and off display, a far-field display, and a near-field display. As the user moves between responsive areas of the various proximity sensors of the smart-home device 2314, the user interface can transition between each display in a corresponding fashion. Thus a processing transition can exist between each of the responsive regions of the proximity sensors. The transition between the off display and the far-field display can occur when the smart-home device 2314 begins receiving responses from the far-field proximity sensor. Similarly, the transition between the far-field display of the near-field display can occur when the smart-home device 2314 begins to receive responses from the near-field proximity sensor.

Figure 24:
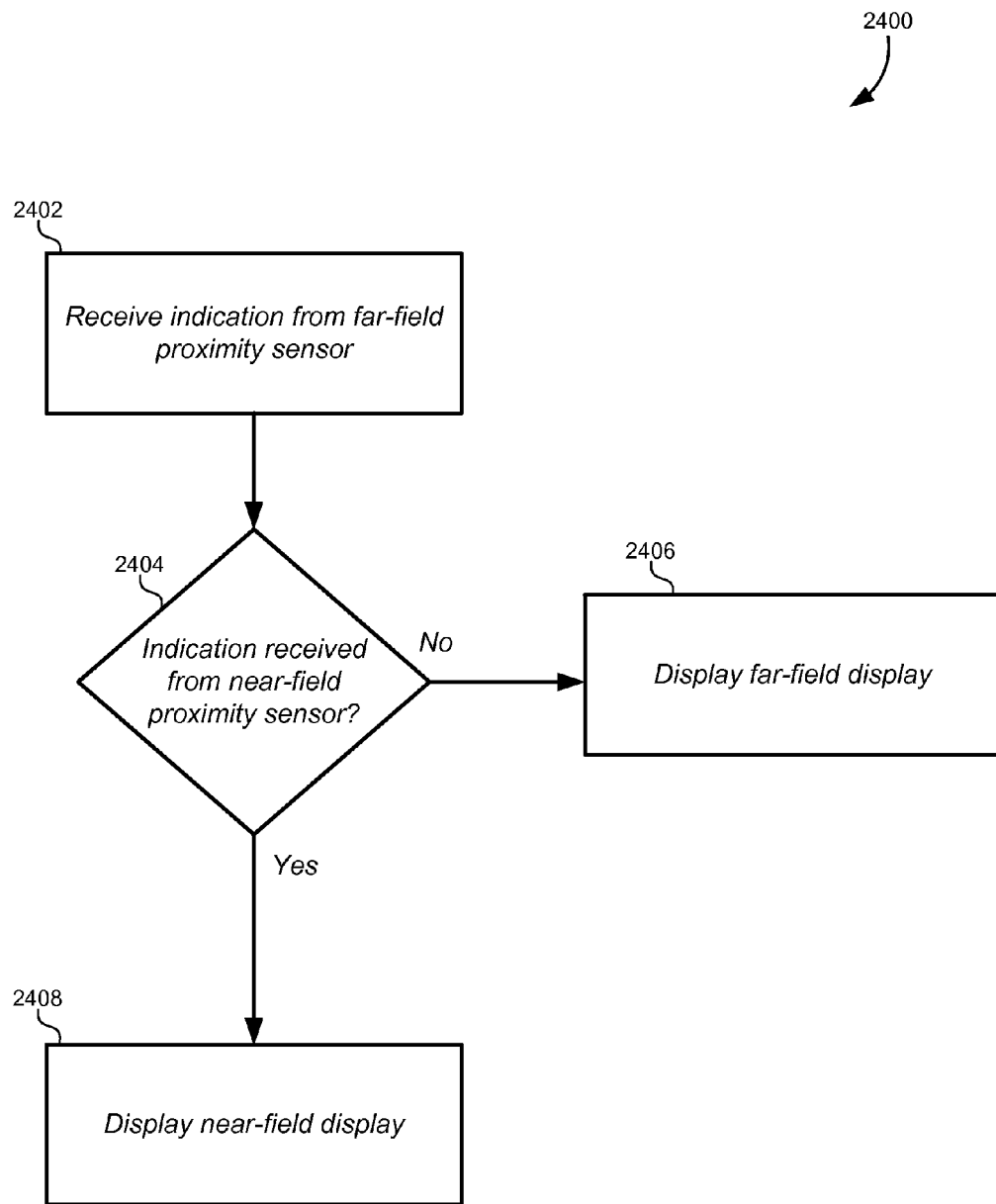
FIG. 24 illustrates a flowchart of a method for generating and transitioning between various graphical displays on a user interface of a smart-home device, according to some embodiments.

FIG. 24 illustrates a flowchart 2400 of a method for generating and transitioning between various graphical displays on a user interface of a smart-home device, according to some embodiments. The method may include receiving an indication from a far-field proximity sensor (2402). Receiving an indication from the far-field proximity sensor may occur when a user enters the responsive range of the far-field proximity sensor. At this point, some embodiments of the smart-home device may recognize the need to activate the user interface. In order to determine the type of information to display on the user interface, the smart-home device can analyze responses generated by both the near-field proximity sensor and the far-field proximity sensor together.

The method may further include determining whether an indication has been received from the near-field proximity sensor (2404). If no indications have been received from the near-field proximity sensor within a predetermined time interval, the user interface can display a far-field display (2406). This situation will occur when a user is in range of the far-field proximity sensor, but out of range of the near-field proximity sensor. Note that it is not required for indications to be received from the near-field proximity sensor and the far-field proximity sensor at precisely the same time. Instead, some embodiments will analyze time intervals, such as 10 ms, 50 ms, 100 ms, 500 ms, 1 s, etc., and determine whether indications have been received from both proximity sensors within that time interval. Some embodiments may also begin a time interval when an indication is received from one of the two proximity sensors, and look for an indication received from the other of the proximity sensors within that time interval. For example, if the far-field proximity sensor generates a response, this would begin a 100 ms time interval. The processing system of the smart-home device would then monitor the near-field proximity sensor to determine whether that sensor also generated a response within the 100 ms time interval. If indications from both the far-field proximity sensor and the near-field proximity sensor are generated within the same time interval, then the user interface can be caused to display the near-field display (2408).

Although not shown explicitly in flowchart 2400, some situations may occur when a response is generated by the near-field proximity sensor without a corresponding response being generated by the far-field proximity sensor. For example, in cases where the far-field proximity sensor is not functioning or is obscured, the near-field proximity sensor may be the only proximity sensor generating response. In this case, when an indication is received from the near-field proximity sensor, the user interface can display the near-field display without requiring an indication from the far-field proximity sensor.

Figure 25B:
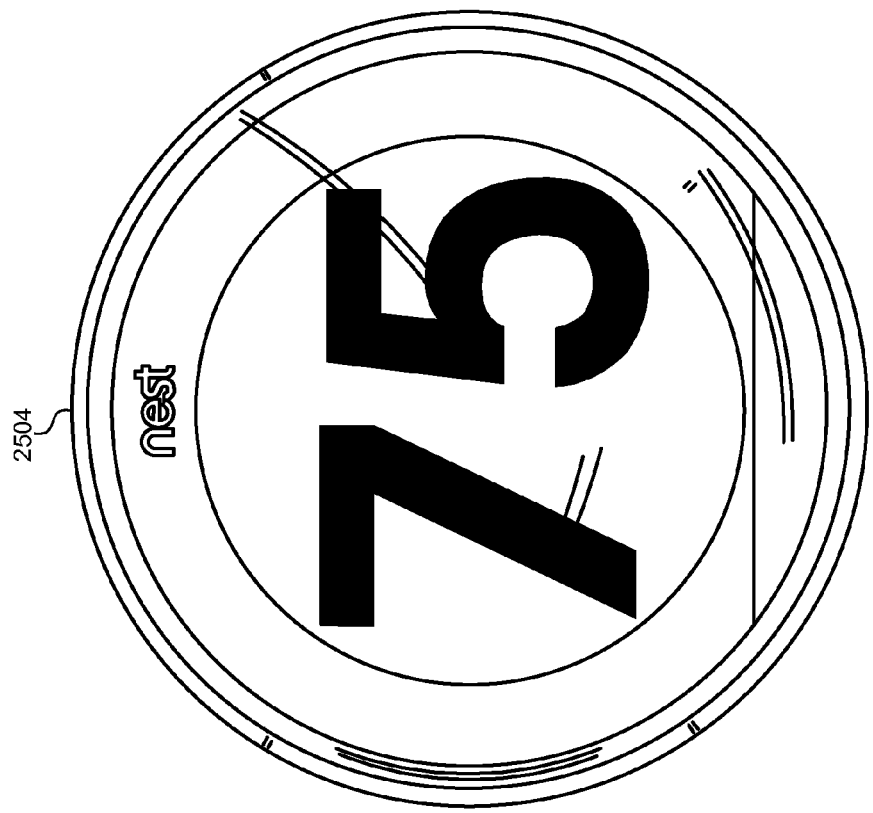
FIG. 25B illustrates an example of a far-field display of the thermostat function, according to some embodiments.
Figure 25A:
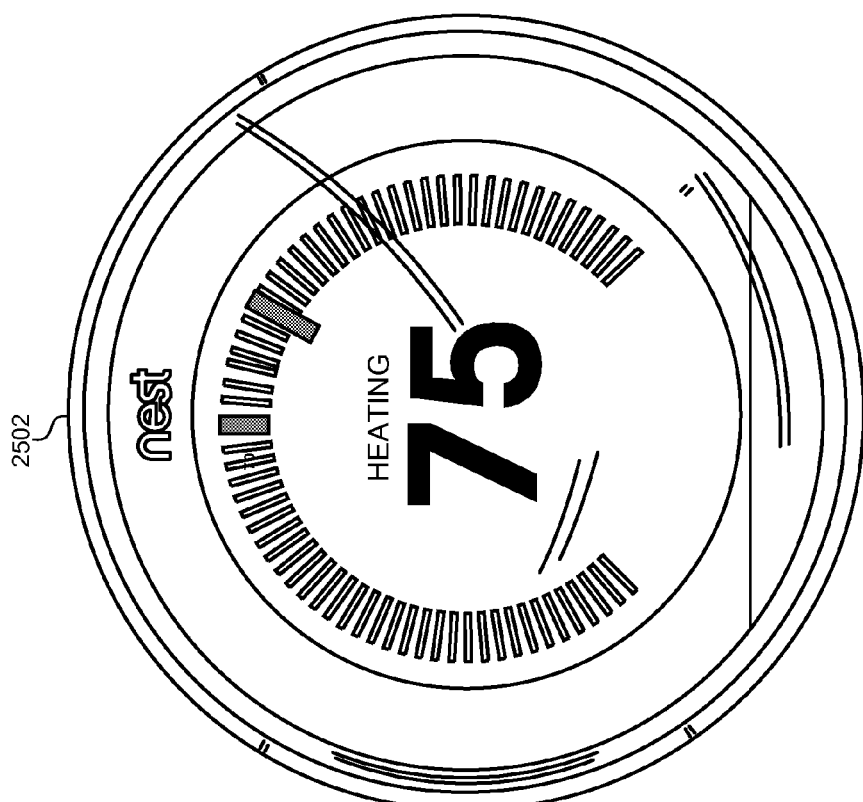
FIG. 25A illustrates an example of a near-field display of a thermostat function, according to some embodiments.

FIG. 25A illustrates an example of a near-field display 2502 of a thermostat function, according to some embodiments. The near-field display 2502 includes information that will be both useful and readable by users in the near-field range. For example, the near-field display 2502 may include an indication of the current temperature (75°), a description of a current HVAC function ("heating"), tick marks around a circular periphery of the user interface indicating degree increments, and enlarged tick marks showing both a current temperature and a setpoint temperature. This information may be considered more useful when the user is close to the smart-home device. When a user is close, it may indicate an intent to use or interact with the smart-home device, therefore it may be preferential to display information that would aid a user in such interaction. For example, as a user intends to interact with a thermostat, the user will need to know information such as a current temperature, setpoint temperature, a difference between the current temperature and the setpoint temperature, an HVAC function, and so forth. This information may also be considered more appropriately sized for a nearby user. It is unlikely that a user 12 to 15 feet away would be able to decipher the individual tick marks or to read the HVAC function. By displaying this information when the user is farther away, it may lead to user frustration and make them move closer to the smart-home device just to read the information. However, displaying this information when a user is nearby may provide all the useful information a user would need to know about the thermostat function without requiring interaction with the user interface.

FIG. 25B illustrates an example of a far-field display 2504 of the thermostat function, according to some embodiments. The far-field display 2504 includes a subset of the information of the near-field display 2502. In this case, only the current temperature is displayed. The far-field display 2504 also enlarges the display size of the subset of information. Here, the font size of the current temperature (75°) is enlarged to substantially fill the area of the user interface. The font size can be increased until the text would begin to move off of the user display. As a user moves from the responsive area of the far-field proximity sensor into the responsive area of the near-field proximity sensor, the thermostat user interface can transition from the far-field display 2504 to the near-field display 2502, and vice versa.

Figure 26B:
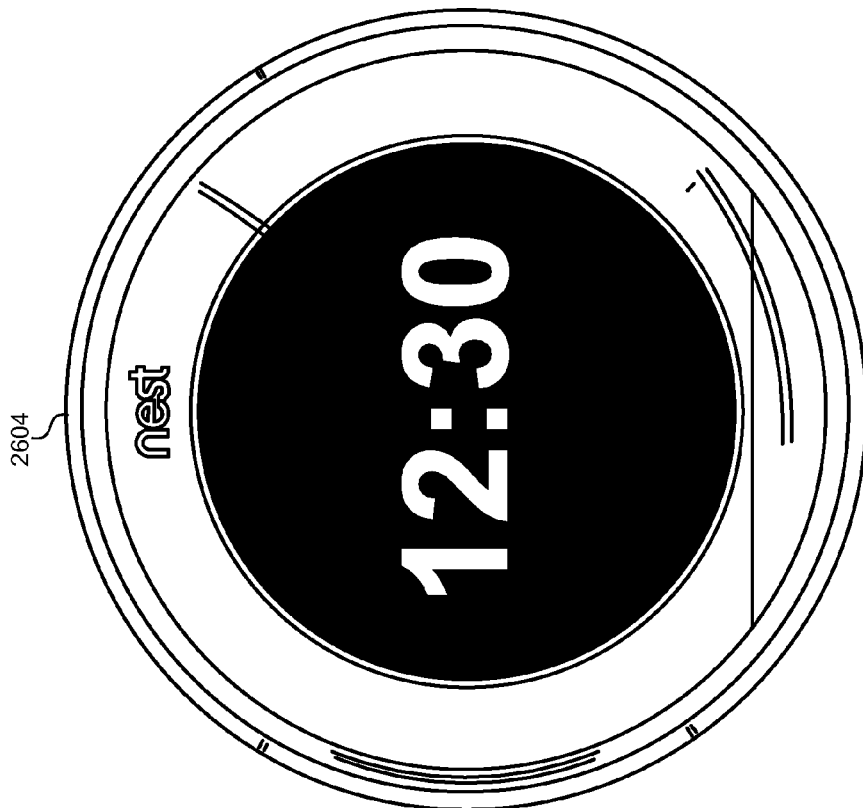
FIG. 26B illustrates an example of a far-field display of the clock function, according to some embodiments.
Figure 26A:
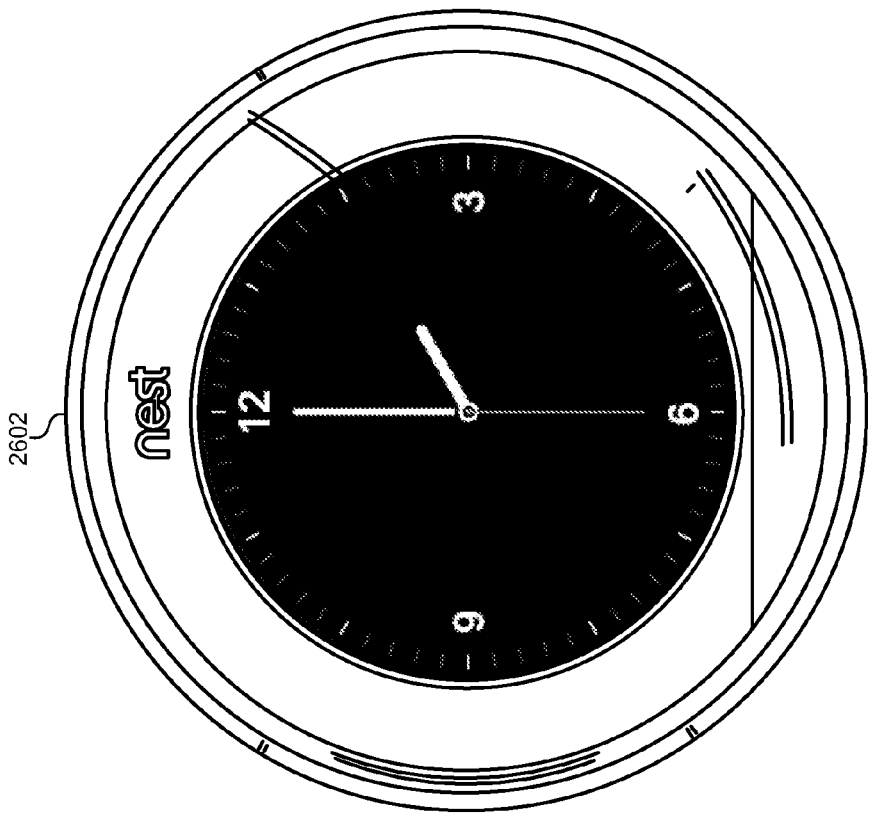
FIG. 26A illustrates an example of a near-field display of a clock function, according to some embodiments.

FIG. 26A illustrates an example of a near-field display 2602 of a clock function, according to some embodiments. The near-field display 2602 comprises an analog clock graphic with the minute hand, second hand, and hour hand that can be digitally simulated to move around a circular user interface in the same fashion as a traditional mechanical clock. Because of the fine detail and the small size of the numbers and clock hands, the near-field display 2602 may be appropriate for nearby users and may provide a warm and familiar ambience. FIG. 26B illustrates an example of a far-field display 2604 of the clock function, according to some embodiments. The far-field display 2604 includes the same information (i.e. time of day) as the near-field display 2602, just in a different format. Here, the time of day it is displayed in a digital clock format with that is enlarged to fill the user interface. Although the far-field display 2604 does not convey as much information as the near-field display 2602 (e.g., second information), the far-field display 2604 may be easily viewed from a greater distance. As described above, the user interface of the smart-home device can transition between the near-field display 2602 and the far-field display 2604 as the user moves between the responsive area of the near-field proximity sensor and the responsive area of the far-field proximity sensor.

Figure 27B:
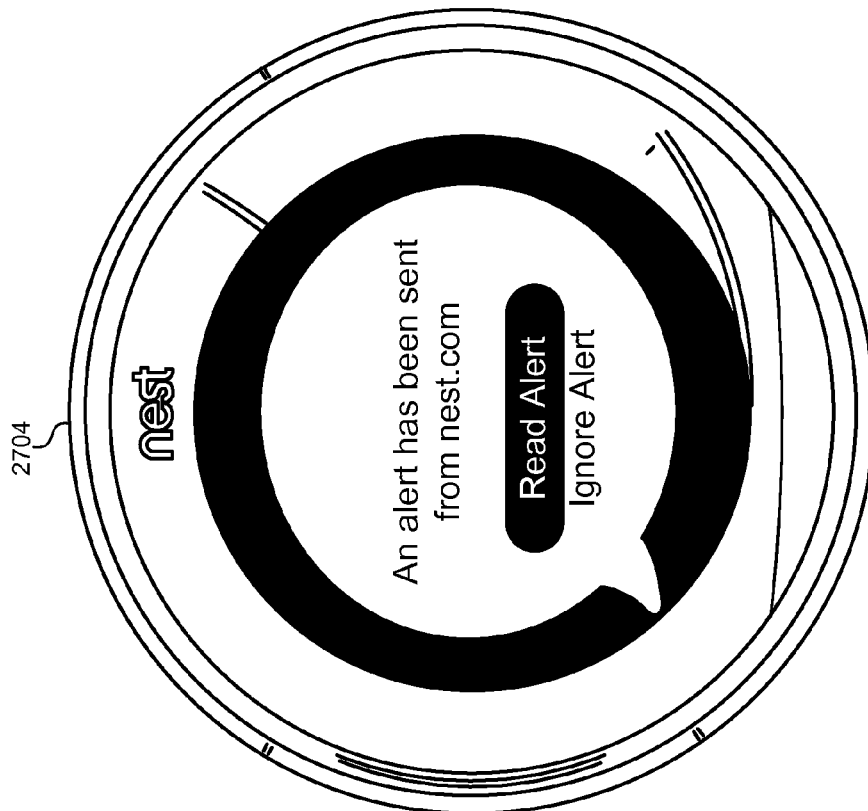
FIG. 27B illustrates a near-field display of the alert function, according to some embodiments.
Figure 27A:
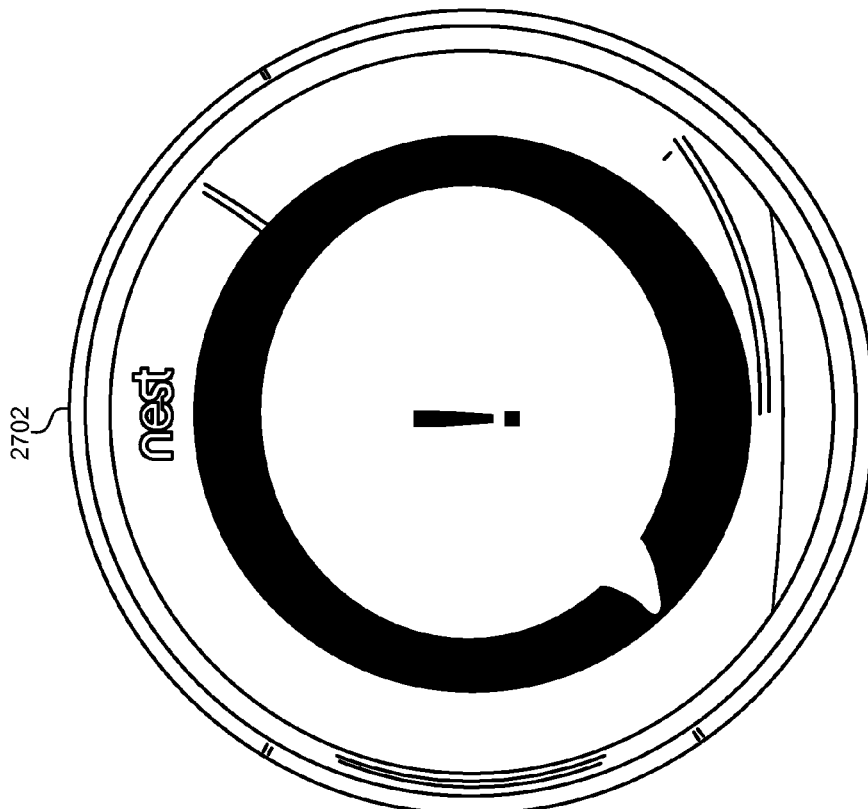
FIG. 27A illustrates an example of a near-field display of an alert function, according to some embodiments.

FIG. 27A illustrates an example of a near-field display 2702 of an alert function, according to some embodiments. The near-field display 2702 illustrates a graphical icon that visually conveys to a user the fact that the smart-home device is generating an alert. An alert may indicate an HVAC system problem, a message sent from a central management server, a severe weather warning from a local weather service, a demand-response event in which the user can choose to participate, a warning that the user has surpassing an expected or maximum power usage for the month, a humidity warning, a freeze warning, and so forth. From a distance, the far-field display 2702 only needs to indicate the fact that an alert has been received by the smart-home device. In order to see the details of the alert, the user may move closer to the smart-home device and into the responsive range of the near-field proximity sensor. FIG. 27B illustrates a near-field display 2704 of the alert function, according to some embodiments. As the user moves closer to the smart-home device, the near-field display 2704 can populate the graphical icon with textual information describing the alert. In the example of FIG. 27B, the alert icon has been populated with an indication that an alert has been received from a central management server. Additionally, as the user moves closer to the smart-home device, the graphical icon can be populated with menu options. For example, the user can be presented with menu options to either read the alert or to ignore the alert. In some embodiments, the details of the alert can be displayed automatically on the user interface without requiring interaction with menu items. In some embodiments, if the user moves from the responsive range of the far-field proximity sensor into the responsive range of the near-field proximity sensor, and the user interface is populated with the details of the alert as described above, the smart-home device may determine that the user has read the details of the alert. If the user then subsequently moves away from the device and out of the responsive range of near-field proximity sensor, the smart-home device can dismiss the alert under the assumption that it was read by the user when they approached the smart-home device.

Figure 28:
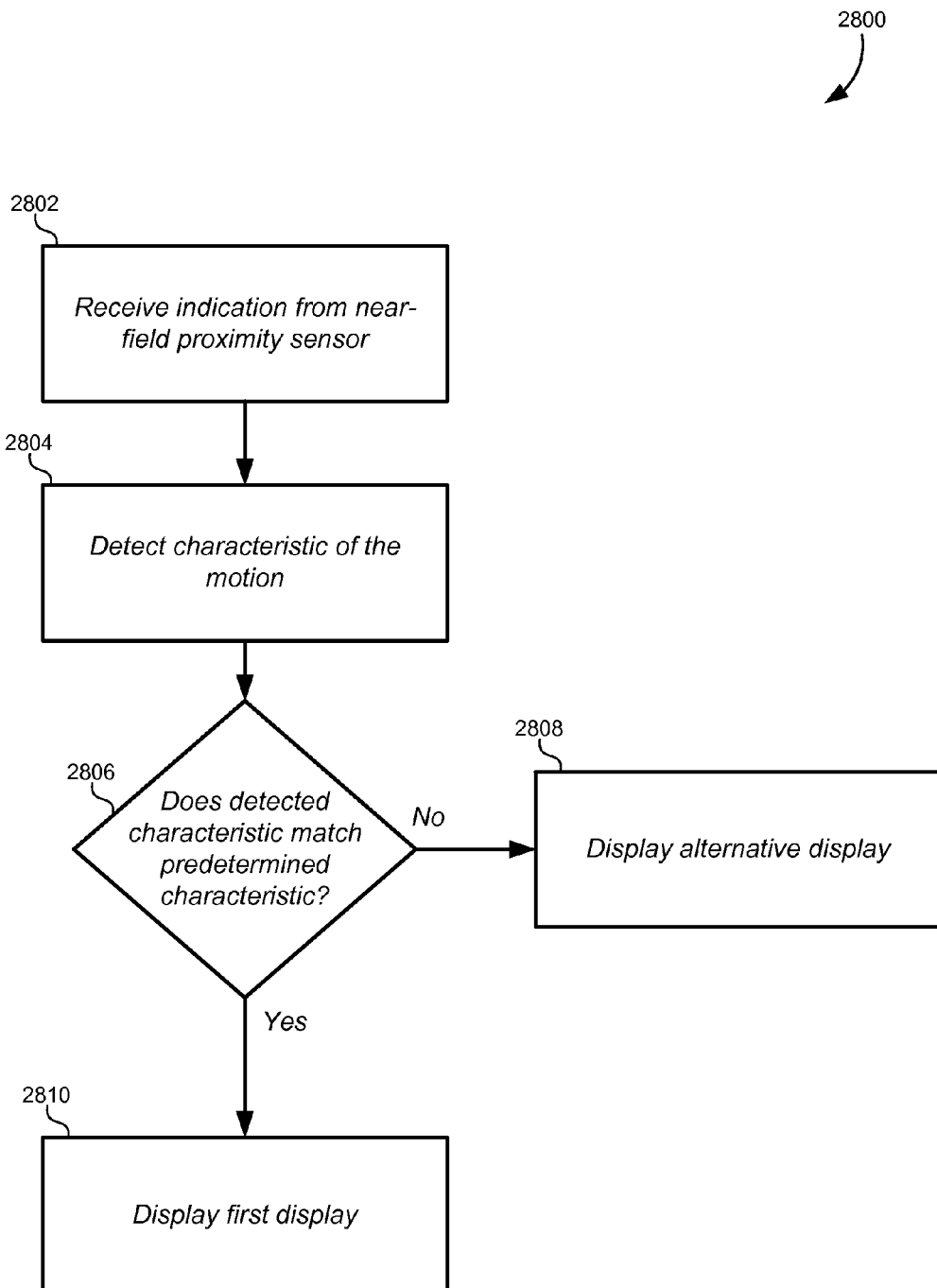
FIG. 28 illustrates a flowchart of a method of using characteristics of user motion to generate and control user interface displays, according to some embodiments.

FIG. 28 illustrates a flowchart 2800 of a method of using characteristics of user motion to generate and control user interface displays, according to some embodiments. In the embodiments described above, the transitions between a far-field display and a near-field display may be described as binary, i.e. the display type may be changed based at least in part on a single transition between the responsive areas of different proximity sensors. However, as described above, some embodiments of a smart-home device may include a multi-channel near-field proximity sensor with two or more overlapping responsive ranges. By analyzing the responses generated by individual channels, more information can be gleaned about the motion signature of the user. For example, an approximate velocity can be determined, a motion direction can be determined, and/or the like. By detecting a characteristic of the user's motion, this information can be used to not only activate a user display and transition between possible displays, but to also incrementally change the user display in response to the detected motion characteristics.

The method may include receiving an indication from the near-field proximity sensor (2802). The indication may be part of one or more responses generated by one or more channels of the near-field proximity sensor. For example, the indication may include an arrival response from the left channel followed by an arrival response from the right channel of the near-field proximity sensor. The method may additionally include detecting a characteristic of the motion detected by the near-field proximity sensor (2804). As described above, some embodiments may determine a motion signature that is based on the sequence and/or timing of different channel responses. For example, a user may move from left to right in front of the smart-home device, or user may directly approach the smart-home device. In these embodiments, the motion signature may be considered the motion characteristic. In other embodiments, the motion characteristic may include a relative speed of the user. For example, if the average width of the left channel before it is overlapped by the right channel is approximately 6 feet, the approximate speed of the user may be calculated by dividing this distance by the time delay between responses of the left channel and the right channel. When approaching the smart-home device directly, the speed may be determined by dividing the width between the far-field responsive area and the near-field responsive area by the time between responses from the two proximity sensors. In these embodiments, the velocity may by itself be considered the motion characteristic, and/or the velocity and the motion signature may be considered the motion characteristic in combination.

In some embodiments, a user identity may be determined from the proximity sensors. The user identity may be specific to an individual (e.g. Geddy versus Alex), or the user identity may indicate a specific class of users (e.g. adults versus children). For specific individuals, a motion signature may be recognized by the smart-home device and attributed to a particular user. For example, if a home includes two users, and one of the users moves faster than the other user, an estimated velocity of travel as determined by the multi-channel proximity sensor may be used to identify the user. In other embodiments, each user may be associated with their own control schedule. For example, a first user may be home during daytime hours, while a second user may be home during nighttime hours. When a user is detected within the range of the proximity sensors of the smart-home device, the control schedules can be accessed and a user can be determined by ascertaining which user should be home according to the control schedules. In other embodiments, the user identities may be transmitted to the smart-home device by other devices in a smart home network. In some embodiments, electronic devices carried by the users may be used to identify users. For example, an application operating on the smart phone of a user can use GPS information to transmit an approximate location to the smart-home device. RFID tags may be used in another example. The smart-home device can then use the GPS/RFID information and/or information from the onboard proximity sensors to determine a user identity. Other embodiments may use Bluetooth low energy (BLE) or Wi-Fi emissions from cell phone in order to differentiate users.

Some embodiments can distinguish a class of individuals rather than identifying specific identities. For example, a multi-channel proximity sensor with an up channel and a down channel may be used to discriminate between adults and children based on height. Children are generally shorter, and will result in a strong response on the down channel of the proximity sensor while generating a smaller response from the up channel of the proximity sensor. In contrast, adults are generally taller than the children, and will result in a more equal response between the down channel and the up channel (taking into account any scaling of the down channel to eliminate pet detections). The smart-home device may provide different displays based on whether a detected user is a child or an adult. For example, children are typically uninterested in interacting with the smart-home device, and adults would generally prefer that children do not interact with their smart-home device. Therefore, the smart-home device may leave the user interface off when a child is detected, and provide one of the other user interfaces described herein when an adult is detected. Additionally, the down channel of the proximity sensor will generate a larger response for pets than the up channel. When a pet is detected, the thermostat can disregard the associated motion.

The method may also include determining whether the detected motion characteristic matches a predetermined characteristic (2806). As described above, the detected motion characteristic can be compared to a database of stored motion characteristics. For example, a sensed motion signature can be compared to stored motion signatures. Characteristics indicating a user identity can be compared to store characteristics that have been previously associated with user identities. Velocities and user sizes can be compared to previously recorded velocities and user sizes for particular users or user classes. The database of stored motion characteristics can be downloaded from a central management server, learned during a training interval after installation of the smart-home device, and/or updated dynamically over time as the smart-home device records movements from users during normal operation.

The display of the user interface can be updated based on whether the sensed motion characteristic matches a predetermined motion characteristic. If a match is found, a first display can be displayed (2810). Alternatively, if no match is displayed, an alternative display can be displayed (2808). The alternative display or the first display may comprise an off state for the user interface. It will be understood that the two displays used in FIG. 28 are merely exemplary and not meant to be limiting. Other embodiments may use three or more displays that may change in increments as more information is received from the user motion.

Figure 29:
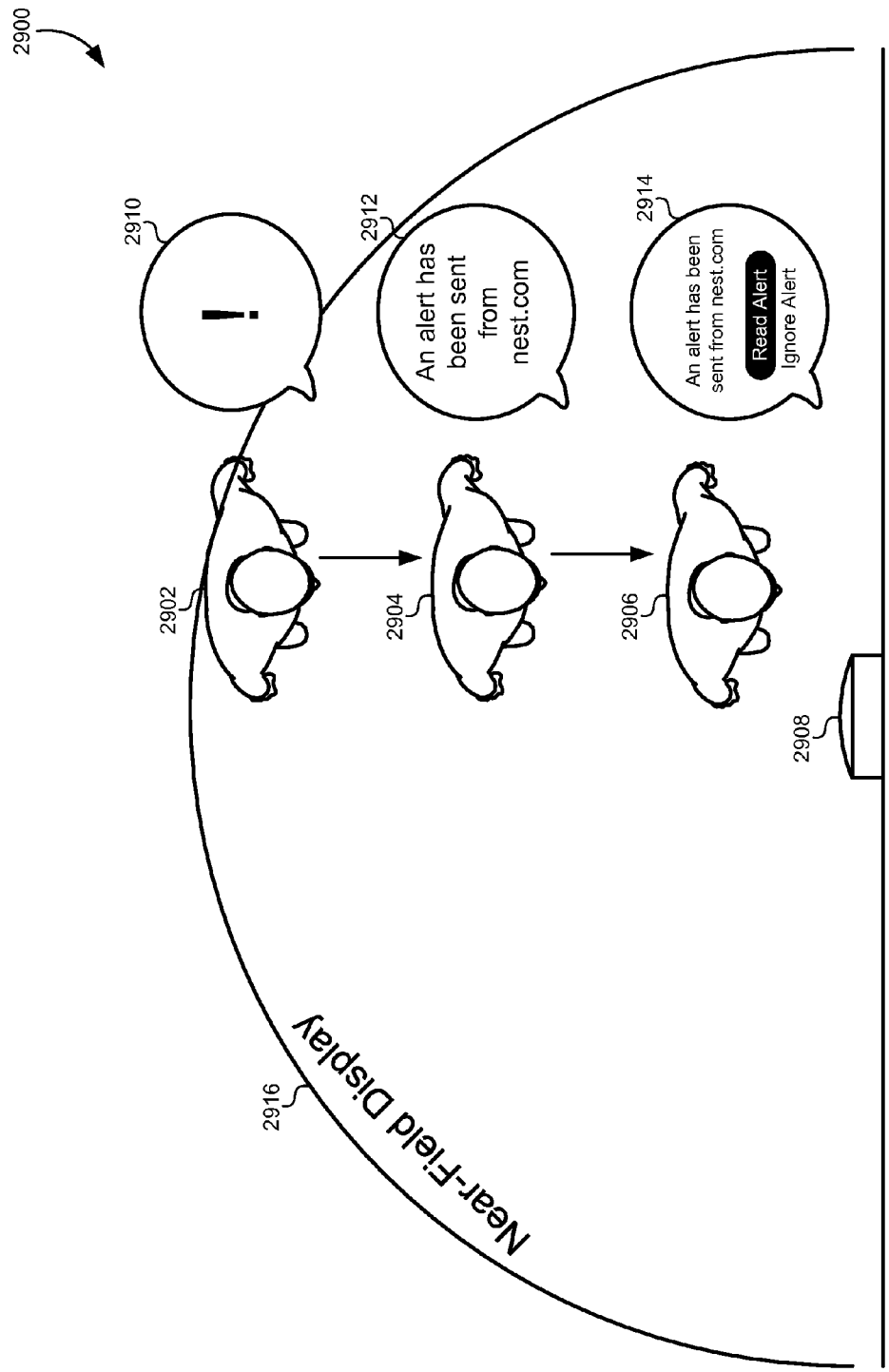
FIG. 29 illustrates a diagram of a progressive alert display, according to some embodiments.

FIG. 29 illustrates a diagram 2900 of a progressive alert display, according to some embodiments. The multi-channel proximity sensor allows the smart-home device the ability to discern a motion signature that can indicate that the user is approaching the smart-home device. Such an approach may indicate that the user intends to interact with the smart-home device. Alternatively, such an approach may indicate that the user would be susceptible a display indicating that he/she should interact with the smart-home device. In either case, the smart-home device can use this information to provide progressively more information on the user interface as the user draws near to the smart-home device.

The following example assumes that an alert is being generated by the smart-home device 2908. As the user enters the responsive range of the near-field proximity sensor 2916 at position 2902, the smart-home device 2908 can generate a display 2910 that shows the alert icon. As described above, the display at this range may have already been activated when the user entered the responsive range of the far-field proximity sensor. As the user moves closer to the smart-home device 2908 into position 2904, the smart-home device 2908 may begin to receive responses from additional channels of the multi-channel proximity sensor indicating that the user is moving towards the smart-home device 2908. For example, both the center (up/down) and the right channel may generate responses when the user is in position 2904. At this point, the smart-home device 2908 can determine that the user may at least be susceptible to a presentation of more information regarding the alert. In response, the smart-home device 2908 can present display 2912 which begins to populate the alert icon with textual information describing the alert. In this example, the textual information can describe how an alert is been received from a central management server.

As the user continues to move closer to the smart-home device 2908, additional channels of the multi-channel proximity sensor will generate responses (e.g., the left, right, and center channels may begin to generate responses). Additionally, the response level of each channel may increase in magnitude above a threshold amount indicating that the user is close to the smart-home device 2908 (e.g., the "approach" threshold described above). As the user draws within an interactive distance of the smart-home device 2908, display 2914 can be generated which will provide textual information and menu options for the alert. By gradually increasing the amount of information displayed by the smart-home device 2908, the user interface can both entice the user to continue moving towards the smart-home device 2908 and present the user with information that is readable and relevant according to their distance from the smart-home device 2908. Particularly in the case of an alert, it may be desirable for the smart-home device 2908 to entice the user to interact with the smart-home device 2908 such that the alert can be read and responded to.

Although not shown in FIG. 29, alternative displays can also be generated when the smart-home device 2908 determines that the user is not responding to the existing user display and moving away from the smart-home device 2908. For example, if the user at position 2902 does not progress towards the thermostat in response to display 2910 of the alert icon (e.g., the user moves to the left instead of towards the smart-home device 2908), the smart-home device 2908 can generate a display that is configured to attract the user's attention. For example, display 2910 can be modified such that the alert icon begins to flash or change colors. If the motion signature of the user continues to indicate that the user is ignoring the smart-home device 2908, the user interface can be turned off in some embodiments.

Figure 30:
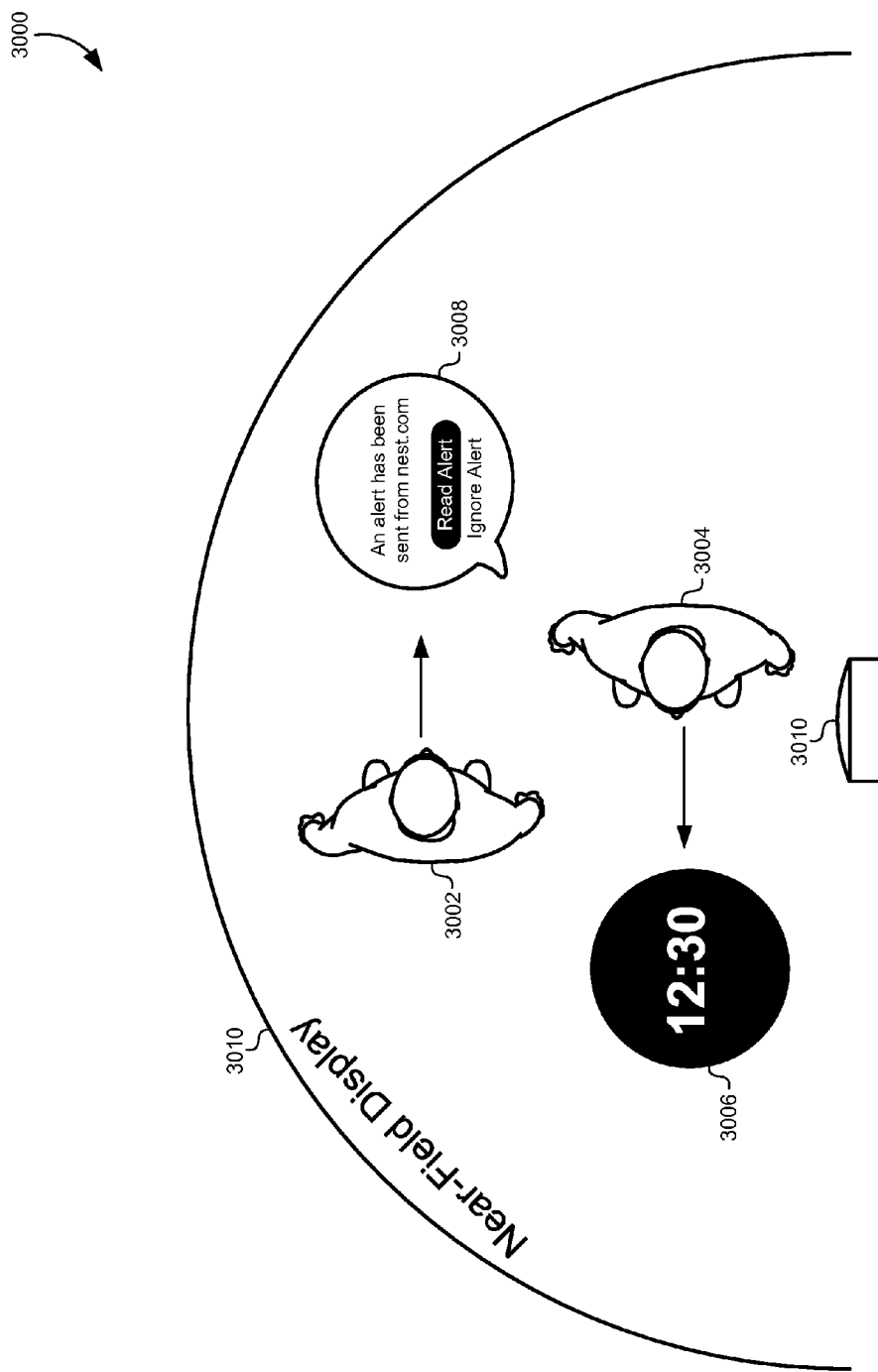
FIG. 30 illustrates a diagram of a progressive user interface based on user identities, according to some embodiments.

FIG. 30 illustrates a diagram 3000 of a progressive user interface based on user identities, according to some embodiments. Once users enter the responsive area 3010 of the near-field proximity sensor, the multiple channels of the sensor can be used to distinguish between different users as described above. In this example, the multi-channel proximity sensor can discriminate between a child and an adult based on height. As a child 3004 walks by the smart-home device 3010, the smart-home device 3010 can generate display 3006 showing the time of day in a digital fashion. This type of display will be easy to read for a child and the digital display will be more familiar to a child than that of the more traditional analog display that would be familiar to an adult.

When an adult 3002 passes by the smart-home device 3010, a display can be generated that is more appropriate for an adult. In this example, display 3008 can be generated to show an alert to the adult 3002 that would normally be hidden from the child 3004. In other embodiments, a user identity can be determined by other means to distinguish between individual users. For example, a user designated as a primary user (e.g., a user responsible for paying the energy bills) may be provided with display 3008, while a user designated as a secondary user (e.g., a roommate) may be provided with display 3006 based on their identities.

Different user displays can also be displayed to users based on their identities based on stored user profiles. For example, a first user may prefer the analog clock display, while a second user may prefer the digital clock display. A user profile may also indicate one user in the household (e.g., a head of the household) as one responsible for receiving alerts and HVAC system messages.

FIG. 31 illustrates a diagram 3100 of progressive user displays based on user velocities, according to some embodiments. The speed with which a user travels by the smart-home device 3110 may at least in part indicate how susceptible the user will be to interactive displays or displays that require more user attention. For example as a user 3106 passes by the smart-home device 3110 at a velocity that is below a predetermined threshold, the smart-home device 3110 may determine that the user may respond to information displayed on the user interface. Exemplary display 3108 may be provided that includes alert information and/or menu options with which the user 3106 may interact. Alternatively, if a user 3102 is passing by the smart-home device 3110 at a velocity greater than the predetermined threshold, the user interface can provide a display 3104 that, while possibly informative, does not require user interaction or attention.

Figure 32A:
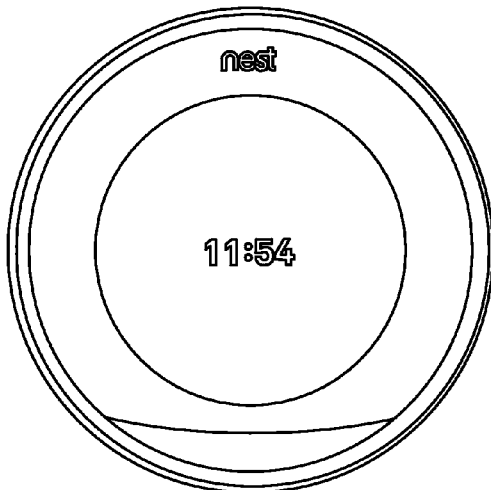
FIGS. 32A-32D illustrate user interface displays that are part of a progressive animation that may be displayed when the user interface is activated, according to some embodiments.
Figure 32B:
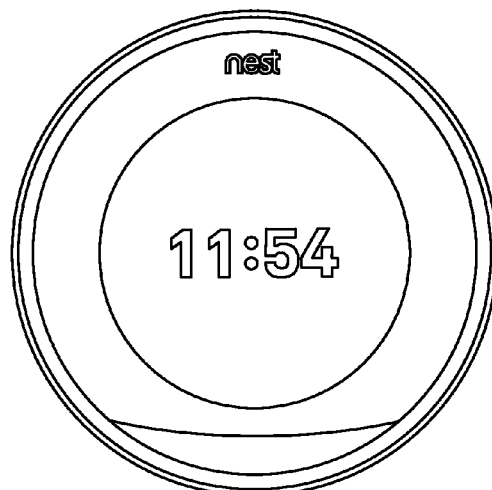
Figure 32C:
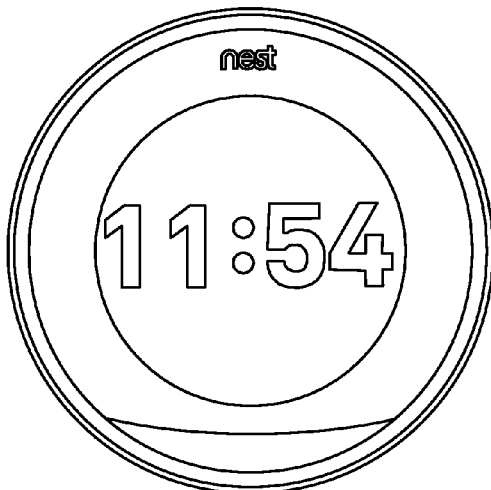
Figure 32D:
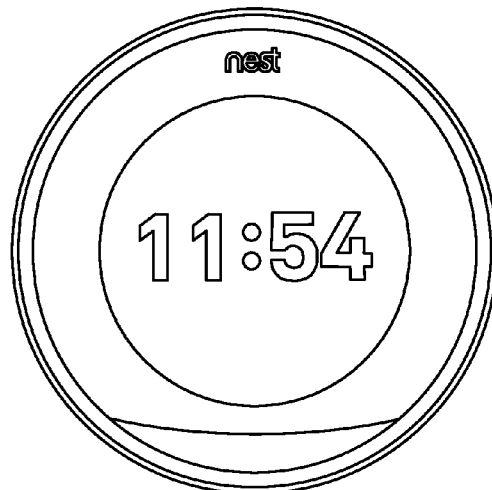

FIGS. 32A-32D illustrate user interface displays that are part of a progressive animation that may be displayed when the user interface is activated. As described above, the user interface of the smart thermostat may activate when a user approaches the responsive range of the far-field proximity sensor and/or the near-field proximity sensor. When the user walks by the smart thermostat, it may be desirable to display graphics on user interface that are calculated to attract the attention of the user who only sees the thermostat in the periphery of his/her vision. In some embodiments, when the user interface is activated, the display can start small and, in an animated fashion, grown larger. After reaching an oversized size, the graphics can shrink slightly to a normal size. This animated transition from small, to large, and back to a normal size results in an animation that causes the graphics to "pop" towards the user. Sudden motion such as this has been found to attract the attention of users as they walk by the thermostat. This can be particularly useful when messages or alerts are to be displayed on the user interface. FIG. 32A illustrates a starting size for an animation that displays the current time for the user. The current time can continuously grow to an intermediate size as illustrated by FIG. 32B, and then to an oversized size as illustrated by FIG. 32C. The current time can then shrink back down to a normal size as illustrated by FIG. 32D. the "normal size" may be the size at which the current time will be displayed in a steady state after the animation is complete. In some embodiments, the entire animation process may take less than one second to transition from a blank display to that of FIG. 32D.

In some embodiments, the user interface can display graphics that provide information to user as they approached the thermostat, such as a current time, a current temperature, an alert, and/or the like. This informative display can remain active on user interface until the user interacts with the thermostat. As described above, some embodiments can transition to a menu display when the user comes within a very close proximity to the thermostat. In other embodiments, the informative display can stay active on the user interface until the user actually interacts with the thermostat, e.g., by rotating or clicking the outer rotatable ring or other user interface elements.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

While the principles of the disclosure have been described above in connection with specific apparatuses and methods, it is to be clearly understood that this description is made only by way of example and not as limitation on the scope of the present teachings.

What is claimed is:

1. A thermostat comprising:
a proximity sensor for detecting user presence;
a temperature sensor that provides temperature measurements for calculating an ambient temperature in an area surrounding the thermostat;
a sensor mount assembly containing the proximity sensor and the temperature sensor, the sensor mount assembly including a first alignment feature;
a lens assembly comprising a first area, a second area, and a second alignment feature, wherein the second area comprises a Fresnel lens, and the first area is thinner than the second area;
a front cover, wherein an outward-facing surface of the lens assembly is shaped to continuously conform to a curvature of the front cover; and
a frame member comprising third and fourth alignment features configured for respective matable alignment with the first and second alignment features and further configured such that the proximity sensor and the temperature sensor are maintained in generally close, non-touching proximity to the lens assembly, the first area of the lens assembly being aligned with the proximity sensor, and the second area of the lens assembly being aligned with the temperature sensor.

2. The thermostat of claim 1, wherein the sensor mount assembly comprises a flexible circuit board to which the proximity sensor and the temperature sensor are mounted.

3. The thermostat of claim 1, wherein the sensor mount assembly further comprises a bracket comprising at least two different elevations such that the proximity sensor and the temperature sensor sit at the at least two different elevations relative to the lens.

4. The thermostat of claim 1, wherein the temperature sensor comprises an IC body and a metal pin through which the temperature measurements for calculating the ambient temperature in the area surrounding the thermostat are received, and wherein a portion of the sensor mount assembly is rotated at an angle such that the metal pin is closer to the lens assembly than the IC body.

5. The thermostat of claim 1, wherein the sensor mount assembly further comprises a second proximity sensor.

6. The thermostat of claim 1, wherein the proximity sensor comprises a passive infrared (PIR) sensor, and the distance between the second area of the lens assembly and the PIR sensor is between 6 mm and 8 mm.

7. The thermostat of claim 1, wherein the lens assembly is fabricated from a continuous piece of high-density polyethylene (HDPE) using an injection molding process.

8. The thermostat of claim 1, wherein the proximity sensor comprises a multi-channel thermopile comprising at least a left channel and a right channel.

9. The thermostat of claim 1, wherein the distance between the temperature sensor and the first area of the lens is less than 3 mm.

10. The thermostat of claim 1, further comprising electromagnetic shielding that wraps around the proximity sensor and around at least a portion of the sensor mount assembly.

11. A method of aligning sensor and lens elements in a smart thermostat, the method comprising:
providing a sensor mount assembly comprising:
a proximity sensor for detecting user presence;
a temperature sensor that provides temperature measurements for calculating an ambient temperature in an area surrounding the thermostat; and
a first alignment feature;
providing a lens assembly comprising:
a first area;
a second area comprising a Fresnel lens, wherein the first area is thinner than the second area; and
a second alignment feature;
providing a frame member comprising third and fourth alignment features configured for respective matable alignment with the first and second alignment features and further configured such that the proximity sensor and the temperature sensor are maintained in generally close, non-touching proximity to the lens assembly, the first area of the lens assembly being aligned with the proximity sensor, and the second area of the lens assembly being aligned with the temperature sensor;
connecting the sensor mount assembly to the frame member by mating the first alignment feature with the third alignment feature; and
connecting the lens assembly to the frame member by mating the second alignment feature with the fourth alignment feature.

12. The method of claim 11, wherein the sensor mount assembly comprises a flexible circuit board to which the proximity sensor and the temperature sensor are mounted.

13. The method of claim 11, wherein the sensor mount assembly further comprises a bracket comprising at least two different elevations such that the proximity sensor and the temperature sensor sit at the at least two different elevations relative to the lens.

14. The method of claim 11, wherein the temperature sensor comprises an IC body and a metal pin through which the temperature measurements for calculating the ambient temperature in the area surrounding the thermostat are received, and wherein a portion of the sensor mount assembly is rotated at an angle such that the metal pin is closer to the lens assembly than the IC body.

15. The method of claim 11, wherein the sensor mount assembly further comprises a second proximity sensor.

16. The method of claim 11, wherein the proximity sensor comprises a passive infrared (PIR) sensor, and the distance between the second area of the lens assembly and the PIR sensor is between 6 mm and 8 mm.

17. The method of claim 11, wherein the lens assembly is fabricated from a continuous piece of high-density polyethylene (HDPE) using an injection molding process.

18. The method of claim 11, wherein the proximity sensor comprises a multi-channel thermopile comprising at least a left channel and a right channel.

19. The method of claim 11, wherein the distance between the temperature sensor and the first area of the lens is less than 3 mm.

20. The method of claim 11, wherein the sensor mount assembly further comprises electromagnetic shielding that wraps around the proximity sensor and around at least a portion of the sensor mount assembly.

* * * * *